(12) United States Patent
Okada

(10) Patent No.: US 7,035,197 B2
(45) Date of Patent: Apr. 25, 2006

(54) DISK DRIVE INCLUDING A BALANCER

(75) Inventor: Kenji Okada, Matsuyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 817 days.

(21) Appl. No.: 10/009,356

(22) PCT Filed: Mar. 9, 2001

(86) PCT No.: PCT/JP01/01889

§ 371 (c)(1),
(2), (4) Date: Nov. 13, 2001

(87) PCT Pub. No.: WO01/69600

PCT Pub. Date: Sep. 20, 2001

(65) Prior Publication Data

US 2003/0099176 A1 May 29, 2003

(30) Foreign Application Priority Data

Mar. 14, 2000 (JP) .................................... 2000-071100

(51) Int. Cl.
*G11B 7/00* (2006.01)

(52) U.S. Cl. .................. 369/264; 369/53.18; 369/53.45

(58) Field of Classification Search ............... 73/660; 720/660, 651; 310/51; 369/53.18, 53.4, 264, 369/53.45

See application file for complete search history.

(56) References Cited

U.S. PATENT DOCUMENTS 5,136,569 A * 8/1992 Fennema et al. ......... 369/53.23
6,005,749 A * 12/1999 Ikuta et al. ............... 360/99.12

FOREIGN PATENT DOCUMENTS

| EP | 0 938 087 A1 | 2/1999 |
| JP | 10-83622 A | 3/1998 |
| JP | 10255710 A | 9/1998 |
| JP | 11098759 A | 4/1999 |
| JP | 11306629 A | 11/1999 |
| WO | WO 00/04541 A1 | 1/2000 |
| WO | WO 00/04542 A1 | 1/2000 |

* cited by examiner

*Primary Examiner*—A M Psitos
(74) *Attorney, Agent, or Firm*—Akin Gump Strauss Hauer & Feld, LLP

(57) ABSTRACT

A disk drive capable of producing the effect of a balancer even in a variety of reproduction and recording speeds without causing problems owing to the balancer, comprising a balancer in which magnetic balls 1 movably accommodated inside a damper 6 cancel any imbalance amount of a disk 5, and a detection section 14 provided near the clamper 6 to detect the behavior of the magnetic balls 1.

24 Claims, 31 Drawing Sheets

FIG. 3
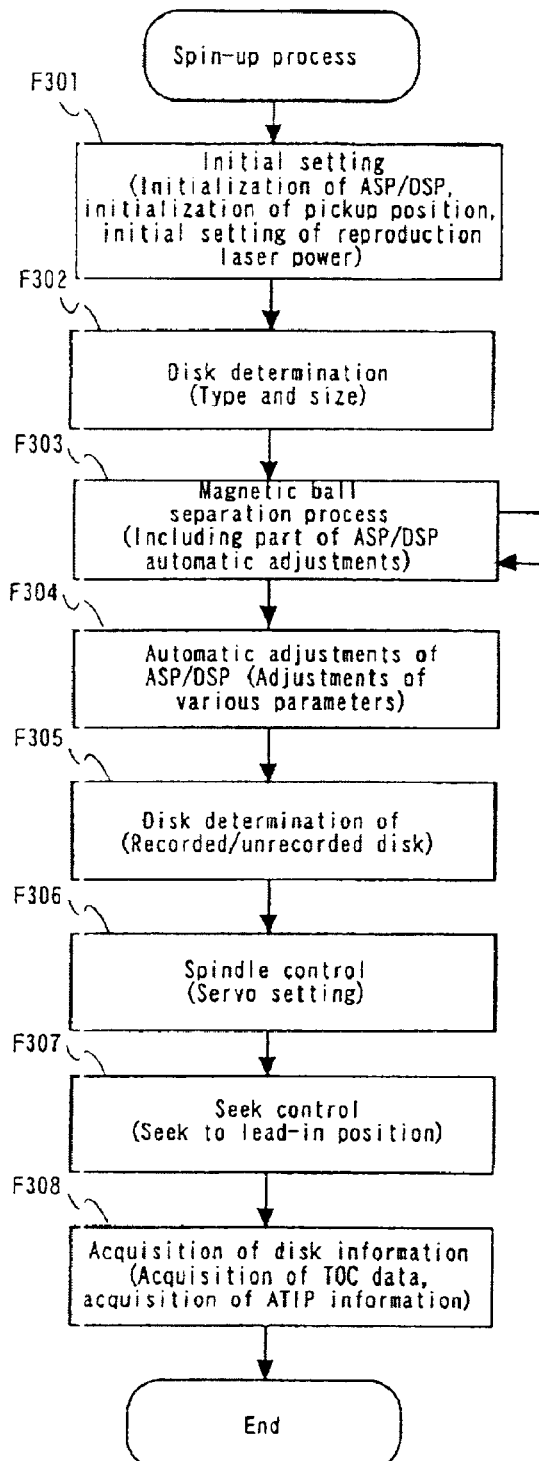
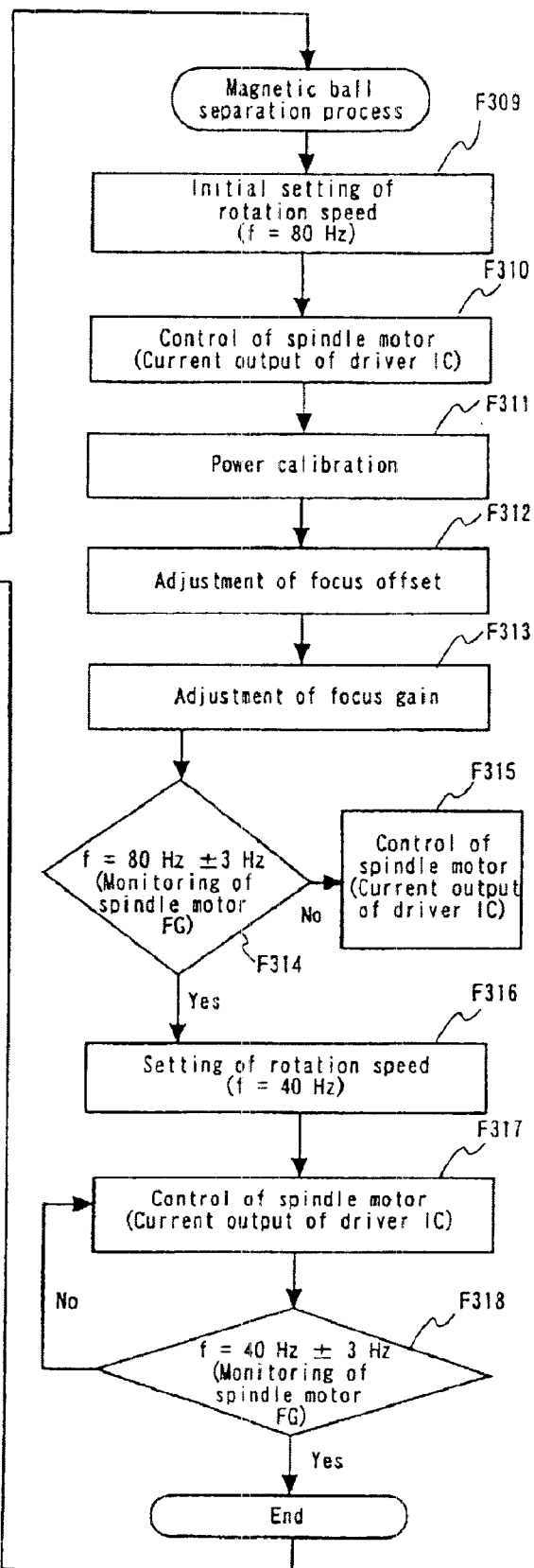

F I G. 9
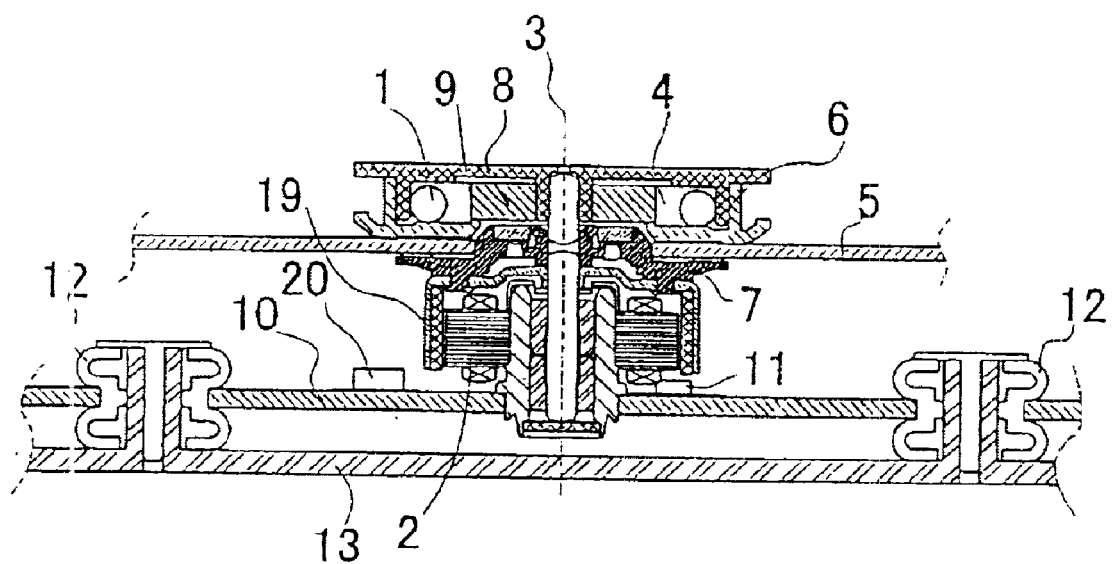

FIG. 14

| Multiple speed for recording/ reproduction | Recording/ reproduction position (mm) | Rotation speed of disk (rpm) | Ratio of innermost rotation speed and outer most rotation speed |
|---|---|---|---|
| 1 | φ44.7 | 598.47(9.97Hz) | 3.08 |
| | φ118 | 194.32(3.24Hz) | |
| 2 | φ44.7 | 1196.94(19.95Hz) | 3.08 |
| | φ118 | 388.64(6.48Hz) | |
| 4 | φ44.7 | 2393.88(39.9Hz) | 3.08 |
| | φ118 | 777.29(12.95Hz) | |
| 8 | φ44.7 | 4787.76(79.8Hz) | 3.08 |
| | φ118 | 1554.57(25.91Hz) | |

F I G. 1 6
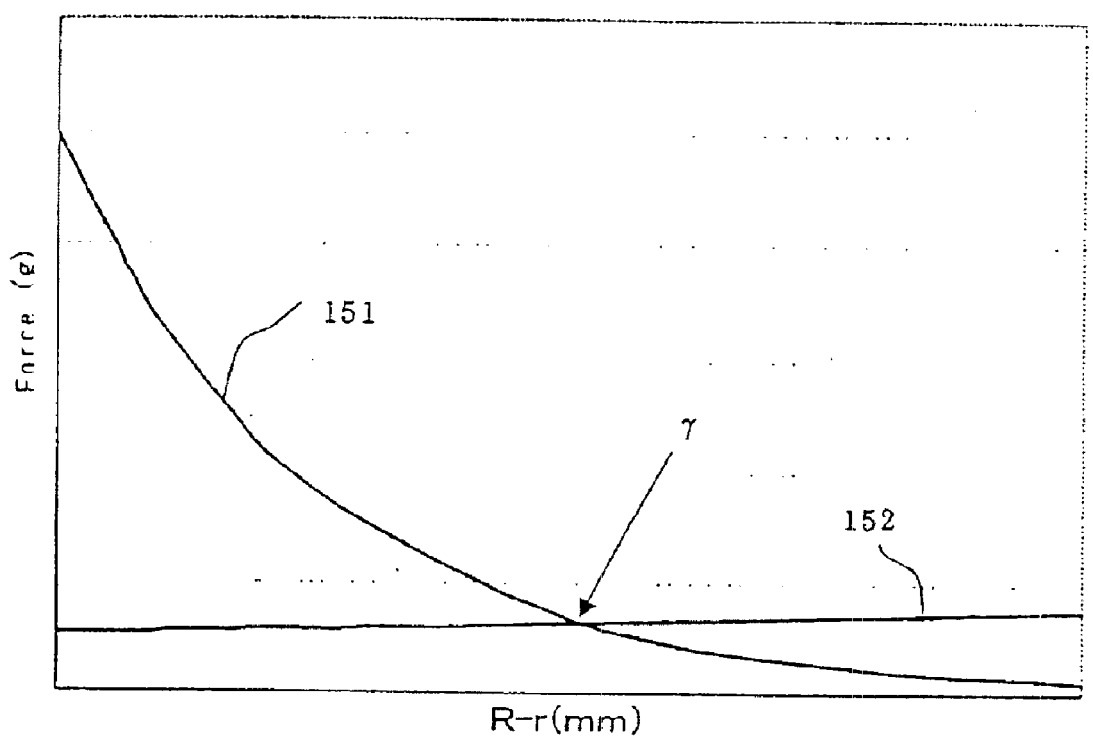

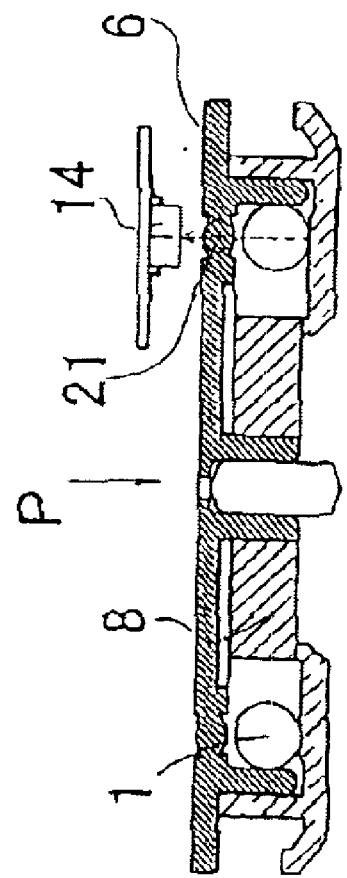
F I G. 2 2 B
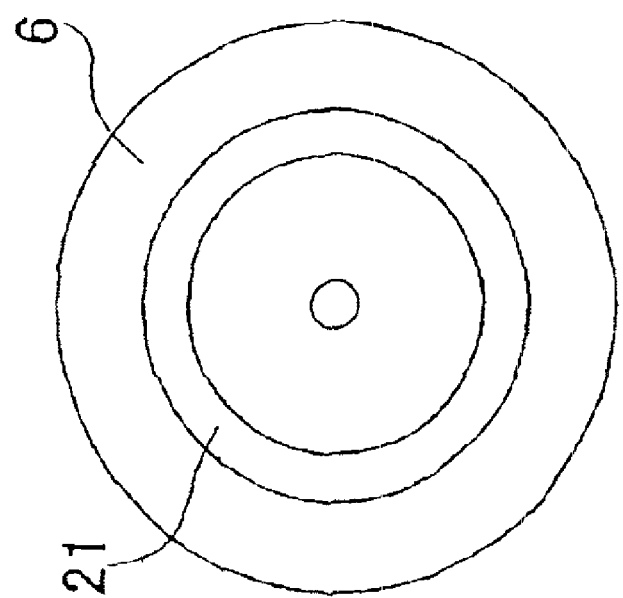
F I G. 2 2 A

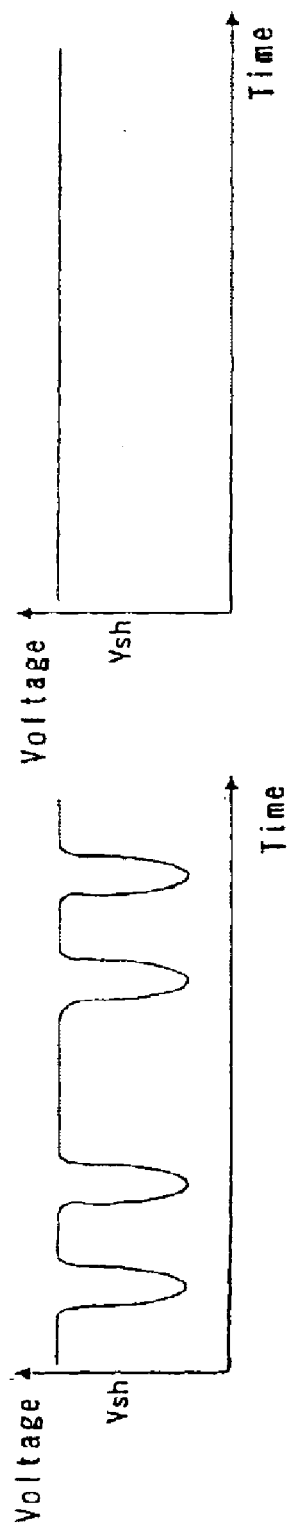
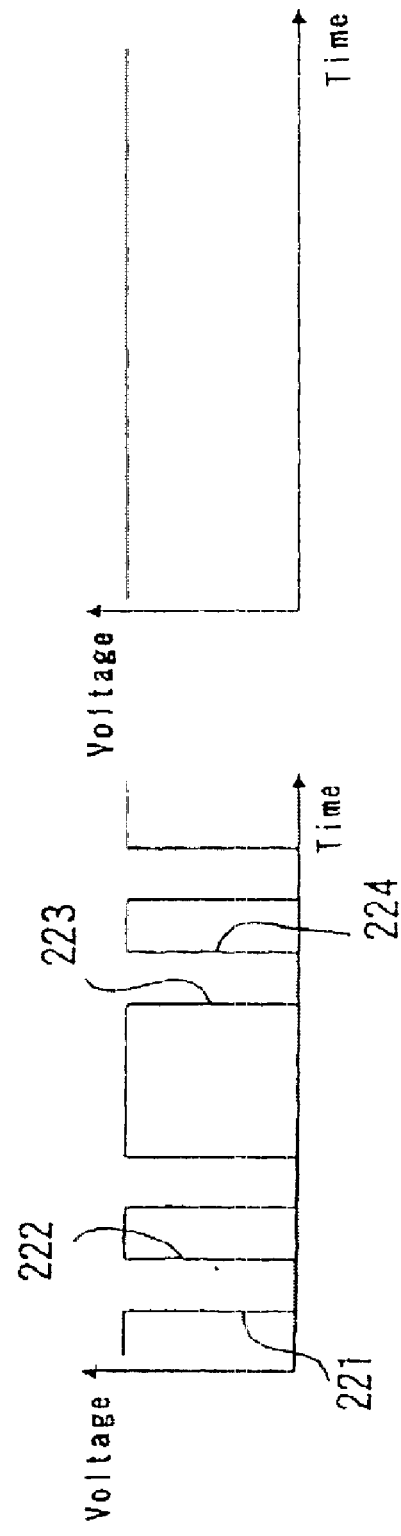

DISK DRIVE INCLUDING A BALANCER

TECHNICAL FIELD

The present invention relates to a disk drive for reproducing or recording information on a disk-like recording medium (disk) and to its control method.

BACKGROUND ART

In recent years, the rate of data transfer is made higher in disk drives for recording or reproducing data, such as CD-ROM drives, DVD-ROM drives and CD-R/RW drives. In accordance with this trend, it has become absolutely necessary to rotate disks at high speed.

Many disks on the market are unbalanced disks having an offset in mass balance owing to uneven thickness or the like (disks with offset centers of gravity). If such a disk is rotated at high speed, the imbalance force of the disk acts significantly and causes vibration. The vibration is transmitted to the entire disk drive, thereby making stable data recording and reproduction impossible and causing noise owing to the vibration. In addition, the vibration shortens the life of its motor. Furthermore, in the case when the disk drive is built in a computer, the vibration is transmitted to other peripheral devices and adversely affects them.

For this reason, in raising the rate of data transfer by rotating a disk at high speed, it is absolutely necessary to restrict vibration owing to the imbalance of the disk. Various measures have been taken to cancel the imbalance.

<Explanation of FIG. 29>

A conventional disk drive capable of canceling an imbalance and having already been applied by the applicant of the present invention will be described below.

FIG. 29 is a view showing a disk drive having a conventional balancer.

The balancer of the disk drive shown in FIG. 29 is provided with a ring-shaped hollow section 4 and can rotate integrally with a disk 5 loaded into the disk drive.

Inside the ring-shaped hollow section 4, plural magnetic balls 1 are movably accommodated, and the ring-shaped hollow section 4 is made coaxial with the rotation center shaft 3 of a spindle motor 2. The ring-shaped hollow section 4 is formed inside a damper 6, and the disk 5 is held between the clamper 6 and a turntable 7. The external peripheral face 9 of the magnet 8 built in the damper 6 constitutes the internal peripheral wall of the ring-shaped hollow section 4.

<Explanation of FIG. 30>

FIG. 30 is a view showing another disk drive having a conventional balancer.

The balancer of the disk drive shown in FIG. 30 is provided with a ring-shaped hollow section 4 and can rotate integrally with a disk 5 loaded into the disk drive.

Inside the ring-shaped hollow section 4, plural magnetic balls 1 are movably accommodated, and the ring-shaped hollow section 4 is made coaxial with the rotation center shaft 3 of a spindle motor 2. The ring-shaped hollow section 4 is formed under a turntable 7 on which the disk 5 is mounted. The external periphery of the rotor magnet 19 of the spindle motor 2 for driving the turntable 7 constitutes the internal peripheral wall of the ring-shaped hollow section 4.

<Explanation of FIG. 31>

FIG. 31 is a flowchart of a general spin-up process carried out at the time when the disk drive having the balancer is started.

In the descriptions of the present specification and claims, "a spin-up process" means a process that is carried out in the period from the time when power is supplied or a new disk is loaded into the disk drive to the time when the disk drive acquires information recorded on the disk, other than positional information, for the first time.

When power is supplied to the disk drive, or when a new disk is loaded into the disk drive, step F291 is carried out.

At step F291, initial setting is carried out. The initial setting includes the initialization of the position of an optical pickup and the adjustment of the power and the like of the semiconductor laser of the optical pickup.

The optical pickup of the disk drive is moved to a TOC (table of contents) area located near the innermost position of the disk and including a recorded table of disk information.

Furthermore, the laser power of the optical pickup is initialized. First, the value of the laser power and the position of the focus lens of the optical pickup at the time when the disk drive was driven last are set as initial setting values. These values are stored in the built-in nonvolatile memory of the disk drive. Next, the current of the laser is adjusted (power calibration) on the basis of the output signal of the power monitor photodiode built in the laser so that the output power of the laser becomes appropriate.

Next, at step F292, laser light is emitted to the disk via the object lens of the optical pickup, and the type of the disk is identified on the basis of the absolute value of the amount of the light reflected from the disk. In addition, the spindle motor is driven at a constant voltage, and the magnitude of the inertia of the disk is determined on the basis of the change at that time in the rotation speed of the disk. Furthermore, the size of the disk is determined on the basis of the magnitude of the inertia of the disk.

At step F293, adjustments are carried out for the various parameters of the electric circuits related to the optical pickup, such as an analog signal processor (hereafter referred to as "ASP") and a digital signal processor (hereafter referred to as "DSP"). By the adjustments, the information on the disk is ready to be read properly.

At step F294, the spindle motor is controlled so that the disk is rotated synchronously at a predetermined rotation speed.

At step F295, the position of the optical pickup is finely adjusted, and seek operation is carried out to the lead-in position (the initial position of the information) of the TOC information on the disk.

At step F296, the optical pickup reads the TOC information recorded on the disk. After this, the optical pickup is generally made on standby at the 2-second position of the absolute address in the user data area, thereby being set in a standby state to wait for a command from the host.

In a disk drive having only the reproduction function in a constant rotation speed mode (hereafter referred to as a "CAV mode" (constant angular velocity mode)), the centrifugal force applied to each of the magnetic balls 1 is nearly constant in the range from the innermost periphery to the outermost periphery of the disk in one rotation speed mode. Even if the disk drive has plural rotation speed modes, the difference between the highest rotation speed and the lowest rotation speed is not so large in general. As a result, the centrifugal force applied to the magnetic ball 1 is within a constant range.

For this reason, a relatively proper balancer effect of can be obtained by the configuration and processes in accordance with the conventional example.

Furthermore, even in a disk drive having a constant linear velocity mode (hereafter referred to as a "CLV mode" (constant linear velocity mode)), in the case of a disk drive having only about three or four kinds of rotation speed modes, such as very low rotation speed modes for audio reproduction, a relatively favorable balancer effect can also be obtained by the configuration and processes in accordance with the conventional example.

Reproduction-only disk drives, such as CD-ROM drives and DVD-ROM drives, are available as examples of the above-mentioned disk drives.

However, in disk drives having various recording and reproduction speeds, for example, disk drives having both recording and reproduction functions, such as CD-RW and CD-R drives, it is impossible to obtain satisfactory results from the balancer configuration of the conventional example.

During recording wherein the rotation speed is far lower than that during reproduction, for example, the magnetic balls 1 are unstable, while rolling on the external peripheral side of the inner wall of the ring-shaped hollow section 4 or moving to the internal peripheral side of the inner wall. The magnetic balls 1 sometimes collide with the inner walls of the external or internal periphery, thereby causing impacts. As a result, a large disturbance might apply to the disk drive, instead of eliminating such a disturbance.

Furthermore, even during reproduction, during high-speed reproduction in particular, the magnetic balls 1 inside the ring-shaped hollow section 4 are pressed against the inner wall of the external periphery of the ring-shaped hollow section 4 by the centrifugal force. The balls 1 thus move stably along the inner wall of the external periphery. For this reason, the conventional balancer produces a sufficient effect. However, during intermediate-speed reproduction, during recording in particular, problems owing to the balancer are caused, instead of producing preferable results.

Embodiments will be described below.

During the spin-up process at the start of the disk drive, the rotation speed of the disk is raised from its stop state to a predetermined speed. As the rotation speed of the disk is raised, the centrifugal force applied to the magnetic ball 1 increases. When the centrifugal force applied to the magnetic ball 1 becomes larger than the magnetic attraction force of the magnet 8 as the result of the increase in rotation speed, the magnetic ball 1 separates from the magnet 8. The magnetic ball 1 then collides with the inner wall of the external periphery of the ring-shaped hollow section 4.

The impact caused at this time is applied to the disk 5.

In the case when the impact is applied during seek control, information on the disk cannot be read properly because of the impact, and traverse operation might become uncontrollable. If traverse operation becomes uncontrollable, the optical pickup collides with the internal or external periphery, whereby the optical pickup itself might be damaged physically.

In the case when an impact is applied in an on-track state (a state wherein the optical pickup is positioned on a predetermined track), the follow-up control (hereafter referred to as "servo") of the optical pickup for the disk might become ineffective because of the impact.

Furthermore, in the case when an impact is applied during the adjustments of the various parameters of the electric circuits related to the optical pickup, the parameters might be adjusted to improper values on the basis of abnormal waveforms owing to the impact. If the disk drive wherein the parameters have been adjusted to such improper values is operated, reproduction and recording might not be carried out properly in some cases. In a disk drive having a recording function in particular, parameters and the like required to be adjusted during the spin-up process are abundant in variety. For this reason, an impact applied during the adjustments might highly increase the possibility of causing seriously improper adjustments. In addition, the time for the adjustments of the parameters and the like during the spin-up process in the disk drive having the recording function is longer than the time for the adjustments in a disk drive used only for reproduction. Hence, the probability of impact application during the adjustments becomes high, thereby increasing the frequency of occurrence of problems in the disk drive because of impacts.

In the CAV mode, however, the centrifugal force applied to the magnetic ball 1 is nearly constant. For this reason, the above-mentioned problems do not occur in a state wherein the disk rotates steadily.

However, during reproduction, recording and seek operation in the CLV mode, the centrifugal force changes since the rotation speed of the disk at the time when the pickup is at the internal periphery of the disk differs from the rotation speed at the time when the pickup is at the external periphery. For this reason, when reproduction or the like is carried out at the internal periphery of the disk, the rotation speed of ti the disk is high and the centrifugal force is large. The magnetic balls 1 might roll along the external peripheral face of the ring-shaped hollow section 4. When reproduction or the like is carried out at the external periphery of the disk, the rotation speed of the disk is low. The magnetic balls 1 might be attracted by the magnet at the internal periphery of the ring-shaped hollow section 4 and might roll along the internal peripheral face.

In the above-mentioned cases, the relationship in magnitude between the centrifugal force applied to the magnetic ball 1 and the magnetic attraction force for attracting the magnetic ball 1 by the magnet 8 is reversed somewhere on the disk. For this reason, when the pickup passes through such a position on the disk, the magnetic ball 1 separates from the magnet 8 at the internal periphery and moves to the external periphery, or separates from the external periphery and is attracted by the magnet.

The above-mentioned unstable action of the magnetic ball 1 inside the ring-shaped hollow section 4 during reproduction or the like on the disk causes adverse effects on the disk drive. For example, the unstable action of the magnetic ball 1 inside the ring-shaped hollow section 4, including the collision of the magnetic ball 1 with the inner wall of the external or internal periphery of the ring-shaped hollow section 4, applies an impact to the disk. This results in a large disturbance in the focus system and the tracking system. In particular, the unstable action and the like of the magnetic ball during reproduction or recording might deteriorate the reading performance or the writing performance of the optical pickup, or might cause a disk tracking error or the like. If an impact is applied during seek operation, servo might become ineffective or might not be made effective.

When the rotation speed of the disk is high, the magnetic ball 1 moves along the external peripheral face of the ring-shaped hollow section 4 and is located stably at an optimum balance position. As a result, the balancer functions sufficiently and cancels the imbalance amount of the disk.

However, when the rotation speed of the disk is low, the magnetic ball 1 moves along the external peripheral face of the ring-shaped hollow section 4 and is located at an optimum balance position. However, since the magnetic ball is just pressed against the external peripheral wall face by a small centrifugal force, the magnetic ball might be moved along the external peripheral wall face by a small disturbance. If the magnetic ball 1 is moved unstably along the external peripheral wall of the ring-shaped hollow section 4 in this way, the magnetic ball 1 itself causes an imbalance, instead of eliminating such an imbalance.

To solve this problem, the distance between the external peripheral face 9 and the internal peripheral face (the external peripheral face of the magnet 8) of the ring-shaped hollow section 4 is made large in the case of a disk drive having a low rotation speed mode. With this configuration, the magnetic ball 1 is located stably at an optimum balance position on the external peripheral face of the ring-shaped hollow section 4 by a large centrifugal force during high-speed rotation. As a result, it is possible to obtain a significant balancer effect.

On the other hand, in the low-speed operation mode, the magnetic ball 1 is attracted to the external peripheral face of the magnetic 8 (the internal peripheral face of the ring-shaped hollow section 4), moves along the internal peripheral face and is located stably at an optimum balance position. Since the difference between the radius of the external peripheral face and that of the internal peripheral face is large, the inertia of the magnetic ball 1 positioned on the internal peripheral face, which is applied to the disk, is smaller than the inertia of the magnetic ball 1 positioned on the external peripheral face. For this reason, even if the magnetic ball moves along the internal peripheral face during low-speed operation, the effect of the movement is limited.

However, if the distance between the external peripheral face 9 and the internal peripheral face (the external peripheral face of the magnet 8) of the ring-shaped hollow section 4 is made too large, a large impact is applied to the optical pickup when the magnetic ball 1 collide with the external or internal peripheral face. This causes the above-mentioned various problems.

In view of the above-mentioned problems, the present invention is intended to provide means and methods for attaining the stability of the balancer at various recording and reproduction speeds, not attained by using only the configuration of the conventional example, thereby to ensure operation stability at various reproduction and recording speeds.

DISCLOSURE OF THE INVENTION

The invention in accordance with claim 1 of the present invention relates to a disk drive comprising:

a disk, an optical pickup for recording information on the disk or for reproducing information recorded on the disk, a balancer for movably accommodating one or plural magnetic balls in its ring-shaped hollow section and provided with a magnet for attracting the magnetic balls inside the ring-shaped hollow section, wherein the magnetic ball is separated from the magnet by rotating the disk in a state wherein the optical pickup is not processing an input signal derived from light reflected by the face of the disk and the optical pickup is not writing information on the disk.

In the conventional disk drive, no consideration is taken as to whether the magnetic ball has been attracted by the magnet, has positioned along the external periphery of the ring-shaped hollow section owing to a centrifugal force or is rolling unstably inside the ring-shaped hollow section.

In the present invention, attention is paid to the importance of eliminating the effect of the movement of the magnetic ball inside the ring-shaped hollow section on the disk drive, and the magnetic ball separation process is carried out as an independent process. As a result, the magnetic ball separation process can be separated from other processes. This prevents an impact from being applied to the disk during tracking servo control or during the adjustments of various parameters.

Hence, the present invention has an action capable of attaining a disk drive for stably carrying out reproduction, recording or seek operation on the disk.

Furthermore, the present invention prevents impact application during the servo adjustment of the optical pickup and the adjustments of various parameters that use an input signal derived from the light reflected by the face of the disk. The present invention prevents the disk drive from malfunctioning because of improper adjustment caused by an impact or the like from the magnetic ball. As a result, the present invention has an action capable of attaining a disk drive for stably carrying out reproduction, recording or seek operation on the disk.

Furthermore, the effect of the movement of the magnetic ball inside the ring-shaped hollow section on the disk drive is eliminated in the present invention. For this reason, even if a large impact is applied to the disk when the magnetic ball collides with the side wall of the ring-shaped hollow section, the control of the disk is not affected at all. Hence, the present invention has an action capable of increasing the difference between the diameter of the external peripheral face of the ring-shaped hollow section 4 and the diameter of the internal peripheral face thereof (the external peripheral face of the magnet).

As a result, during high-speed rotation, the magnetic ball 1 is stably positioned at an optimum balance position on the external peripheral face of the ring-shaped hollow section 4 by a strong centrifugal force. For this reason, it is possible to obtain a significant balancer effect.

On the other hand, during low-speed rotation, the magnetic ball 1 is attracted to the external peripheral face of the magnet 8. The balance of the disk drive is thus not affected adversely. Since the difference between the radius of the external peripheral face and that of the internal peripheral face is large, the inertia applied to the disk in the case when the magnetic ball 1 positions on the internal peripheral face is smaller than the inertia applied to the disk in the case when the magnetic ball 1 positions on the external peripheral face. As a result, even if the magnetic ball moves along the internal peripheral face, the effect of the movement is limited during the low-speed rotation.

In the present invention, impact application at the time when the magnetic ball is attracted by the magnet does not occur during recording in particular. It is thus possible to carry out stable recording.

Furthermore, even during seek operation, the magnetic ball does not move continuously along the external peripheral face of the ring-shaped hollow section 4, and the magnetic ball is not attracted by or separated from the magnet repeatedly. It is thus possible to carry out seek operation to a target position promptly.

"The state wherein the optical pickup is not processing the input signal derived from light reflected by the face of the disk and the optical pickup is not writing information on the disk" in the descriptions of the present specification and claims includes neither a state wherein the optical pickup reproduces information recorded on the disk nor a state wherein the optical pickup writes information on the disk. In addition, the above-mentioned "the state wherein the optical pickup is not carrying out processing" does not include a state wherein the optical pickup is carrying out seek operation or tracking on the basis of the positional information recorded on the disk.

This is because the optical pickup processes positional information which is the input signal derived from the light reflected by the face of the disk in a state wherein the optical pickup carries out seek operation.

Furthermore, the above-mentioned "the state wherein the optical pickup is not carrying out processing" does not include a state wherein the optical pickup is carrying out adjustment on the basis of the input signal derived from the light reflected by the face of the disk.

For example, the above-mentioned "the state wherein the optical pickup is not carrying out processing" does not include a state wherein the optical pickup is carrying out focus servo adjustment (the positional adjustment of the focus lens), tracking servo adjustment or the like on the basis of the input signal derived from the light reflected by the face of the disk.

This is because the optical pickup processes the input signal derived from the laser light reflected by the face of the disk even in these states.

In "the state wherein the optical pickup is not processing the input signal derived from light reflected by the face of the disk and the optical pickup is not writing information on the disk," even if the magnetic ball moves inside the ring-shaped hollow section, improper adjustment of the optical pickup, focus error, tracking error and the like are not caused. For this reason, the disk drive is not in danger of causing any malfunctions.

The expression "the magnetic ball is separated from the magnet by rotating the disk" generally means that the magnetic ball 1 is separated from the magnet 8 constituting the internal peripheral side wall of the ring-shaped hollow section 4 by raising the rotation speed of the disk.

In the conventional example and the embodiments of the present invention, the magnet constitutes the internal peripheral wall of the ring-shaped hollow section 4.

When the disk rotates at a high speed, the magnetic ball moves freely along the external peripheral side wall of the ring-shaped hollow section to an optimum disk balance point and positions there stably.

When the disk rotates at a low speed, the magnetic ball is attracted by the magnet constituting the internal peripheral side wall of the ring-shaped hollow section, and does not move freely. This prevents the magnetic ball from causing adverse effects on the disk balance, instead of causing an imbalance.

For convenience in better understanding the present invention, it is preferably assumed that the magnet constitutes the internal peripheral wall of the ring-shaped hollow section 4. However, the magnet is not necessarily required to constitute the internal peripheral wall of the ring-shaped hollow section 4. The magnet may constitute a part of the floor face of the ring-shaped hollow section, for example.

The invention in accordance with claim 2 of the present invention relates to a disk drive in accordance with claim 1, wherein the above-mentioned process of separating the magnetic ball from the magnet is carried out in a spin-up process at the start of the disk drive.

In the conventional example, the position of the magnetic ball in the ring-shaped hollow section is not known at the time when the spin-up process is completed. For this reason, the magnetic ball sometimes moves inside the ring-shaped hollow section during reproduction, recording or the like, thereby causing an adverse effect on the disk.

In the present invention, the magnetic ball is securely positioned along the external peripheral wall face of the ring-shaped hollow section by a centrifugal force when the spin-up process is completed. For this reason, in the case when reproduction, recording or seek operation on the disk is carried out after the spin-up process is completed, the present invention has an action capable of preventing an adverse effect caused by the movement of the magnetic ball inside the ring-shaped hollow section during reproduction or the like from occurring on the optical disk.

In addition, the process of separating the magnetic ball from the magnet is carried out during a process included in the spin-up process, wherein the output signal and the like of the optical pickup are not used. For this reason, the present invention has an action capable of attaining a disk drive that requires no special time for the process of separating the magnetic ball from the magnet.

The invention in accordance with claim 3 of the present invention relates to a disk drive comprising:

a disk, a balancer for movably accommodating one or plural magnetic balls in its ring-shaped hollow section and provided with a magnet for attracting the magnetic balls inside the ring-shaped hollow section, wherein in the case when the rotation speed of the disk is changed from a first rotation speed including the stop state of the disk to a second rotation speed higher than the first rotation speed, said case includes a case wherein after the rotation speed is raised from the first rotation speed to a third rotation speed higher than the second rotation speed, the third rotation speed is changed to the second rotation speed, and the magnetic ball separates from the magnet at the third rotation speed.

It is assumed for example that the position of the magnetic ball in the ring-shaped hollow section is unknown at the first rotation speed (including the stop state) (it is unknown as to whether the magnetic ball positions on the external peripheral side wall of the ring-shaped hollow section, positions on the internal peripheral side wall or is unstably moving inside the ring-shaped hollow section). It is also assumed for example that the second rotation speed is higher than the rotation speed f0 (Hz) at which the magnetic ball is attracted by the magnet and is lower than the rotation speed f1 (Hz) at which the magnetic ball separates from the magnet.

In this case, in the present invention, the rotation speed is not directly changed from the first rotation speed to the second rotation speed. The disk is rotated at the third rotation speed once (a rotation speed not less than the rotation speed f1 (Hz) at which the magnetic ball separates from the magnet) in order to securely position the magnetic ball on the external peripheral side wall of the ring-shaped hollow section. The rotation speed of the disk is then lowered to the second rotation speed, and the operation is shifted to a target operation, such as reproduction or recording on the disk.

As a result, the magnetic ball securely positions on the external peripheral side wall of the ring-shaped hollow section at the second rotation speed. Any disturbance that is caused for example when the magnetic ball suddenly collides with the side wall in the middle of reproduction or the like is prevented from occurring.

When the rotation speed is changed from a low rotation speed to a high rotation speed, the present invention has an action capable of attaining a disk drive for stably performing reproduction, recording or seek operation on the disk at the high rotation speed.

The present invention is effective in the case when a rotation speed mode of a disk drive having plural rotation speed modes is shifted to a high rotation speed mode. In addition, in a disk drive wherein the rotation speed of the disk is lowered or the rotation of the disk is stopped in the case when the optical pickup does not move from a track for a certain time or more in order to save electric power, the present invention is also effective when the power saving mode is shifted to the ordinary disk reproduction mode.

"The third rotation speed" in the descriptions of the present specification and claims does not always mean a specific rotation speed. In a disk drive wherein the behavior and the like of the magnetic ball is monitored, for example, in the case when the disk rotation speed is raised from the first rotation speed to the second rotation speed, the disk rotation speed is raised once to a rotation speed higher than the second rotation speed, and then lowered to the second rotation speed after the magnetic ball separates from the magnet. This case can also be included in the technical scope of the present invention.

The rotation speed at which the magnetic ball separates from the magnet is the third rotation speed. At the third rotation speed, the condition that the magnetic ball separates from the magnet is satisfied. As a result, the requirement of the present claim is satisfied.

The invention in accordance with claim 4 of the present invention relates to a disk drive comprising:

a disk, a balancer for movably accommodating one or plural magnetic balls in its ring-shaped hollow section and provided with a magnet for attracting the magnetic balls inside the ring-shaped hollow section, wherein at least one electric circuit parameter adjustment is carried out in a process wherein the magnetic ball is separated from the magnet by rotating the disk.

In the present invention, attention is paid to the importance of eliminating the effect of the movement of the magnetic ball inside the ring-shaped hollow section on the disk drive, and the separation process of the magnetic ball from the magnet is carried out as an independent process. As a result, the magnetic ball separation process can be separated from other processes. For this reason, the impact caused when the magnetic ball collides with the side wall of the ring-shaped hollow section is prevented from being applied to the disk during reproduction, recording or the adjustments of various parameters Furthermore, by carrying out the magnetic ball separation process and the adjustments of some parameters not affected by the collision or the like of the magnetic ball in parallel, the waiting time of the-user is prevented from increasing by the time of the magnetic ball separation process in the present invention.

The invention in accordance with claim 5 of the present invention relates to a disk drive in accordance with claim 4, wherein the parameter adjustments include laser power adjustment or optical pickup focus system adjustment.

Furthermore, by carrying out the magnetic ball separation process and laser power adjustment or optical pickup focus system adjustment not affected by the collision and the like of the magnetic ball in parallel, the waiting time of the user is prevented from increasing by the time of the magnetic ball separation process in the present invention.

The invention in accordance with claim 6 of the present invention relates to a disk drive comprising:

a disk, a balancer for movably accommodating one or plural magnetic balls in its ring-shaped hollow section and provided with a magnet for attracting the magnetic balls inside the ring-shaped hollow section, and an impact detection section for detecting an impact caused by the behavior of the magnetic ball.

In the present invention, by detecting the impact caused by the behavior of the magnetic ball, it is possible to know the current position of the magnetic ball (positional information on whether the magnetic ball positions on the external peripheral side wall of the ring-shaped hollow section, positions on the internal peripheral side wall of the ring-shaped hollow section or is moving unstably inside the ring-shaped hollow section).

For this reason, after the magnetic ball is securely positioned on the external peripheral side wall of the ring-shaped hollow section or on the internal peripheral side wall of the ring-shaped hollow section, it is possible to start reproduction or the like on the disk.

In the present invention, attention is paid to the importance of eliminating the effect of the movement of the magnetic ball inside the ring-shaped hollow section on the disk drive, and the positional information on the magnetic ball can be derived by detecting the impact of the magnetic ball. It is possible to prevent the collision of the magnetic ball during reproduction or the like on the disk on the basis of the positional information on the magnetic ball.

As a result, the present invention has an action capable of attaining a disk drive for stably carrying out reproduction, recording or seek operation on the disk.

In addition, the behavior of the magnetic ball can be detected. Furthermore, it is possible to set the timing of shift to recording and the timing of various control processes, such as optimization of a process immediately after seek operation. As a result, the present invention can provide a disk drive that can carry out recording and reproduction more stably and securely.

The invention in accordance with claim 7 of the present invention relates to a disk drive comprising:

a disk, a balancer for movably accommodating one or plural magnetic balls in its ring-shaped hollow section and provided with a magnet for attracting the magnetic balls inside the ring-shaped hollow section, an impact detection section for detecting an impact caused by the behavior of the magnetic ball, and a rotation speed detection section for detecting the rotation speed of the disk at the time of the detection of the impact.

In the present invention, attention is paid to the importance of eliminating the effect of the movement of the magnetic ball inside the ring-shaped hollow section on the disk drive, and the positional information on the magnetic ball can be derived by detecting the impact of the magnetic ball. It is possible to prevent the collision of the magnetic ball during reproduction or the like on the disk on the basis of the positional information on the magnetic ball.

As a result, the present invention has an action capable of attaining a disk drive for stably carrying out reproduction, recording or seek operation on the disk.

Furthermore, in accordance with the present invention, by detecting the rotation speed of the disk at the time when an impact is detected, it is possible to detect the rotation speed at which the magnetic ball separates from the magnet and the rotation speed at which the magnetic ball is attracted by the magnet.

Hence, it is possible to know the magnetic ball separation rotation speed and the magnetic ball attraction rotation speed for each disk drive. For this reason, after the magnetic ball is securely positioned on the external or internal peripheral side wall of the ring-shaped hollow section by raising or lowering the rotation speed to a necessary and sufficient rotation speed, it is possible to start reproduction or the like on the disk.

The present invention thus has an action capable of attaining a disk drive wherein the magnetic ball is separated from the magnet or attracted by the magnet by using the minimum time and energy and then reproduction, recording or seek operation on the disk is carried out stably.

The invention in accordance with claim 8 of the present invention relates to a disk drive in accordance with claim 1, 3, 4 or 7, further comprising:

an impact detection section for detecting an impact caused by the behavior of the magnetic ball, and a rotation speed detection section for detecting the rotation speed of the disk at the time of the detection of the impact, wherein the impact detection section detects the timing of the separation of the magnetic ball from the magnet, and the rotation speed detection section detects the rotation speed of the disk at the timing of the separation.

In the present invention, attention is paid to the importance of eliminating the effect of the movement of the magnetic ball inside the ring-shaped hollow section on the disk drive, and the timing of the separation of the magnetic ball from the magnet is detected by detecting the impact of the magnetic ball. Hence, in the case when the rotation speed of the disk is raised from a low speed to a high speed, it is possible to know that the magnetic ball has moved on the external peripheral side wall of the ring-shaped hollow section by detecting the timing of the separation.

As a result, it is possible to prevent the magnetic ball from causing collision during reproduction or the like on the disk. The present invention therefore has an action capable of attaining a disk drive for stably carrying out reproduction, recording or seek operation on the disk.

Furthermore, in the present invention, it is possible to detect the rotation speed at which the magnetic ball separates from the magnet by detecting the rotation speed of the disk at the timing of the separation.

Hence, it is possible to know the magnetic ball separation rotation speed for each disk drive. For this reason, after the magnetic ball is securely positioned on the external peripheral side wall of the ring-shaped hollow section by raising the rotation speed to a necessary and sufficient rotation speed, it is possible to start reproduction or the like on the disk.

The present invention thus has an action capable of attaining a disk drive wherein the magnetic ball is separated from the magnet by using the minimum time and energy and then reproduction, recording or seek operation on the disk is carried out stably.

The invention in accordance with claim 9, of the present invention relates to a disk drive in accordance with claim 7, wherein the impact detection section detects the timing of the attraction of the magnetic ball by the magnet, and the rotation speed detection section detects the rotation speed of the disk at the timing of the attraction.

In the present invention, attention is paid to the importance of eliminating the effect of the movement of the magnetic ball inside the ring-shaped hollow section on the disk drive, and the timing of the attraction of the magnetic ball by the magnet is detected by detecting the impact of the magnetic ball. Hence, in the case when the rotation speed of the disk is lowered from a high speed to a low speed, it is possible to know that the magnetic ball has moved on the internal peripheral side wall of the ring-shaped hollow section by detecting the timing of the attraction.

As a result, it is possible to prevent the magnetic ball from causing collision during reproduction or the like on the disk. The present invention therefore has an action capable of attaining a disk drive for stably carrying out reproduction, recording or seek operation on the disk.

Furthermore, it is possible to detect the rotation speed at which the magnetic ball is attracted by the magnet by detecting the rotation speed of the disk at the timing of the attraction.

Hence, it is possible to know the magnetic ball attraction rotation speed for each disk drive. For this reason, after the magnetic ball is securely positioned on the internal peripheral side wall of the ring-shaped hollow section by lowering the rotation speed to a necessary and sufficient rotation speed, it is possible to start recording or the like on the disk.

The present invention thus has an action capable of attaining a disk drive wherein the magnetic ball is attracted by the magnet by using the minimum time and energy and then reproduction, recording or seek operation on the disk is carried out stably.

The invention in accordance with claim 10 of the present invention relates to a disk drive in accordance with claim 7 or 9, wherein the impact detection section detects an impact on the basis of the output signal of the optical pickup.

The invention in accordance with claim 29 of the present invention relates to a disk drive in accordance with claim 8, wherein the impact detection section detects an impact on the basis of the output signal of the optical pickup.

In the present invention, a component originally provided in the disk drive is used as the impact detection section.

The present invention thus has an action capable of attaining an optical disk drive that is inexpensive, simply configured and equipped with a balancer having an impact detection section.

The invention in accordance with claim 11 of the present invention relates to a disk drive in accordance with claim 10, wherein the impact detection section detects an impact on the basis of the focus error signal or the tracking error signal of the optical pickup.

The invention in accordance with claim 30 of the present invention relates to a disk drive in accordance with claim 29, wherein the impact detection section detects an impact on the basis of the focus error signal or the tracking error signal of said optical pickup.

In the present invention, a component and an electric circuit originally provided in the disk drive is used as the impact detection section.

The present invention thus has an action capable of attaining an optical disk drive that is inexpensive, simply configured and equipped with a balancer having an impact detection section.

The invention in accordance with claim 12 of the present invention relates to a disk drive in accordance with claim 7 or 9, wherein the impact detection section is a piezoelectric ceramic sensor.

The invention in accordance with claim 31 of the present invention relates to a disk drive in accordance with claim 8, wherein the impact detection section is a piezoelectric ceramic sensor.

In accordance with the present invention, by using a sensor provided only for impact detection, the time for the detection process is not limited. In other words, it is possible to measure the magnetic ball separation or attraction rotation speed at any time regardless of any process being carried out on the disk. In addition, it is possible to provide a detection section that is relatively inexpensive and excellent in detection accuracy.

The present invention thus has an action capable of attaining an optical disk drive that is inexpensive, simply configured and equipped with a balancer having an impact detection section.

The invention in accordance with claim 13 of the present invention relates to a disk drive comprising:

a disk, a balancer for movably accommodating one or plural magnetic balls in its ring-shaped hollow section and provided with a magnet for attracting the magnetic balls inside the ring-shaped hollow section, wherein in the case when the rotation speed of the disk is changed from a first rotation speed to a second rotation speed lower than the first rotation speed, the above-mentioned case includes a case wherein after the rotation speed is lowered from the first rotation speed to a third rotation speed lower than the second rotation speed, the third rotation speed is changed to the second rotation speed, and the magnetic ball is attracted by the magnet at the third rotation speed.

It is assumed for example that the position of the magnetic ball in the ring-shaped hollow section is unknown at the first rotation speed (it is unknown as to whether the magnetic ball positions on the external peripheral side wall of the ring-shaped hollow section, positions on the internal peripheral side wall thereof or is unstably moving inside the ring-shaped hollow section). It is also assumed for example that the second rotation speed is higher than the rotation speed f0 (Hz) at which the magnetic ball is attracted by the magnet and is lower than the rotation speed f1 (Hz) at which the magnetic ball separates from the magnet.

In this case, in the present invention, the rotation speed is not directly changed from the first rotation speed to the second rotation speed. The disk is rotated at the third rotation speed once (a rotation speed not more than the rotation speed f0 (Hz) at which the magnetic ball is attracted by the magnet) in order to securely position the magnetic ball on the internal peripheral side wall of the ring-shaped hollow section (the external periphery of the magnet). The rotation speed of the disk is then raised to the second rotation speed, and the operation is shifted to a target operation, such as reproduction or recording on the disk.

As a result, the magnetic ball securely positions on the internal peripheral side wall of the ring-shaped hollow section at the second rotation speed. Any disturbance that is caused for example when the magnetic ball suddenly collides with the side wall in the middle of recording or the like is prevented from occurring.

When the rotation speed is changed from a high rotation speed to a low rotation speed, the present invention has an action capable of attaining a disk drive for stably performing reproduction, recording or seek operation on the disk at the low rotation speed.

"The third rotation speed" in the descriptions of the present specification and claims does not always mean a specific rotation speed. In a disk drive wherein the behavior and the like of the magnetic ball is monitored, for example, in the case when the disk rotation speed is lowered from the first rotation speed to the second rotation speed, the disk rotation speed is lowered once to a rotation speed lower than the second rotation speed, and then raised to the second rotation speed after the magnetic ball is attracted by the magnet. This case can also be included in the technical scope of the present invention.

The rotation speed at which the magnetic ball is attracted by the magnet is the third rotation speed. At the third rotation speed, the condition that the magnetic ball is attracted by the magnet is satisfied. As a result, the requirement of the present claim is satisfied.

The invention in accordance with claim 14 of the present invention relates to a disk drive comprising:

a disk, a balancer for movably accommodating one or plural magnetic balls in its ring-shaped hollow section and provided with a magnet for attracting the magnetic balls inside the ring-shaped hollow section, wherein in the case when reproduction or recording is carried out continuously in a region from a position to another position on the disk, when the maximum value of the disk rotation speed in the region is lower than a separation rotation speed at which the magnetic ball separates from the magnet and higher than an attraction rotation speed at which the magnetic ball is attracted by the magnet, and when the minimum value of the disk rotation speed in the region is the attraction rotation speed or less, said case includes a case wherein the rotation speed of the disk is set at the attraction rotation speed or less before reproduction or recording.

In the case when the maximum value of the disk rotation speed in a desired region for recording or the like is lower than the separation rotation speed at which the magnetic ball separates from the magnet and higher than the attraction rotation speed at which the magnetic ball is attracted by the magnet, and when the minimum value of the disk rotation speed in the region is the attraction rotation speed or less, the present invention has a case wherein the spindle motor is controlled so that the disk rotation speed becomes the attraction rotation speed or less before reproduction or recording, and then the rotation speed is set at a desired rotation speed for reproduction or recording.

As a result, the magnetic ball securely positions on the internal peripheral side wall of the ring-shaped hollow section during continuous recording or the like in the region. For this reason, any disturbance that is caused for example when the magnetic ball suddenly collides with the side wall in the middle of recording or the like is prevented from occurring. Hence, the present invention has an action capable of attaining a disk drive for stably performing reproduction, recording or seek operation on the disk.

In the case when the magnetic ball positions on the internal peripheral side wall of the ring-shaped hollow section from the beginning, it is not necessary to lower the rotation speed of the spindle motor to the attraction rotation speed or less. The meaning of the expression "the present invention includes the case wherein the rotation speed is set at the attraction rotation speed or less" is used in consideration of this case.

The invention in accordance with claim 15 of the present invention relates to a disk drive in accordance with claim 14, wherein The relationship expression of f0×{(the rotation speed at the innermost periphery)/(the rotation speed at the outermost periphery)}<f1 is established, wherein f1 designates the rotation speed at which the magnetic ball separates and f0 designates the rotation speed at which the magnetic ball is attracted.

In the present invention, in a disk drive having the CLV mode in particular, recording, reproduction or the like on the disk can be carried out stably regardless of the linear speed during recording, reproduction or the like. This stable operation is made possible by properly making a selection as to whether the magnetic ball is positioned on the external peripheral side wall of the ring-shaped hollow section or the internal peripheral side wall thereof (a state wherein the magnetic ball is attracted by the magnet) at the linear speed.

Even if recording (or reproduction or the like) is carried out continuously from the beginning to the end on the disk for example, the magnetic ball does not move inside the ring-shaped hollow section or collide with the side wall thereof during the recording (or reproduction or the like).

As a result, the present invention has an action capable of attaining a disk drive for stably carrying out reproduction, recording or seek operation on the disk.

The invention in accordance with claim 16 of the present invention relates to a disk drive in accordance with claim 14 or 15, comprising:

an impact detection section for detecting an impact caused by the behavior of the magnetic ball, and a rotation speed detection section for detecting the rotation speed of the disk at the time of the detection of the impact, wherein the impact detection section detects the timing of the separation of the magnetic ball from the magnet, and the rotation speed detection section detects the rotation speed of the disk at the timing of the separation, and the impact detection section detects the timing of the attraction of the magnetic ball by the magnet, and the rotation speed detection section detects the rotation speed of the disk at the timing of the attraction.

In the present invention, attention is paid to the importance of eliminating the effect of the movement of the magnetic ball inside the ring-shaped hollow section on the disk drive, and the timing of the separation of the magnetic ball from the magnet and the timing of the attraction of the magnetic ball by the magnet are detected by detecting the impact of the magnetic ball. Hence, in the case when the rotation speed of the disk is raised to a low speed to a high speed and in the case when the rotation speed of the disk is lowered from a high speed to a low speed, it is possible to know that the magnetic ball has moved on the external or internal peripheral side wall of the ring-shaped hollow section by detecting the timing of the separation and the timing of the attraction.

By securely detecting the two stable positions of the magnetic ball inside the ring-shaped hollow section as described above, it is possible to prevent the magnetic ball from causing collision during reproduction or the like on the disk. The present invention therefore has an action capable of attaining a disk drive for stably carrying out reproduction, recording or seek operation on the disk.

Furthermore, it is possible to detect the rotation speed at which the magnetic ball separates from the magnet and the rotation speed at which the magnetic ball is attracted by the magnet by detecting the rotation speed of the disk at the timing of the separation and the rotation speed of the disk at the timing of the attraction.

Hence, it is possible to know the magnetic ball separation rotation speed and the magnetic ball attraction rotation speed for each disk drive. For this reason, after the magnetic ball is securely positioned on the external or internal peripheral side wall of the ring-shaped hollow section by raising or lowering the rotation speed to a necessary and sufficient rotation speed, it is possible to start recording or the like on the disk.

The present invention thus has an action capable of attaining a disk drive wherein the magnetic ball is separated from or attracted by the magnet by using the minimum time and energy, and then reproduction, recording or seek operation on the disk is carried out stably.

Since it is possible to set an appropriate magnetic ball separation rotation speed and an appropriate magnetic ball attraction rotation speed, not affected by the variation in the magnetic attraction force exerted between the magnet and the magnetic ball from one disk drive to another, more stable control can be attained.

The invention in accordance with claim 17 of the present invention relates to a disk drive comprising:

a balancer for movably accommodating one or plural magnetic balls in its ring-shaped hollow section and provided with a magnet for attracting the magnetic balls inside the ring-shaped hollow section, and a behavior detection section for detecting the behavior of the magnetic ball.

In the present invention, it is possible to detect the static and dynamic behavior of the magnetic ball inside the ring-shaped hollow section. As a result, it is possible to know the position of the magnetic ball inside the ring-shaped hollow section more accurately.

In accordance with the present invention, it is possible to prevent the magnetic ball from causing collision during recording or the like on the disk by starting recording or the like on the disk after it is detected that the magnetic ball has moved to the external or internal peripheral side wall of the ring-shaped hollow section.

In addition, in the present invention, it is possible to carry out detection as to whether the magnetic ball is moving on the external peripheral side wall of the ring-shaped hollow section or have positioned stably at an optimum balance position.

The present invention thus has an action capable of attaining a disk drive for stably carrying out reproduction, recording or seek operation on the disk.

The invention in accordance with claim 18 of the present invention relates to a disk drive in accordance with claim 17, wherein the housing of the ring-shaped hollow section is formed of a transparent material, and the behavior detection section is a photosensor.

In the present invention, it is possible to detect the static and dynamic behavior of the magnetic ball inside the ring-shaped hollow section by using the photosensor, i.e., a relatively inexpensive and space-saving detection device. As a result, it is possible to know the position of the magnetic ball in the ring-shaped hollow section more accurately.

In accordance with the present invention, it is possible to prevent the magnetic ball from causing collision during recording or the like on the disk by starting recording or the like on the disk after the magnetic ball is detected to have moved to the external or internal peripheral side wall of the ring-shaped hollow section.

The present invention thus has an action capable of attaining a disk drive for stably carrying out reproduction, recording or seek operation on the disk.

The invention in accordance with claim 19 of the present invention relates to a disk drive in accordance with claim 18, wherein the housing of the ring-shaped hollow section has a light-gathering section.

Since the lens section is provided between the photosenso and the magnetic ball, accurate detection can be attained, and the spacing (operation distance) between the magnetic ball and the photosensor can be set as desired by changing the shape of the lens.

The invention in accordance with claim 20 of the present invention relates to a disk drive in accordance with claim 17, wherein the housing of the ring-shaped hollow section is formed of a nonmetallic material, and the behavior detection section is an electrostatic capacitance type sensor.

The material of the ring-shaped hollow section 4 can thus be selected from a wider range of materials. Furthermore, by using the electrostatic capacitance type sensor, which is generally high in sensitivity, it is possible to obtain higher accuracy in the behavior detection of the magnetic ball.

The invention in accordance with claim 21 of the present invention relates to a disk drive in accordance with claim 17, wherein a determination is made as to whether the magnetic ball is rolling along the external peripheral face of the ring-shaped hollow section or not by comparing the period of the output signal of the behavior detection section with the period of the output signal of a rotation speed detection section for detecting the rotation speed of the disk.

In the present invention, it is possible to confirm the behavior of the magnetic ball in the circumferential direction by using simple electric circuits and criteria.

The present invention thus has an action capable of attaining a disk drive that can easily carry out detection as to whether the magnetic ball is stationary at an optimum balance position inside the ring-shaped hollow section or still moving.

The invention in accordance with claim 22 of the present invention relates to a disk drive in accordance with claim 17, wherein a determination is made as to whether the magnetic ball has been attracted by the magnet or not on the basis of the output signal of the behavior detection section.

The invention thus has an action capable of attaining a disk drive that can detect the behavior of the magnetic ball in the radial direction by using simple electric circuits and criteria.

The invention in accordance with claim 23 of the present invention relates to a disk drive in accordance with claim 17, wherein a determination is made as to whether the magnetic ball is rolling along the external peripheral face of the ring-shaped hollow section or not by comparing the period of the output signal of the behavior detection section with the period of the output signal of the rotation speed-detection section for detecting the rotation speed of the disk, another determination is made as to whether the magnetic ball has been attracted by the magnet or not on the basis of the output signal of the behavior detection signal, and the operation mode is shifted to reproduction or recording after the two determinations are made.

In the present invention, it is possible to start recording and reproduction after securely detecting that the magnetic ball has been attracted by the magnet or has positioned stably at an optimum balance position on the external peripheral side wall. As a result, no impact is applied during recording and reproduction. The present invention thus has an action capable of attaining a disk drive for stably carrying out reproduction, recording or seek operation on the disk.

The invention in accordance with claim 24 of the present invention relates to a disk drive in accordance with claim 1, 3, 4 or 17, further comprising:

a behavior detection section for detecting the behavior of the magnetic ball, and a rotation speed detection section for detecting the rotation speed of the disk, wherein the behavior detection section detects the timing of the separation of the magnetic ball from the magnet, and the rotation speed detection section detects the rotation speed of the disk at the timing of the separation.

In the present invention, attention is paid to the importance of eliminating the effect of the movement of the magnetic ball inside the ring-shaped hollow section on the disk drive, and the timing of the separation of the magnetic ball from the magnet is detected by detecting the behavior of the magnetic ball. Hence, in the case when the rotation speed of the disk is raised from a low speed to a high speed, it is possible to know that the magnetic ball has moved on the external peripheral side wall of the ring-shaped hollow section by detecting the timing of the separation.

By securely detecting the position of the magnetic ball inside the ring-shaped hollow section as described above, it is possible to prevent the magnetic ball from causing collision during reproduction or the like on the disk. The present invention therefore has an action capable of attaining a disk drive for stably carrying out reproduction, recording or seek operation on the disk.

Furthermore, it is possible to detect the rotation speed at which the magnetic ball separates from the magnet by detecting the rotation speed of the disk at the timing of the separation.

Hence, it is possible to know the magnetic ball separation rotation speed for each disk drive. For this reason, after the magnetic ball is securely positioned on the external peripheral side wall of the ring-shaped hollow section by raising the rotation speed to a necessary and sufficient rotation speed, it is possible to start recording or the like on the disk.

The present invention thus has an action capable of attaining a disk drive wherein the magnetic ball is separated from the magnet by using the minimum time and energy, and then reproduction, recording or seek operation on the disk is carried out stably.

Since it is possible to set an appropriate magnetic ball separation rotation speed, not affected by the variation in the magnetic attraction force exerted between the magnet and the magnetic ball from one disk drive to another, more stable control can be attained.

The invention in accordance with claim 25 of the present invention relates to a disk drive in accordance with claim 17, further comprising:

a rotation speed detection section, wherein the behavior detection section detects the timing of the attraction of the magnetic ball by the magnet, and the rotation speed detection section detects the rotation speed of the disk at the timing of the attraction.

In the present invention, attention is paid to the importance of eliminating the effect of the movement of the magnetic ball inside the ring-shaped hollow section on the disk drive, and the timing of the attraction of the magnetic ball by the magnet is detected by detecting the behavior of the magnetic ball. Hence, in the case when the rotation speed of the disk is lowered from a high speed to a low speed, it is possible to know that the magnetic ball has moved on the internal peripheral side wall of the ring-shaped hollow section by detecting the timing of the attraction.

By securely detecting the position of the magnetic ball inside the ring-shaped hollow section, it is possible to prevent the magnetic ball from causing collision during reproduction or the like on the disk. The present invention therefore has an action capable of attaining a disk drive for stably carrying out reproduction, recording or seek operation on the disk.

Furthermore, it is possible to detect the rotation speed at which the magnetic ball is attracted by the magnet by detecting the rotation speed of the disk at the timing of the attraction.

Hence, it is possible to know the magnetic ball attraction rotation speed for each disk drive. For this reason, after the magnetic ball is securely positioned on the internal peripheral side wall of the ring-shaped hollow section by lowering the rotation speed to a necessary and sufficient rotation speed, it is possible to start recording or the like on the disk.

The present invention thus has an action capable of attaining a disk drive wherein the magnetic ball is attracted by the magnet by using the minimum time and energy, and then reproduction, recording or seek operation on the disk is carried out stably.

Since it is possible to set an appropriate magnetic ball attraction rotation speed, not affected by the variation in the magnetic attraction force exerted between the magnet and the magnetic ball from one disk drive to another, more stable control can be attained.

The invention in accordance with claim 26 of the present invention relates to a disk drive in accordance with claim 24, wherein the behavior detection section detects the timing of the separation of the magnetic ball from the magnet, the rotation speed detection section detects the rotation speed of the disk at the timing of the separation, the behavior detection section detects the timing of the attraction of the magnetic ball by the magnet, and the rotation speed detection section detects the rotation speed of the disk at the timing of the attraction.

In the present invention, attention is paid to the importance of eliminating the effect of the movement of the magnetic ball inside the ring-shaped hollow section on the disk drive, and the timing of the separation of the magnetic ball from the magnet and the timing of the attraction of the magnetic ball by the magnet are detected by detecting the behavior of the magnetic ball. Hence, in the case when the rotation speed of the disk is raised from a low speed to a high speed and in the case when the rotation speed of the disk is raised from a high speed to a low speed, it is possible to know that the magnetic ball has moved on the external or internal peripheral side wall of the ring-shaped hollow section by detecting the timing of the separation and the timing of the attraction, respectively.

By securely detecting the two stable positions of the magnetic ball inside the ring-shaped hollow section, it is possible to prevent the magnetic ball from causing collision during reproduction or the like on the disk. The present invention therefore has an action capable of attaining a disk drive for stably carrying out reproduction, recording or seek operation on the disk.

Furthermore, it is possible to detect the rotation speed at which the magnetic ball separates from the magnet and the rotation speed at which the magnetic ball is attracted by the magnet by detecting the rotation speed of the disk at the timing of the separation and by detecting the rotation speed of the disk at the timing of the attraction, respectively.

Hence, it is possible to know the magnetic ball separation rotation speed and the magnetic ball attraction rotation speed for each disk drive. For this reason, after the magnetic ball is securely positioned on the external or internal peripheral side wall of the ring-shaped hollow section by raising or lowering the rotation speed to a necessary and sufficient rotation speed, it is possible to start recording or the like on the disk.

The present invention thus has an action capable of attaining a disk drive wherein the magnetic ball is separated from the magnet or attracted by the magnet by using the minimum time and energy, and then reproduction, recording or seek operation on the disk is carried out stably.

Since it is possible to set an appropriate magnetic ball separation rotation speed and an appropriate magnetic ball attraction rotation speed, not affected by the variation in the magnetic attraction force exerted between the magnet and the magnetic ball from one disk drive to another, more stable control can be attained.

The invention in accordance with claim 27 of the present invention relates to a method for controlling a disk drive comprising:

a disk, a balancer for movably accommodating one or plural magnetic balls in its ring-shaped hollow section and provided with a magnet for attracting the magnetic balls inside the ring-shaped hollow section, in the case when the rotation speed of the disk is changed from a first rotation speed including the stop state of the disk to a second rotation speed higher than the first rotation speed, the method comprising:

a step for raising the rotation speed from the first rotation speed to a third rotation speed higher than the second rotation speed, and a step for lowering the rotation speed from the third rotation speed to the second rotation speed, wherein the magnetic ball separates from the magnet at the third rotation speed.

In the present invention, the rotation speed is not directly changed from the first rotation speed to the second rotation speed. The disk is rotated at the third rotation speed once (a rotation speed not less than the rotation speed f1 (Hz) at which the magnetic ball separates from the magnet) in order to securely position the magnetic ball on the external peripheral side wall of the ring-shaped hollow section. The rotation speed of the disk is then lowered to the second rotation speed, and the operation is shifted to a target operation, such as reproduction or recording on the disk.

As a result, the magnetic ball securely positions on the external peripheral side wall of the ring-shaped hollow section at the second rotation speed. Any disturbance that is caused for example when the magnetic ball suddenly collides with the side wall in the middle of reproduction or the like is prevented from occurring.

When the rotation speed is changed from a low rotation speed to a high rotation speed, the present invention has an action capable of attaining a method for controlling a disk drive for stably performing reproduction, recording or seek operation on the disk at the high rotation speed.

The invention in accordance with the present claim does not mean that when the rotation speed is changed from the first rotation speed to the second rotation speed higher than the first rotation speed, the first rotation speed is always shifted to the second rotation speed after the rotation speed is raised to the third rotation speed. If there is at least one case wherein the first rotation speed is changed to the second rotation speed after the rotation speed is raised to the third rotation speed, this case is included in the technical scope of the present invention.

If the magnetic ball has already positioned securely on the external peripheral side wall of the ring-shaped hollow section at the first rotation speed, it is not necessary to take the above-mentioned step. When the magnetic ball positions on the internal peripheral side wall of the ring-shaped hollow section or when it is unknown where the magnetic ball positions inside the ring-shaped hollow section, it is possible to securely position the magnetic ball on the external peripheral side wall of the ring-shaped hollow section by virtue of the present invention.

The invention in accordance with claim 28 of the present invention relates to a method for controlling a disk drive comprising:

a disk, a balancer for movably accommodating one or plural magnetic balls in its ring-shaped hollow section and provided with a magnet for attracting the magnetic balls inside the ring-shaped hollow section, in the case when the rotation speed of the disk is changed from a first rotation speed to a second rotation speed lower than the first rotation speed, the method comprising:

a step for lowering the rotation speed from the first rotation speed to a third rotation speed lower than the second rotation speed, and a step for raising the rotation speed from the third rotation speed to the second rotation speed, wherein the magnetic ball is attracted by the magnet at the third rotation speed.

In the present invention, the rotation speed is not directly changed from the first rotation speed to the second rotation speed. The disk is rotated at the third rotation speed once (a rotation speed not more than the rotation speed f0 (Hz) at which the magnetic ball is attracted by the magnet) in order to securely position the magnetic ball on the internal peripheral side wall of the ring-shaped hollow section (the external periphery of the magnet). The rotation speed of the disk is then raised to the second rotation speed, and the operation is shifted to a target operation, such as reproduction or recording on the disk.

As a result, the magnetic ball securely positions on the internal peripheral side wall of the ring-shaped hollow section at the second rotation speed. Any disturbance that is caused for example when the magnetic ball suddenly collides with the side wall in the middle of recording or the like is prevented from occurring.

When the rotation speed is changed from a high rotation speed to a low rotation speed, the present invention has an action capable of attaining a method for controlling a disk drive for stably performing reproduction, recording or seek operation on the disk at the low rotation speed.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 3 is a flowchart of a spin-up process for a disk drive in accordance with a third embodiment of the present invention;

FIG. 9 is a side sectional view showing the configuration of the balancer of the disk drive in accordance with the fourth embodiment of the present invention;

FIG. 14 is a table indicating the reproduction and recording speeds and the ranges of the disk rotation speeds in the CLV mode of a disk drive in accordance with a sixth embodiment of the present invention;

FIG. 16 is a graph showing the relationship between the magnetic attraction force and the centrifugal force in accordance with the sixth embodiment of the present invention;

FIG. 22A is a detailed sectional view showing the clamper of the disk drive in accordance with the seventh embodiment of the present invention, and FIG. 22B is a plain view of the clamper;

FIGS. 24A to 24D are graphs showing the output signal of the photosensor and the FG signal of the disk drive in accordance with the seventh embodiment of the present invention;

It will be recognized that some or all of the Figures are schematic representations for purposes of illustration and do not necessarily depict the actual relative sizes or locations of the elements shown.

BEST MODE FOR CARRYING OUT THE INVENTION

Embodiments in accordance with the present invention will be described below.

<Embodiment 1>

Figure 1:
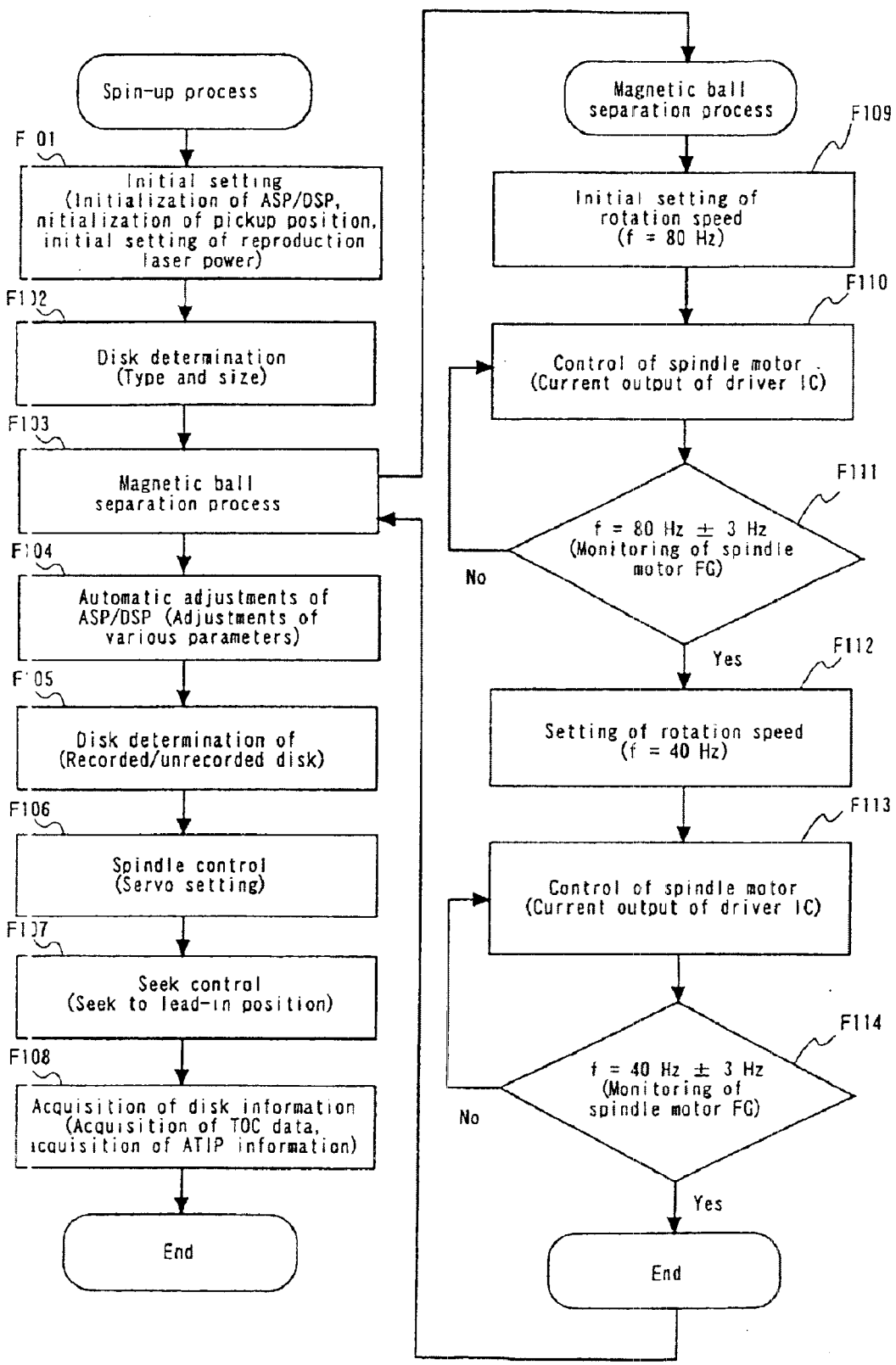
FIG. 1 is a flowchart of a spin-up process for a disk drive in accordance with a first embodiment of the present invention.
Figure 28:
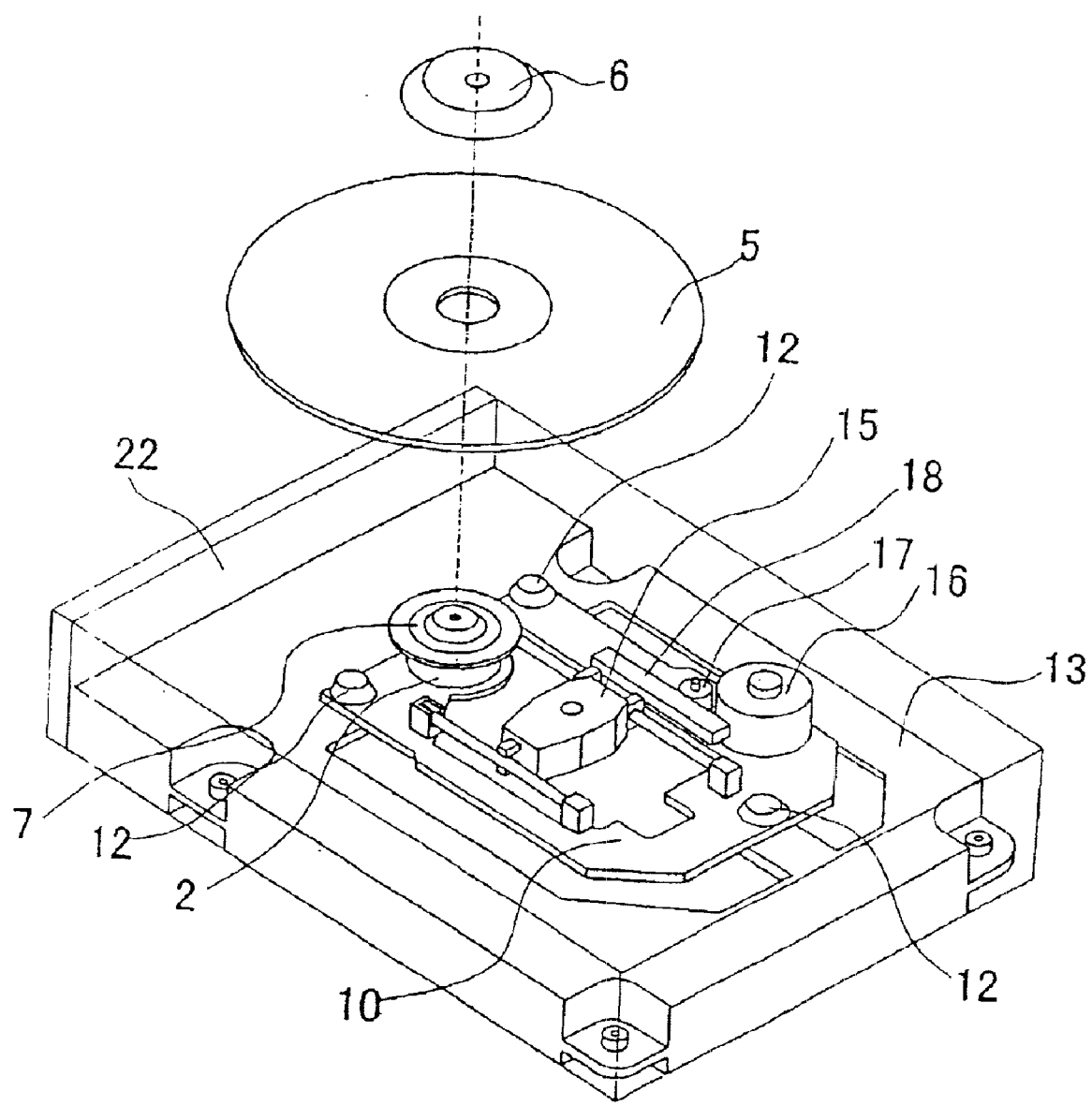
FIG. 28 is a schematic perspective view showing a disk drive in accordance with the conventional example and the present invention.

FIG. 1 and FIG. 28 show a first embodiment of the present invention.

<Explanation of FIG. 1>

FIG. 1 is a flowchart of a spin-up process at the start of a disk drive in accordance with the first embodiment of the present invention. In addition, FIG. 28 is a perspective view showing the disk drive of the present invention.

The disk drive of the present invention includes a microcomputer and carries out the process of the flowchart shown in FIG. 1 by using the microcomputer.

The flowchart of FIG. 1 will be described below referring to FIG. 28.

Figure 29:
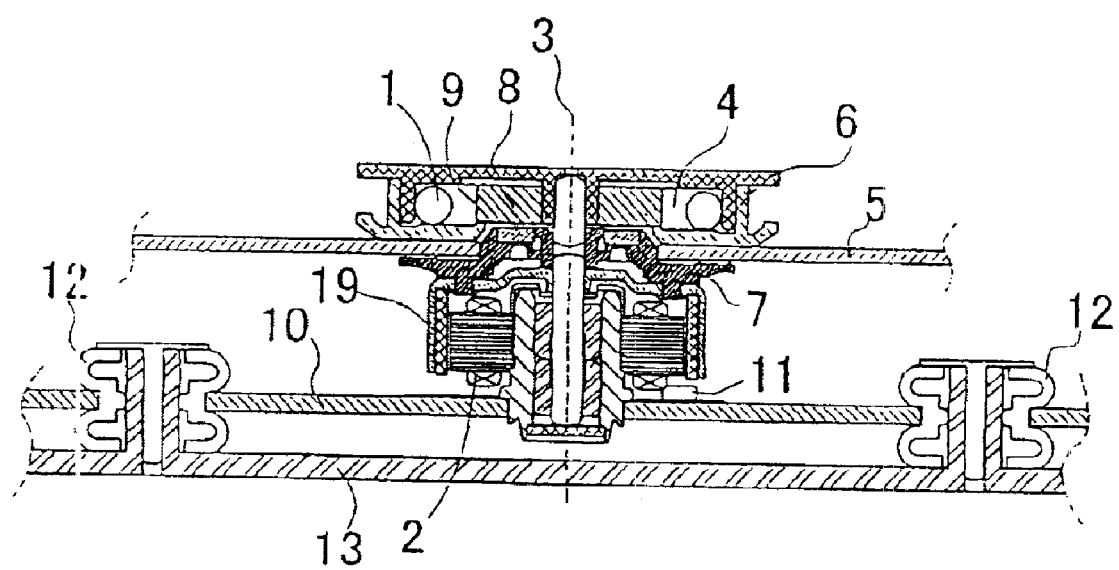
FIG. 29 is a side sectional view showing the configuration of a balancer of the disk drive in accordance with the conventional example and the present invention.

The basic configuration of the balancer of this embodiment is similar to that of the conventional example shown in FIG. 29.

When a disk 5 is inserted into a disk drive 22, a spin-up process starts.

At step F101, the predetermined parameters of ASP and DSP are first set at initial values as initial setting. The initial values are data obtained when power calibration is carried out at the spin-up process of the last time. The data has been stored in the nonvolatile memory of the disk drive. The output of a laser for reproduction can be emitted from the object lens of an optical pickup 15 by the initial setting.

Furthermore, driven by a traverse mechanism comprising a DC motor 16, a rack 18, a pinion gear 17, etc., the optical pickup 15 moves to a predetermined position. Generally, the optical pickup 15 moves to the internal peripheral side of the disk 5. At this stage, the optical pickup has not yet read positional information recorded on the disk.

Next, at step F102, determinations are made as to whether the disk 5 is present or not and whether the type of the disk is a high-reflection disk, such as CD-R and CD-ROM, or a low-reflection disk, such as CD-RW. Such determinations are made depending on the intensity of the light reflected by the disk when the light emitted from the semiconductor laser of the optical pickup 15 is applied to the disk.

Furthermore, when the disk 5 has been inserted into the disk drive 22, a spindle motor 2 is driven at a constant voltage for a short time, about 0.5 seconds. The size of the disk is determined on the basis of the rotation speed attained depending on the inertia of the disk 5 at that time.

Conventionally, automatic adjustments for setting the parameters of ASP and DSP are carried out next. In the present invention, however, a magnetic ball separation process step F103, a feature of the present invention, is carried out here.

At step F103, a centrifugal force is generated by rotating the disk at a rotation speed higher than a predetermined speed. As a result, magnetic balls in a ring-shaped hollow section are separated from a magnet and positioned on the external peripheral side wall of the ring-shaped hollow section.

At the next step F104, the automatic adjustments of the various electrical parameters of ASP and DSP are carried out. Variations in the optical pickup 15 and the electric circuits from one disk drive to another, such as electrical offsets and gains, balances and the like, are adjusted and corrected, for example. The adjustments of the electric circuits are completed for the first time by this step. As a result, information recorded on the disk 5 can be read, and information can be recorded on the disk 5.

At the next step F105, the laser light of the optical pickup 15 is emitted to the disk 5, and the light reflected by the disk 5 is detected. A determination is then made as to whether information has been recorded on the disk 5 or not depended on the level of the reflected light.

At the next step F106, the spindle motor 2 is rotated synchronously, whereby it is possible to control the spindle motor 2 in synchronization with the disk 5. The disk is thus rotated at a predetermined rotation speed.

At the next step F107, the optical pickup reads positional information recorded on the disk, and the optical pickup carries out seek operation to gain access to the TOC information position on the disk 5.

At the next step F108, the TOC information recorded on the disk is read. After this, the optical pickup 15 is ordered to be on standby at the 2-second position of the absolute address in the region of user data so that the disk drive is ready to accept commands from the host.

The disk drive then carries out reproduction, recording, seek operation, etc. in accordance with the commands of the user.

The magnetic ball separation process (F103), a feature of the present invention, will be described here.

In FIG. 29, the magnetic ball separation process (F103) is carried out to separate the magnetic balls 1 magnetically attracted by the magnet 8 inside the damper 6 from the magnet 8 by using the centrifugal force generated by the rotation of the disk.

The Hall device 11 mounted near the rotor magnet 19 of the spindle motor 2 detects the rotation of the spindle motor 2, and outputs a frequency generation signal (an FG signal) in proportion to the rotation speed. The disk drive controls the spindle motor 2 on the basis of the FG signal so that the rotation speed of the disk becomes a predetermined rotation speed.

The FG signal can take any value if it is an integral multiple of the rotation speed. However, in this embodiment (as well as other embodiments), the Hall device outputs one pulse for one disk rotation. Accordingly, in this embodiment, the frequency of the FG signal coincides with the rotation speed of the disk. Although the frequency of the FG signal and the rotation speed of the disk are used in the following descriptions, the values of both are coincident with each other at all times.

The detailed flow of the magnetic ball separation process step F103 shown in FIG. 1 will be described below.

In the magnetic ball separation process step F103, when the rotation speed of the disk is changed from its stop state to a target FG signal=40 Hz, the rotation speed of the disk is raised once to an FG signal=80 Hz, a rotation speed higher than 40 Hz. The rotation speed of the FG signal=80 Hz generates a centrifugal force sufficient to separate the magnetic balls 1 from the magnet 8 and to move them to the external peripheral side wall of the ring-shaped hollow section 4. After the rotation speed of the disk is raised to the FG signal=80 Hz, the rotation speed of the disk is lowered to the FG signal=40 Hz, i.e., a final target.

At steps F109 to F111, the rotation speed of the spindle motor is raised to a rotation speed at which the magnetic balls 1 separate from the magnet 8 (FG signal=80 Hz in FIG. 1) or a higher rotation speed, thereby to separate the magnetic balls 1 from the magnet 8.

At step F109, the target rotation speed of the disk drive is set at the FG signal=80 Hz.

At steps F110 and F111, a current is flown to the driver IC of the spindle motor to carry out control so that the frequency of the FG signal of the spindle motor becomes 80 Hz±3 Hz. The rotation speed of the spindle motor 2 is gradually raised from its stop state, and the frequency of the FG signal of the spindle motor finally reaches 80 Hz±3 Hz.

When the frequency of the FG signal is 80 Hz, the centrifugal force applied to the magnetic ball 1 becomes larger than the attraction force of the magnet 8, and the magnetic ball 1 is moved toward the external periphery of the ring-shaped hollow section 4. The magnetic ball 1 having been moved to the external periphery by the above-mentioned process is not attracted again by the magnet 8, even if the rotation speed of the spindle motor is lowered somewhat, unless the rotation speed is lowered extremely to the extent that the centrifugal force becomes insufficient.

Next, the sequence advances to steps from step F112 to F114.

At step F112 to F114, in order to carry out the automatic adjustments of various parameters to be processed next, control is carried out to lower the rotation speed of the spindle motor 2 so that the rotation speed of the disk becomes appropriate.

At step F112, the target rotation speed of the disk drive is set at the FG signal=40 Hz.

At steps F113 and F114, control is carried out to reduce the current flowing through the driver IC of the spindle motor so that the frequency of the FG signal of the spindle motor becomes 40 Hz±3 Hz. As a result, the rotation speed of the spindle motor 2 is lowered gradually, and the frequency of the FG signal of the spindle motor finally becomes 40 Hz±3 Hz.

Figure 30:
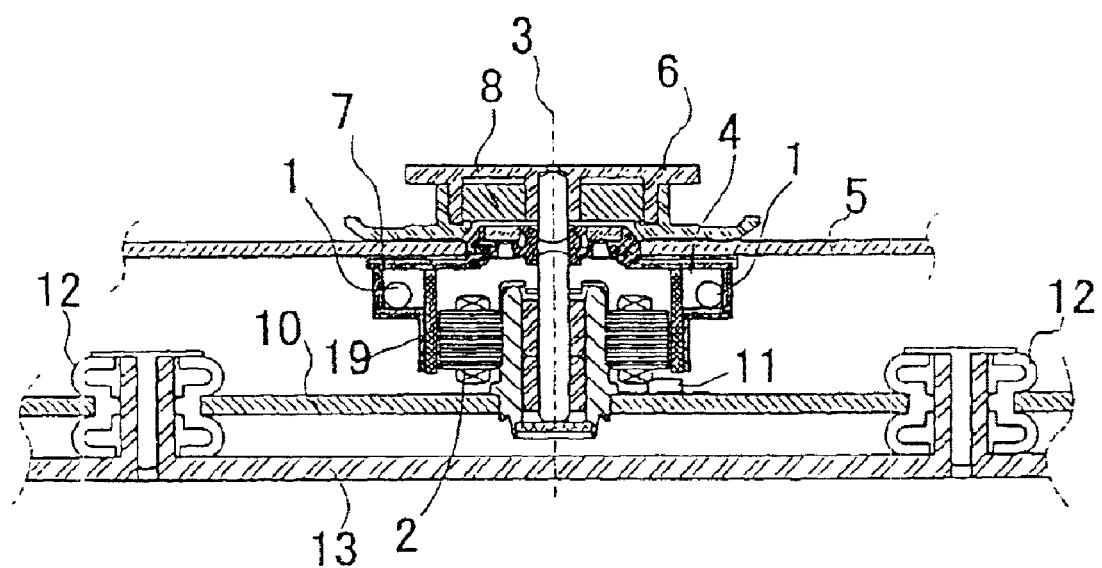
FIG. 30 is a side sectional view showing the configuration of another balancer of the disk drive in accordance with the conventional example and the present invention.
Figure 31:
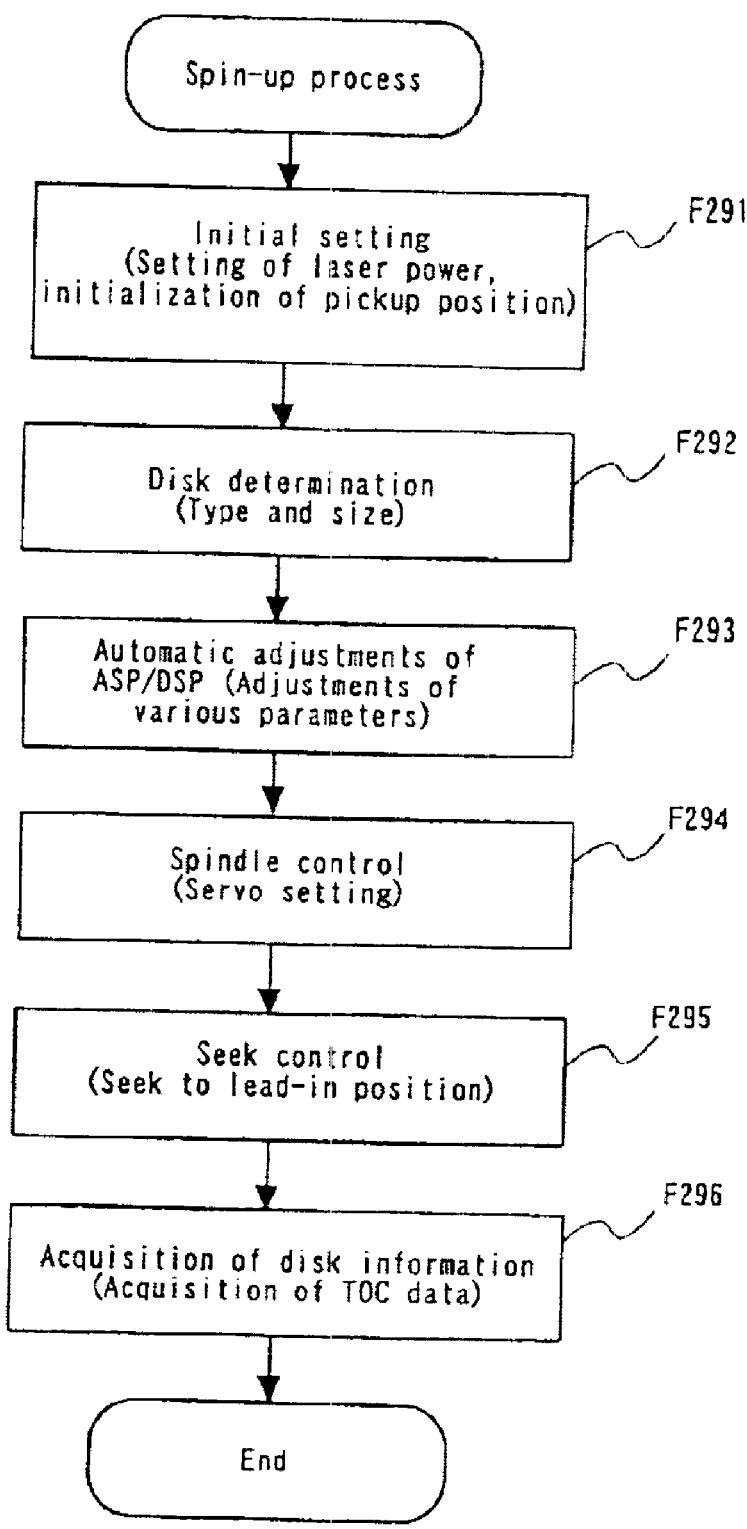
FIG. 31 is a flowchart of the spin-up process at the start of the conventional disk drive.

Although the above descriptions are based on the configuration of the balancer shown in FIG. 29 in accordance with this embodiment, the same effect can also be obtained by the configuration shown in FIG. 30.

<Embodiment 2>

An embodiment in accordance with claim 3 of the present invention will be described below referring to the accompanying drawings.

Figure 2:
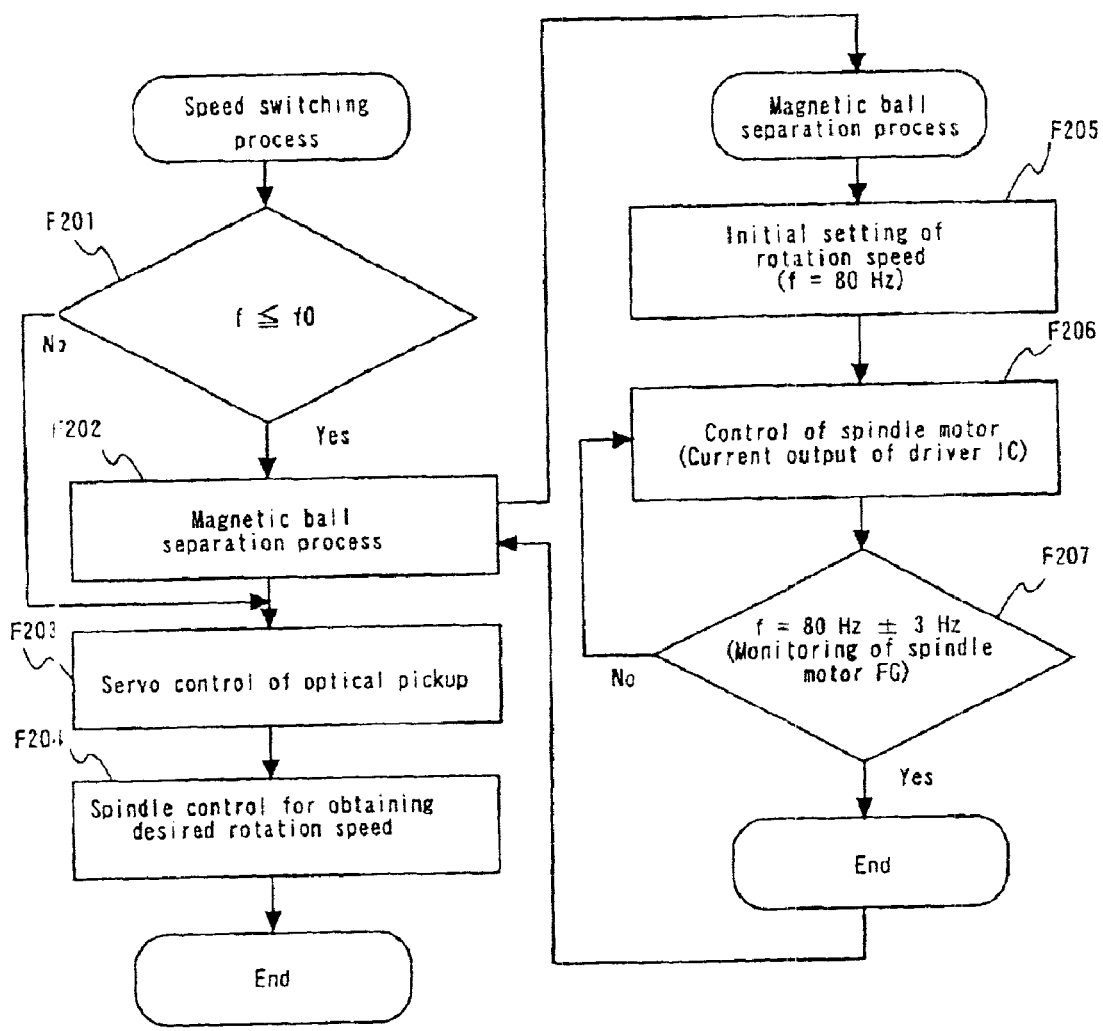
FIG. 2 is a flowchart of a speed switching process for a disk drive in accordance with a second embodiment of the present invention.

<Explanation of FIG. 2>

FIG. 2 is a flowchart of a speed switching process for a disk drive of the present invention.

The disk drive of the present invention includes a microcomputer and carries out the process of the flowchart shown in FIG. 2 by using the microcomputer.

The above-mentioned process of the first embodiment relates to the spin-up process at the start of the disk drive. However, the process of the second embodiment relates to a process in the case when the initial rotation speed (not the stop state) of the disk drive is changed to a higher rotation speed.

Generally, in the disk drive, if information is not read or written on the disk 5 for a long period of time, the rotation speed of the disk is lowered or the disk is stopped to reduce power consumption.

Furthermore, in response to a request from the host, the disk drive sometimes carries out speed switching operation to raise the rotation speed for reproduction or recording.

In a case, the current rotation speed of the disk is low to the extent that the magnetic ball 1 is attracted by the magnet 8, and the magnetic ball 1 separated from the magnet 8 by the spin-up process at the start has been attracted again by the magnet 8. Or in another case, it is unknown whether the magnetic ball has been attracted by the magnet 8, the magnetic ball has been separated from the magnet and positioned on the external peripheral side wall of the ring-shaped hollow section, or the magnetic ball is moving unstably inside the ring-shaped hollow section. It is assumed that the current state of the disk drive is one of these two cases and that a centrifugal force enough to separate the magnetic ball from the magnet is not generated at the target rotation speed.

In such a case, in the disk drive of the second embodiment, the rotation speed of the disk is not directly raised from the current rotation speed to the target rotation speed, but raised once from the current rotation speed to a rotation speed (FG signal=80 Hz in the embodiment 2) higher than the target rotation speed. At the higher rotation speed, the magnetic ball 1 separates from the magnet and positions on the external peripheral side wall of the ring-shaped hollow section.

The higher rotation speed of the disk is then lowered to the target rotation speed.

After the target rotation speed is reached, the disk drive carries out reproduction, recording or seek operation.

While the disk drive carries out reproduction or the like, it is preferable that the rotation speed of the disk does not lower to the extent that the magnetic ball 1 is attracted again by the magnet. This matter will be detailed in the descriptions of other embodiments.

The flowchart of FIG. 2 will be described below.

At step F201, the current disk rotation speed f (Hz) is compared with the magnetic ball attraction rotation speed f0 (Hz), and a check is made as to whether f≦f0 is established or not. In other words, a check is made as to whether the current disk rotation speed is not more than the magnetic ball attraction rotation speed and the magnetic ball 1 has been attracted by the magnet 8 or not.

If f≦f0 is not established, the sequence advances to step F203 without carrying out a magnetic ball separation process step F202.

If f≦f0 is established, the magnetic ball separation process step F202 is carried out. At the magnetic ball separation process step F202, the spindle motor 2 is controlled so that the disk rotation speed is the FG signal=80 Hz, whereby the magnetic ball 1 is separated from the magnet 8.

Step F202 comprises steps F205, F206 and F207.

First, at step F205, the FG signal (f)=80 Hz is set as a target rotation speed.

At steps F206 and F207, the drive current of the spindle motor is increased to raise the rotation speed of the spindle motor.

The rotation speed of the disk reaches a value in the range of the FG signal=80 Hz±3 Hz in a short time. At this rotation speed, the magnetic ball 1 is separated securely from the magnet and positioned on the external peripheral side wall of the ring-shaped hollow section.

This completes the magnetic ball separation process step F202.

At the next step F203, optical pickup focus servo is made effective.

At the next step F204, the rotation speed of the spindle motor is lowered from the FG signal=80 Hz to a desired rotation speed.

Hereafter, the disk drive carries out reproduction, recording and the like in accordance with commands from the user.

The magnetic ball separation process step F202 should preferably be carried out even in the case when it is unknown whether the magnetic ball has been attracted by the magnet 8, the magnetic ball has been separated from the magnet and positioned on the external peripheral side wall of the ring-shaped hollow section, or the magnetic ball is moving unstably inside the ring-shaped hollow section.

In the case when the current disk rotation speed f or the target rotation speed is higher than the magnetic ball separation rotation speed f1, it is judged that the magnetic ball 1 has already been separated from the magnet 8 or that the magnetic ball 1 will be separated from the magnet by rotating the disk at the target rotation speed. For this reason, the current disk rotation speed f is directly changed to the target rotation speed without carrying out the magnetic ball separation process step F202.

The magnetic ball attraction rotation speed f0 (Hz) is determined on the basis of the parameters, such as the mass of the magnetic ball 1, the magnetic flux density and the outside diameter of the magnet 8 and the outside diameter of the ring-shaped hollow section 4.

In this embodiment, the attraction rotation speed f0 is set at a fixed value.

With the above-mentioned configuration and process, the magnetic ball 1 can be separated from the magnet 8 of the damper 6 in a state wherein the automatic adjustments of the various parameters are not yet carried out and the optical pickup 15 is not yet controlled.

Furthermore, even when the magnetic ball 1 is re-attracted by speed change or the like, the magnetic ball separation process can be carried out in the state wherein the optical pickup 15 is not yet controlled. For this reason, no impact is applied to the disk, and stable reproduction and recording can be attained in a state wherein optical pickup focus servo or tracking servo is made effective.

Although the above descriptions are based on the configuration of the balancer shown in FIG. 29 in accordance with this embodiment, the same effect can also be obtained by the configuration shown in FIG. 30.

<Embodiment 3>

<Explanation of FIG. 3>

FIG. 3 is a flowchart of a spin-up process at the start of a disk drive in accordance with a third embodiment of the present invention.

The disk drive of the present invention includes a microcomputer and carries out the process of the flowchart shown in FIG. 3 by using the microcomputer.

The steps of this embodiment are nearly similar to those of the first embodiment, except for a magnetic ball separation process step F303 and an automatic parameter adjustment step F304. The explanations of the steps other than these two steps are therefore omitted.

At the magnetic ball separation process step F303, the rotation speed of the disk 5 is raised to 80 Hz so that the magnetic ball is securely separated from the magnet and positioned on the external peripheral side wall of the ring-shaped hollow section, just as with the magnetic ball separation process step F103 shown in FIG. 1.

However, since the number of turns of the motor winding for the high-speed spindle motor 2 is generally reduced to lower its electromotive force, its maximum generation torque is not so large at the magnetic ball separation process step F303. For this reason, a relatively long acceleration or deceleration time is required to raise or lower the rotation speed. For example, the time required to raise the rotation speed of the spindle motor 2 having a generation torque of about 40 gcm from its stop state to 80 Hz is about 3 to 4 seconds.

During this time, the user cannot do anything. For this reason, by carrying out the magnetic ball separation process, the waiting time for the user is made longer. This might result in lowering the operability of the disk drive. In other words, spending the disk drive process time only to carry out the process of separating the magnetic ball 1 from the magnet 8 causes a great loss.

To solve this problem, during the separation process time, the present invention carries out the automatic adjustments of some of the ASP and DSP parameters that are not affected even when an impact is applied to the disk by the magnetic ball 1 colliding with the external periphery of the ring-shaped hollow section 4.

As a result, the increase in the process time of the entire spin-up process due to the addition of the magnetic ball separation process time is prevented by taking this measure.

The magnetic ball separation process step F303 shown in FIG. 3 will be described below.

At step F309, the target rotation speed, 80 Hz, higher than the final target rotation speed (40 Hz in FIG. 3) is set as an initial value. A centrifugal force necessary and sufficient to separate the magnetic ball 1 from the magnet 8 and to position it on the external peripheral side wall of the ring-shaped hollow section 4 is generated at the rotation speed of 80 Hz.

At step F310, a current is flown through the driver IC of the spindle motor and the spindle motor is driven so that its rotation speed becomes the target rotation speed.

Until the rotation speed of the disk 5 reaches 80 Hz (at step F314) while taking the above-mentioned passage of time, the magnetic ball 1 collides with the external peripheral side wall of the ring-shaped hollow section 4 (at the moment when the magnetic ball separation rotation speed is reached, the magnetic ball is separated from the magnet and collides with the external peripheral side wall), and electrical adjustments are carried out which are not affected even when the impact at the time of the collision is transmitted to the disk.

Among the ASP and DSP parameter adjustment items, a calibration for automatic laser power control is carried out at step F311.

The electrical offset of the focus error of the optical pickup 15 from a reference voltage is adjusted at the next step F312.

At the next step F313, the focus gain of the optical pickup 15 is adjusted so that the range of the focus voltage of the optical pickup 15 becomes a reference voltage range.

At step 314, a check is made as to whether the rotation speed of the disk has reached 80 Hz or not.

If the rotation speed of the disk has not reached 80 Hz, the drive current of the driver IC of the spindle motor is increased at step F315.

After step F315, the sequence returns to step F314, and the rotation speed of the disk is checked, although this is not described in FIG. 3. If the electrical adjustments at steps F310 to F313 have not been finished, the sequence returns from step F315 to step F311.

These parameter adjustment process (F311 to F313) and the process (F310, F314 and F315) for raising the rotation speed of the disk 5 to 80 Hz are carried out simultaneously.

After both processes are completed, the rotation speed is lowered to 40 Hz at the next steps (F316 to F318).

The subsequent process steps (F304 to F308) are the same as those of the first embodiment.

In the disk drive in accordance with the third embodiment, the rotation speed of the disk is lowered from 80 Hz to the final rotation speed of 40 Hz.

With the above-mentioned configuration and processes, the automatic adjustments of some parameters that are not affected by the movement of the magnetic ball can be carried out during the process of separating the magnetic ball 1 from the magnet 8. This can reduce the start time of the disk drive.

The laser power calibration, focus offset and focus gain adjustments are carried out in this embodiment. However, it is also possible to carry out only the laser power calibration during the magnetic ball separation process. Furthermore, it is also possible to carry out the laser power calibration before the magnetic ball separation process and to carry out only the focus adjustment during the magnetic ball separation process. Moreover, in addition to these parameter adjustment items, it is also possible to carry out other parameter adjustment items as necessary depending on the configuration of the disk drive.

<Embodiment 4>

FIG. 4 to FIG. 9 show a fourth embodiment.

Figure 5:
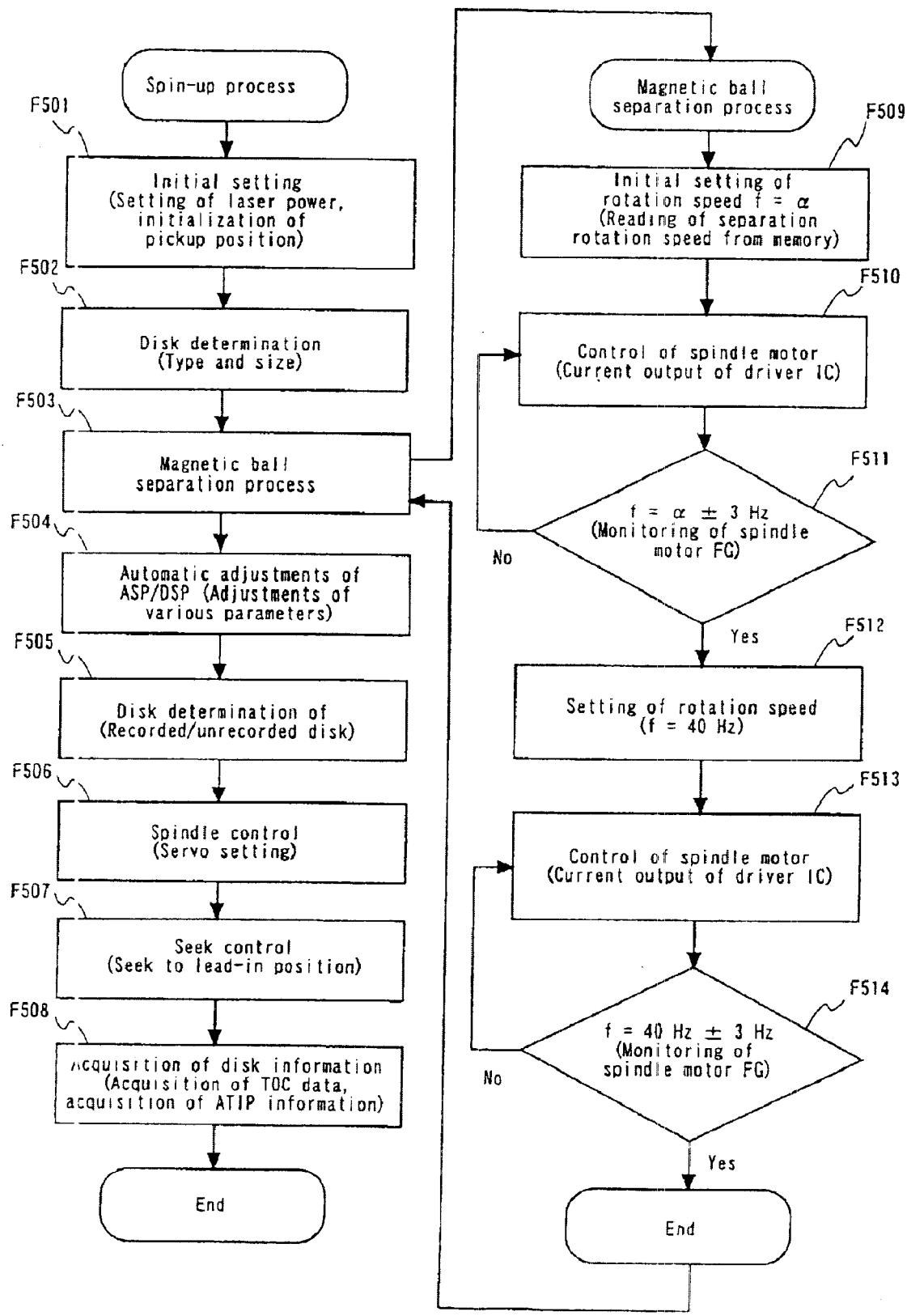
FIG. 5 is a flowchart of a spin-up process for the disk drive in accordance with the fourth embodiment of the present invention.

The disk drive of the present invention includes a microcomputer and carries out the process of the flowchart shown in FIG. 5 by using the microcomputer.

Figure 4:
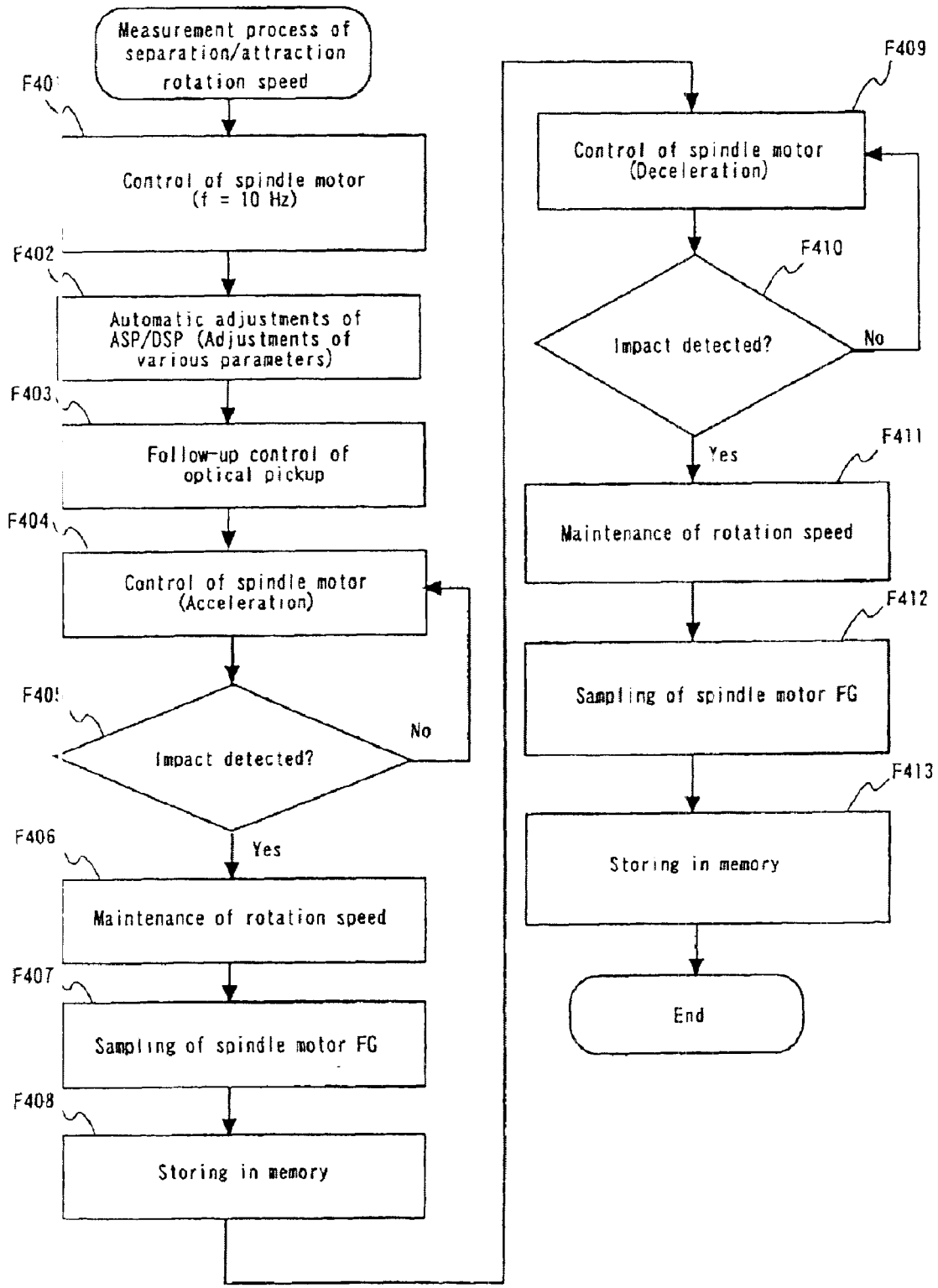
FIG. 4 is a flowchart of a process of measuring the magnetic ball separation rotation speed and magnetic ball attraction rotation speed of a disk drive in accordance with a fourth embodiment of the present invention.

<Explanation of FIG. 4>

FIG. 4 shows a process of measuring the magnetic ball separation rotation speed and magnetic ball attraction rotation speed of the disk drive. The measurement process is carried out during the in-plant production of the disk drive (before shipment).

First, at step F401, the spindle motor 2 is controlled so that the disk 5 rotates at a low rotation speed (10 Hz). At this rotation speed, the magnetic ball 1 is attracted by the magnet 8.

Next, at step F402, the automatic adjustments of the various parameters of ASP and DSP are carried out so that the levels and the like of the focus error signal and the tracking error signal do not vary from one disk drive to another.

Next, at step F403, only the focus servo for the optical pickup is made effective. At this time, the disk 5 rotates at 10 Hz by virtue of the control at step F401.

Next, at step F404, a gradually increasing current is flowed to the spindle motor 2, thereby to gradually raise the rotation speed of the disk.

While the rotation speed is raised, the centrifugal force applied to the magnetic ball increases gradually and eventually becomes larger than the magnetic attraction force exerted between the magnetic ball 1 and the magnet 8. At the moment, the magnetic ball 1 separates from the magnet 8 and collides with the external peripheral face of the ring-shaped hollow section 4.

At step F405, the impact caused at the time when the magnetic ball collides with the external peripheral side wall is detected by a focus error signal, i.e., a signal generated by the optical pickup 15, as described later.

After the impact is detected, the current for the spindle motor is fixed at the current flowing at the moment of the detection at step F406.

Next, at step F407, a frequency generation signal (hereafter referred to as an FG signal) obtained from the Hall device 11 disposed near the spindle motor 2 is measured to detect the rotation speed of the disk at the time.

Next, at step F408, the detected disk rotation speed is stored in the memory.

Figure 6:
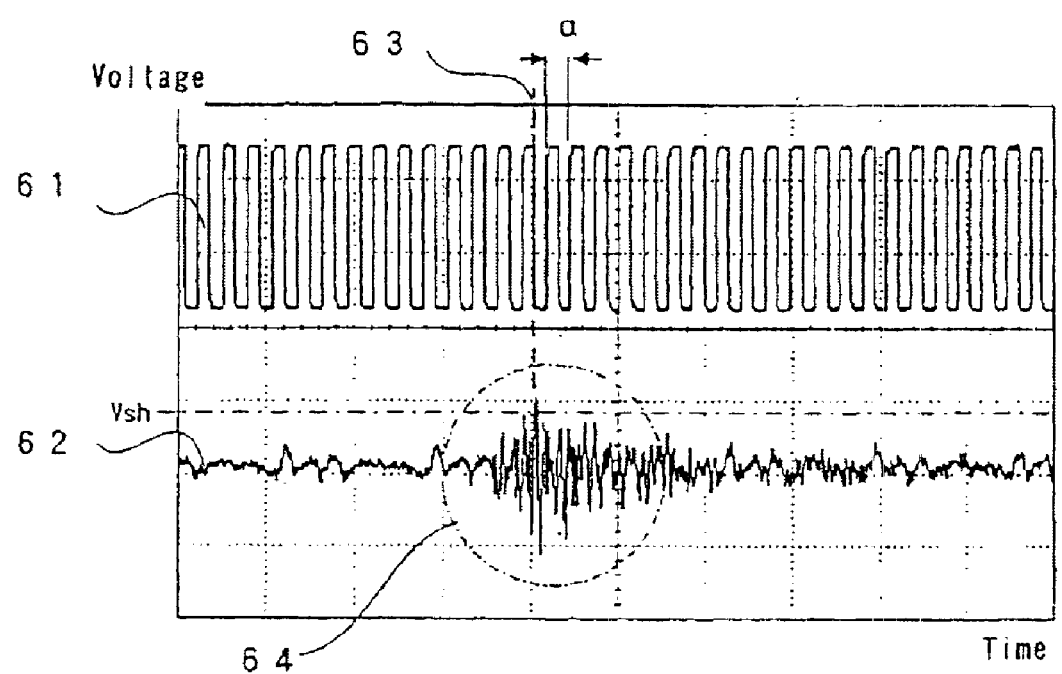
FIG. 6 shows actual waveforms of a focus error signal and an FG signal used for the measurement of the magnetic ball separation rotation speed of the disk drive in accordance with the fourth embodiment of the present invention.

<Explanation of FIG. 6>FIG. 6 is a waveform diagram showing an FG signal 61 and a focus error signal 62 including an impact application portion 64 at the time when the magnetic ball 1 of an actual disk drive separates. In FIG. 6, the abscissa represents time and the ordinate represents voltage.

The impact caused at the time when the magnetic ball separates from the magnet and collides with the external peripheral side wall is transmitted to the disk 5 and the actuator of the optical pickup 15. As a result, the impact appears as a disturbance in the focus error signal as designated by 64 in FIG. 6.

The impact detection section of this embodiment comprises a comparison operator that uses the focus error signal and its threshold value Vsh shown in FIG. 6 as input signals. The comparison operator outputs a binary signal (0 or 1). The first rising or falling edge of the output signal (binary signal) of the comparison operator corresponds to the time when an impact is applied.

The disk rotation speed at this time can be measured by counting the intervals between the rising edges or the falling edges of the FG signal 61 by using a clock signal having a frequency sufficiently higher than that of the FG signal. $\alpha$ in FIG. 6 designates a rotation period.

At the above-mentioned step F408, this rotation period α is directly stored, or a value obtained by converting the rotation period into a frequency or a rotation speed is stored in memory, such as a flash ROM provided in the disk drive.

As a result, the magnetic ball separation rotation speed inherent in the disk drive can be stored as data.

<Continued Explanation of FIG. 4>

After step F408, the magnetic ball attraction rotation speed is measured at step F409 to step F413.

At step F409, a gradually decreasing current is flowed to the spindle motor 2, thereby to gradually lower the rotation speed of the disk.

While the rotation speed is being lowered, the centrifugal force applied to the magnetic ball 1 decreases gradually, and the magnetic ball 1 cannot stay on the external peripheral side wall in the end. At the moment, the magnetic ball 1 separates from the external peripheral side wall and is s attracted by the magnet 8.

At step F410, the impact caused at the time when the magnetic ball collides with the magnet is detected by the focus error signal, i.e., a signal generated by the optical pickup 15, as described later.

After the impact is detected, the current for the spindle motor is fixed at the current flowing at the time of the detection at step F411.

Next, at step F412, the frequency generation signal (hereafter referred to as an FG signal) obtained from the Hall device 11 disposed near the spindle motor 2 is measured to detect the rotation speed of the disk at the time.

Next, at step F413, the detected rotation speed of the disk is stored in the memory.

Figure 7:
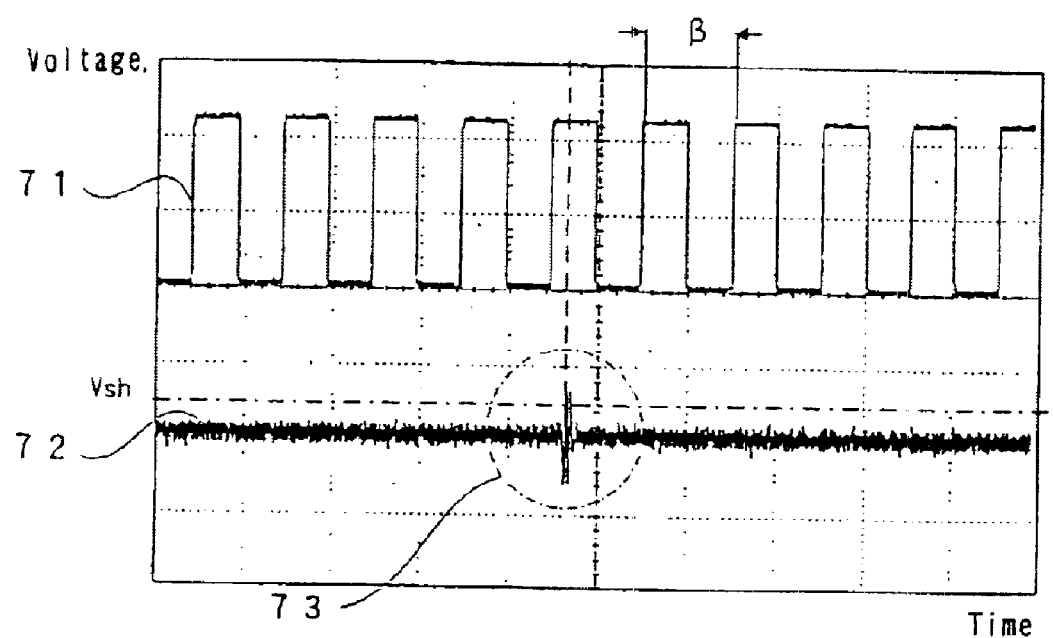
FIG. 7 shows actual waveforms of a focus error signal and an FG signal used for the measurement of the magnetic ball attraction rotation speed of the disk drive in accordance with the fourth embodiment of the present invention.

<Explanation of FIG. 7>

FIG. 7 is a waveform diagram showing an FG signal 71 and a focus error signal 72 including an impact application portion 73 at the time when the magnetic ball 1 of an actual disk drive is attracted by the magnet 8. In FIG. 7, the abscissa represents time, and the ordinate represents voltage. The impact caused at the time when the magnetic ball is attracted is transmitted to the disk 5 and the actuator of the optical pickup 15, and appears as a disturbance in the focus error signal as designated by 73 in FIG. 7.

The impact detection section of this embodiment comprises a comparison operator that uses the focus error signal and its threshold value Vsh shown in FIG. 7 as input signals. The comparison operator outputs a binary signal (0 or 1). The first rising or falling edge of the output signal (binary signal) of the comparison operator corresponds to the time when an impact is applied.

The disk rotation speed at this time can be measured by counting the intervals between the rising edges or the falling edges of the FG signal 71 by using a clock signal having a frequency sufficiently higher than that of the FG signal, a in FIG. 6 designates a rotation period.

At the above-mentioned step F413, this rotation period a is directly stored, or a value obtained by converting the rotation period into a frequency or a rotation speed is stored in memory, such as a flash ROM provided in the disk drive.

As a result, the magnetic ball attraction rotation speed inherent in the disk drive can be stored as data.

In the disk drive, the magnetic ball separation rotation speed and the magnetic ball attraction rotation speed are stored in the memory by the above-mentioned steps conducted during the in-plant production of the disk drive.

A disk drive in accordance with another embodiment can measure and store the magnetic ball separation rotation speed and the magnetic ball attraction rotation speed by itself. Consequently, the disk drive can always store the newest magnetic ball separation and attraction rotation speeds determined in consideration of the effect of ambient temperature or the effect of change with time.

This kind of disk drive carries out the process of the flowchart shown in FIG. 4 to measure the magnetic ball separation and attraction rotation speed by using a built-in microcomputer.

<Explanation of FIG. 5>

FIG. 5 is a flowchart of a spin-up process for a disk drive wherein the magnetic ball separation and attraction rotation speeds are stored by using the steps of FIG. 4.

FIG. 5 is the same as FIG. 1 except for steps F509 and F511 included in the magnetic ball separation process step F503.

In the spin-up process of FIG. 1, at step F109, a rotation speed sufficient to separate the magnetic ball from the magnet, f=80 Hz, is set as a target rotation speed in order to separate the magnetic ball. At step Fill, a check is made as to whether the rotation speed of the disk has reached the value of 80 Hz or not.

The embodiment of FIG. 5 uses the magnetic ball separation rotation speed (frequency) stored in the memory. At step F509, the maximum rotation period data α (minimum rotation speed) required for separating the magnetic ball from the magnet is read from the memory, and the data α is set as a target rotation period data. The rotation period data is converted into rotation speed data as necessary.

At step F510, a current is flowed through the driver IC of the spindle motor to rotate the disk.

At step F511, a check is made as to whether the rotation period of the disk coincides with α or not. When the rotation period of the disk reaches α, the magnetic ball separates from the magnet, and the sequence advances to the next step F512.

In another embodiment, the target rotation period (α) at step F509 and the comparison value (α) at the rotation period check step F511 are set at α minus a certain numerical value (or α multiplied by a certain positive value smaller than 1). Since α is the required maximum value and has no margin, the value is made smaller to eliminate the fear of a problem wherein the magnetic ball does not separate from the magnet because of slight environmental changes and the like <Explanation of FIG. 8>

Furthermore, the tracking error signal can also be used as an impact application detection signal, just as in the case when the above-mentioned focus error signal is used as an impact application detection signal.

Figure 8:
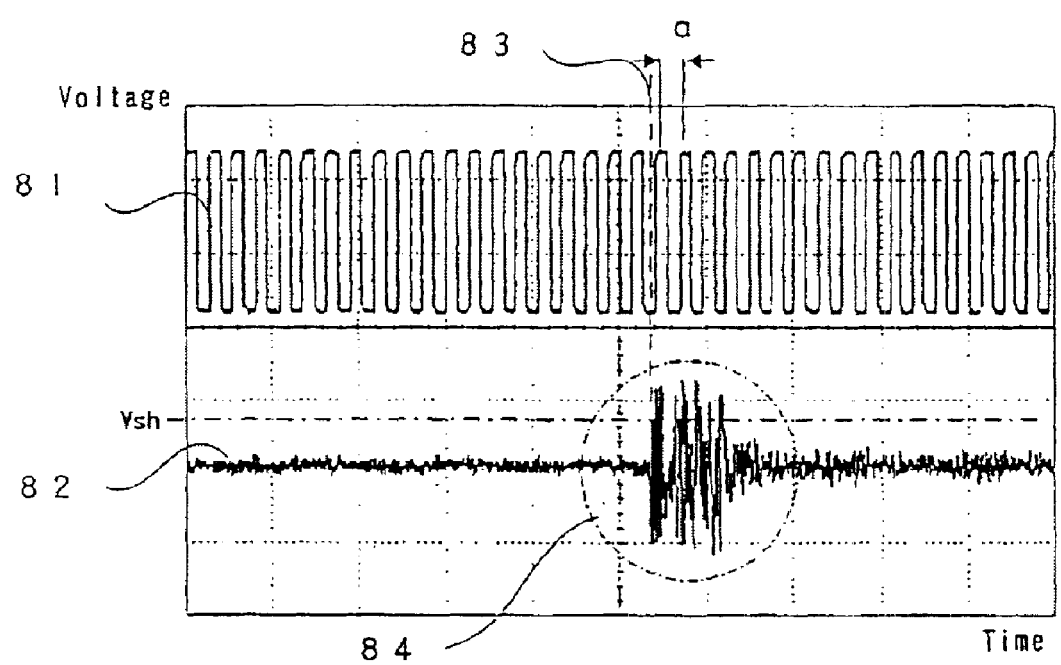
FIG. 8 shows actual waveforms of a tracking error signal and an FG signal used for the measurement of the magnetic ball separation rotation speed of the disk drive in accordance with the fourth embodiment of the present invention.

FIG. 8 is a waveform diagram showing an FG signal 81 and a tracking error signal 82 in an actual disk drive. In FIG. 8, the abscissa represents time and the ordinate represents voltage.

The impact caused at the time when the magnetic ball separates from the magnet and collides with the external peripheral side wall of the ring-shaped hollow section is transmitted to the disk 5 and the actuator of the optical pickup 15. As a result, the impact appears as a disturbance in the tracking error signal as designated by 84 in FIG. 8.

The impact detection section of this embodiment comprises a comparison operator that uses the tracking error signal and its threshold value Vsh shown in FIG. 8 as input signals. The comparison operator outputs a binary signal (0 or 1). The first rising or falling edge of the output signal (binary signal) of the comparison operator corresponds to the time when an impact is applied.

The disk rotation speed at this time can be measured by counting the intervals between the rising edges or the falling edges of the FG signal 81 by using a clock signal having a frequency sufficiently higher than that of the FG signal. α in FIG. 8 designates a rotation period.

At the above-mentioned step F408, this rotation period α is directly stored, or a value obtained by converting the rotation period into a frequency or a rotation speed is stored in memory, such as a flash ROM provided in the disk drive.

As a result, the magnetic ball separation rotation speed inherent in the disk drive can be stored as data.

Since the subsequent process is the same as that described above, its explanation is omitted.

Furthermore, the measurement of the magnetic ball attraction rotation speed by using the tracking error signal can also be carried out in the same way as shown in FIG. 7.

In the case when the impact of the collision of the magnetic ball is detected by using the focus error signal, only the focus follow-up control is carried out for the optical pickup follow-up control (F401) shown in FIG. 4.

In the case when the impact of the collision of the magnetic ball is detected by using the tracking error signal, the focus follow-up control and the tracking follow-up control are required for the above-mentioned follow-up control.

<Explanation of FIG. 9>

FIG. 9 shows a disk drive in accordance with this embodiment of the present invention, wherein an impact sensor 20 formed of piezoelectric ceramics is disposed near the spindle motor 2.

The impact caused at the time when the magnetic ball 1 separates from the magnet 8 and collides with the external peripheral face of the ring-shaped hollow section 4 is transmitted to a sub-base 10, and the piezoelectric ceramic impact sensor 20 detects the transmitted component of the impact. By this detection, the separation rotation speed and the attraction rotation speed can be measured just as in the case of the impact detection by using the above-mentioned focus error signal and tracking error signal. Since the detection signal and process are the same as those described above, their explanations are omitted.

With the above-mentioned configuration and process, it is possible to set a separation rotation speed inherent in each disk drive in consideration of the magnetic attraction force which is exerted between the magnetic ball 1 and the magnet 8 and which differs among disk drives. As a result, the magnetic ball 1 can be separated from the magnet 8 at a rotation speed appropriate for each disk drive.

In these cases of impact detection, the magnetic ball separation speed and the magnetic ball attraction speed usually have small variations in the same type of disk drives. Only one measurement provides a reliable result, thereby causing no problem. In some cases, however, a plurality of measurements may be carried out to optimize data.

Furthermore, the rotation speed to be set may be made larger than the measured separation rotation speed by about several tens of percentage in order to have a margin relating to magnetic ball separation.

An embodiment wherein the automatic adjustments of some parameters are carried out during the magnetic ball separation process is not described in the spin-up process of FIG. 5. However, the automatic adjustments of some parameters may be carried out during the magnetic ball separation process, just as in the case of the second embodiment.

Furthermore, both the measurement of the magnetic ball separation rotation speed and the measurement of the magnetic ball attraction rotation speed are carried out in the process shown in FIG. 4. However, either of the measurements may be carried out as necessary.

<Embodiment 5>

FIG. 10 to FIG. 13 show a fifth embodiment of the present invention.

Figure 10:
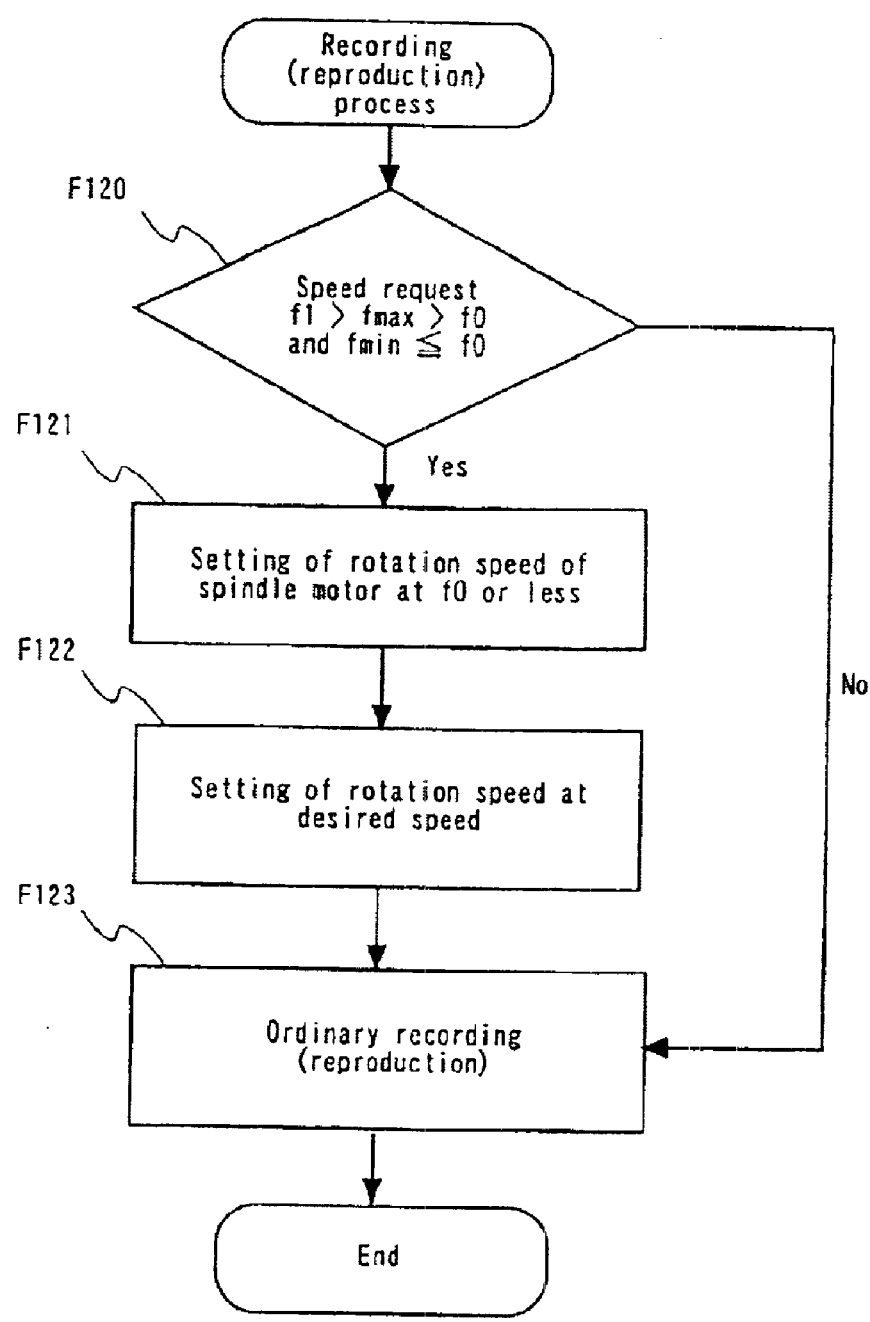
FIG. 10 is a flowchart relating to the recording and reproduction of a disk drive in accordance with a fifth embodiment of the present invention.

The disk drive of the present invention includes a microcomputer and carries out the process of the flowchart shown in FIG. 10 by using the microcomputer.

<Explanation of FIG. 10>

FIG. 10 is a flowchart relating to the recording or reproduction of the disk drive in accordance with the fifth embodiment of the present invention. The disk drive of the present invention has a mode wherein the rotation speed of the disk changes depending on the position on the disk (the CLV mode for example). The present invention relates to this kind of disk drive.

It is now assumed that the magnetic ball separation rotation speed is f1 (Hz) and that the magnetic ball attraction rotation speed is f0 (Hz).

The host (user) designates the rotation speed for recording (or reproduction) and the start position and end position for recording (or reproduction). The range from the start position to the end position is referred to as a region.

It is assumed that the minimum value of the rotation speed in the region is fmin (Hz). Similarly, it is assumed that the maximum value of the rotation speed in the region is fmax (Hz).

After receiving the above-mentioned command from the user, the disk drive carries out the process shown in FIG. 10.

At step F120, fmax is compared with the magnetic ball attraction rotation speed f0 (Hz) and the magnetic ball separation rotation speed f1 (Hz). Furthermore, fmin is compared with the magnetic ball attraction rotation speed f0 (Hz).

(1) In the case of fmax≦f0, the magnetic ball is attracted by the magnet at any position in the region. For this reason, recording, reproduction or the like is carried out immediately without carrying out the process of the present invention shown in FIG. 10.

(2) In the case of f1≦fmax, at the position in the region wherein the rotation speed is the highest, the magnetic ball separates from the magnet and positions on the external peripheral side wall of the ring-shaped hollow section. If reproduction or the like is started while the magnetic ball has been attracted by the magnet, the magnetic ball separates from the magnet somewhere in the region without exception. As a result, the magnetic ball collides with the external peripheral side wall and causes a large disturbance.

To solve this problem, the magnetic ball is positioned on the external peripheral side wall of the ring-shaped hollow section in the entire region. This makes it possible to prevent the magnetic ball from separating from the magnet and from colliding with the external peripheral side wall while the disk drive carries out reproduction or the like in the region.

The flowchart shown in FIG. 2 is carried out for example in order to position the magnetic ball on the external peripheral side wall of the ring-shaped hollow section.

(3) In the case of f0<fmin, even at the position in the region wherein the rotation speed is the lowest, the magnetic ball is not separated from the external peripheral side wall or attracted by the magnet, provided that the magnetic ball is positioned on the external peripheral side wall. As a result, the balancer is operated effectively. In addition, the magnetic ball is not separated from the external peripheral side wall or attracted by the magnet while the disk drive carries out reproduction or the like in the region.

The flowchart shown in FIG. 2 is carried out for example in order to position the magnetic ball on the external peripheral side wall of the ring-shaped hollow section.

(4) In the case of fmin≧f0 and f0<fmax<f1, the magnetic ball 1 does not separate from the magnet 8 even at fmax. In addition, the magnetic ball 1 is attracted by the magnet 8 at fmin.

If reproduction or the like is started while the magnetic ball positions on the external peripheral side wall, the magnetic ball collides with the magnet somewhere in the region without exception and cause a large disturbance.

To solve this problem, the magnetic ball is attracted by the magnet in the entire region. This makes it possible to prevent the magnetic ball from separating from the external peripheral side wall and from colliding with the magnet while the disk drive carries out reproduction or the like in the region.

The steps F121 to F122 are carried out so that the magnetic ball is attracted by the magnet.

At step F121, the rotation speed of the disk is lowered to the rotation speed f0 (magnetic ball attraction rotation speed) that is lower than the rotation speed for reproduction or the like. As a result, the magnetic ball is attracted securely by the magnet.

At step F122, the rotation speed of the disk is raised to the rotation speed corresponding to the start position in the region.

At step F123, reproduction or the like starts at a predetermined rotation speed.

Figure 11:
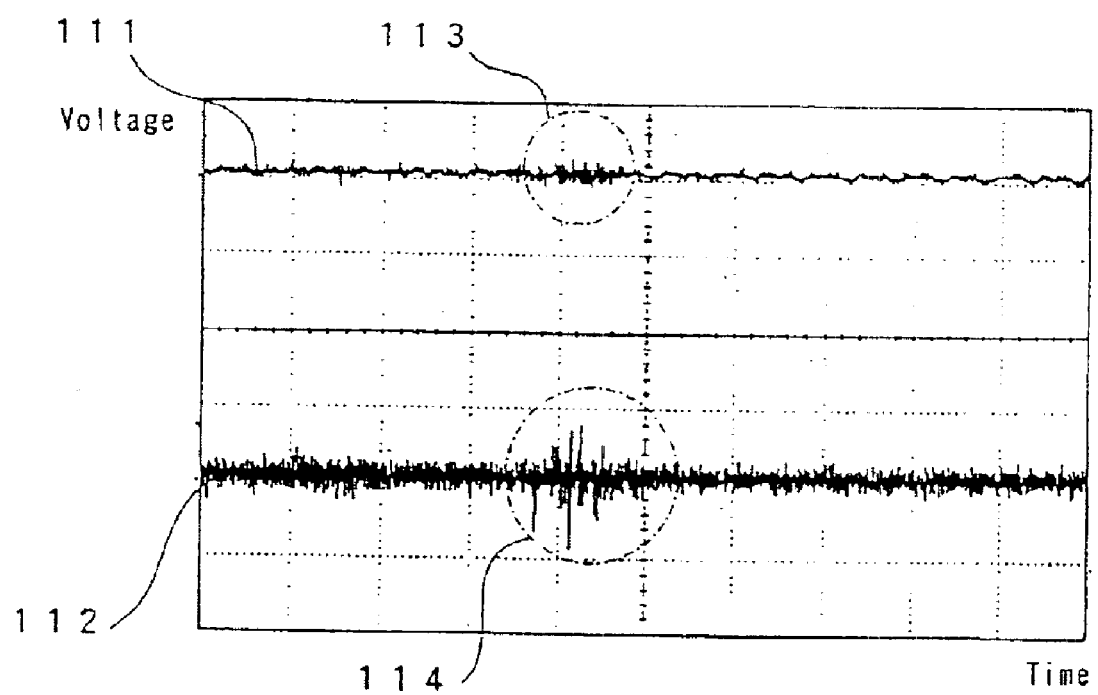
FIG. 11 is an actual waveform diagram showing error signals during recording in the case when a problem occurred in a conventional process in the disk drive in description of the fifth embodiment of the present invention.
Figure 12:
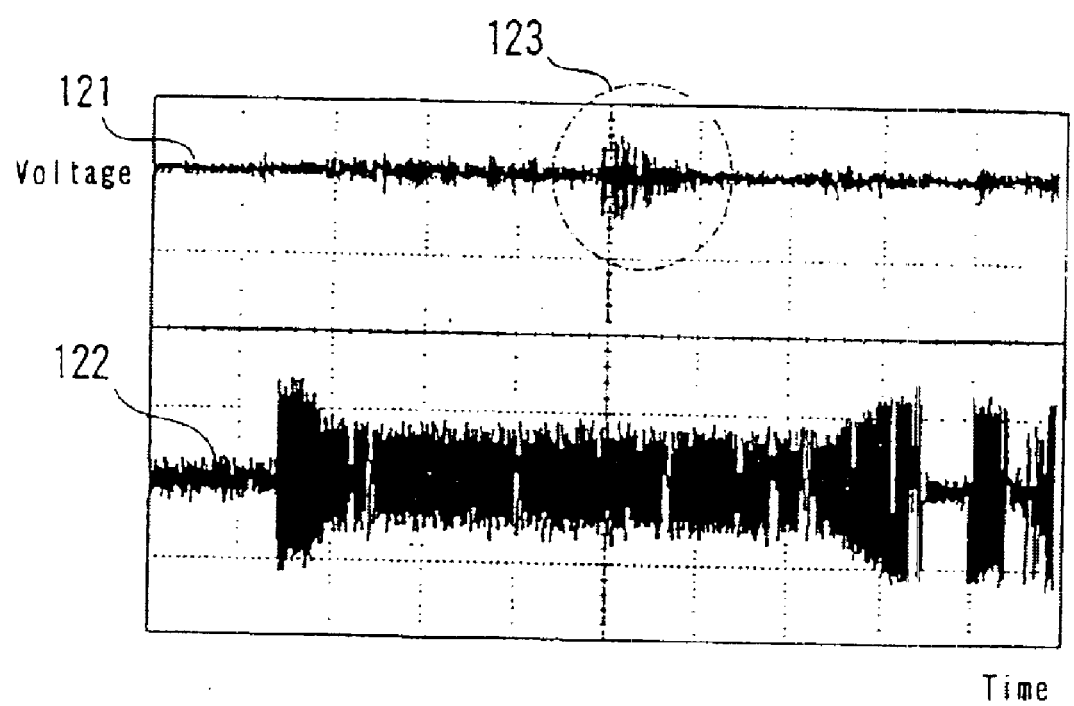
FIG. 12 is an actual waveform diagram showing error signals during seek operation in the case when a problem occurred in a conventional process in the disk drive in description of the fifth embodiment of the present invention.
Figure 13:
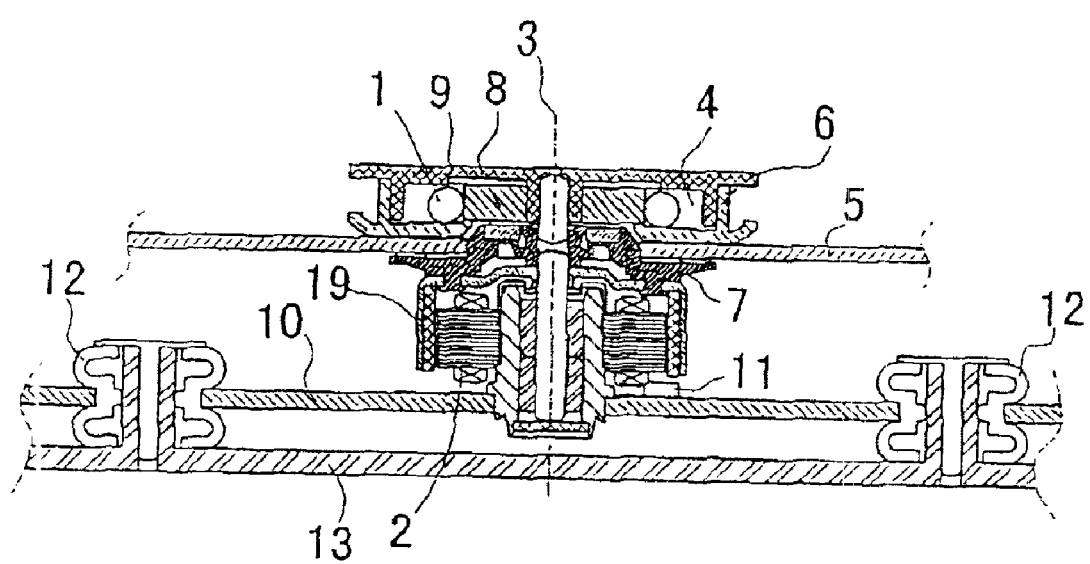
FIG. 13 is a side sectional view showing the balancer of the disk drive in accordance with the fifth embodiment of the present invention, wherein the magnetic balls thereof are attracted.

After the magnetic ball 1 has been attracted by the magnet 8 once, the relationship of f1>fmax has been established. For this reason, even if the rotation speed is raised to the maximum value fmax, the magnetic ball 1 rotates while being attracted by the magnet 8 as shown in FIG. 13. Hence, even if the ordinary recording or reproduction is carried out in this state, such impacts as described later and indicated in FIGS. 11 and 12 are not applied during recording or reproduction. This is because the magnetic ball 1 remains attracted by the magnet 8 and remains in a stable state.

<Explanation of FIG. 11>

If the magnetic ball collides with the side wall of the ring-shaped hollow section during recording, such a disturbance as shown in FIG. 11 occurs. FIG. 11 shows a focus error signal (111) and a tracking error signal (112). The collision of the magnetic ball affects both the two error signals and causes disturbances (113 and 114). These disturbances result in recording in a defocus state and recording in an off-track state respectively, thereby degrading the quality of recording.

<Explanation of FIG. 12>If the magnetic ball collides with the side wall of the ring-shaped hollow section during seek operation, disturbances shown in FIG. 12 occur. FIG. 12 shows a focus error signal (121) and a tracking error signal (122). The collision of the magnetic ball affects both the two error signals and causes disturbances (123 and the like). These disturbances affect the control of the disk rotation speed and the measurement of the number of tracks in the tracking error signal (122) respectively, thereby causing a seek error or the like.

<Explanation of FIG. 13>

The above-mentioned magnetic ball separation rotation speed f1 (Hz) and the above-mentioned magnetic ball attraction rotation speed f0 (Hz) are fixed values determined by parameters, such as the mass of the magnetic ball 1, the magnetic flux density and the outside diameter of the magnet 8, the outside diameter of the ring-shaped hollow section 4, etc.

The magnetic ball separation rotation speed f1 and the magnetic ball attraction rotation speed f0 can be measured by the measurement method in accordance with the fourth embodiment shown in FIG. 4. In addition, by storing the measured f0 and f1 in the memory of the disk device, it is possible to carry out the process of the flowchart shown in FIG. 10.

With the above-mentioned configuration and process, the contents of the process can be selected depending on the speed and the like requested by the user so that the magnetic ball becomes stable. For this reason, it is possible to carry out stable recording, reproduction and seek operation while such impact application owing to the magnetic ball 1 as affecting recording or reproduction performance is prevented from occurring.

<Embodiment 6>

FIG. 14 to FIG. 17 show a sixth embodiment of the present invention.

Figure 17:
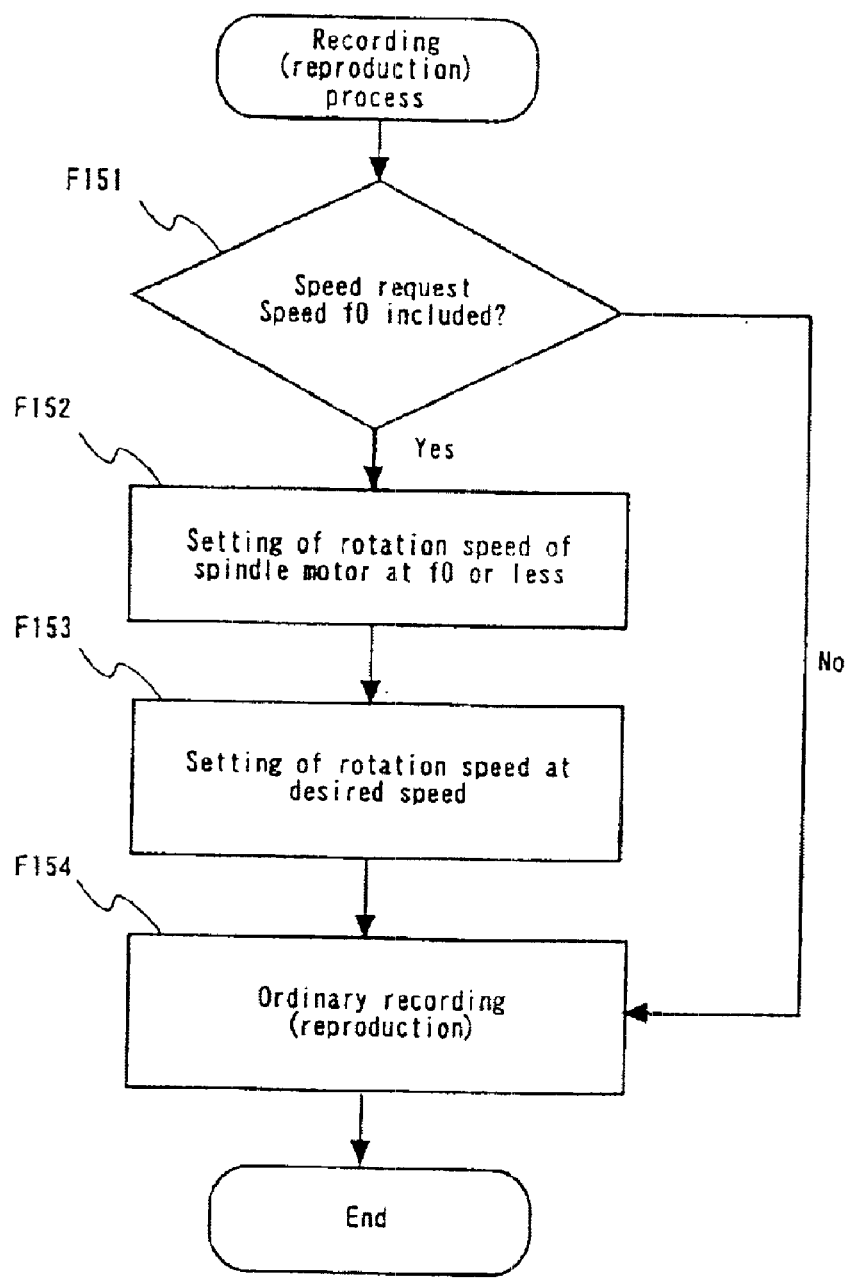
FIG. 17 is a flowchart relating to the recording and reproduction of the disk drive in accordance with the sixth embodiment of the-present invention.

The disk drive of the present invention includes a microcomputer and carries out the process of the flowchart shown in FIG. 17 by using the microcomputer.

<Explanation of FIG. 14>

FIG. 14 lists the maximum and minimum values of the disk rotation speeds corresponding to general reproduction and recording multiple speeds (1×, 2×, 4× and 8×) in the CLV mode of the CD-R/RW disk specifications. The maximum disk rotation speed value at each of the multiple speeds is obtained at the innermost peripheral position (44.7 mm in diameter) of the disk. The minimum disk rotation speed value at each of the multiple speeds is obtained at the outermost peripheral position (118 mm in diameter) of the disk. Since the liner speed of the disk 5 is standardized to have a range of 1.2 m/s to 1.4 m/s, calculations have been carried out assuming that the linear speed at the innermost peripheral position is 1.4 m/s and that the liner speed at the outermost peripheral position is 1.2 m/s. As shown in the table, the ratio of the maximum and minimum values of the rotation speed corresponding to each of the recording and reproduction multiple speeds is about 3.08.

Figure 15A:
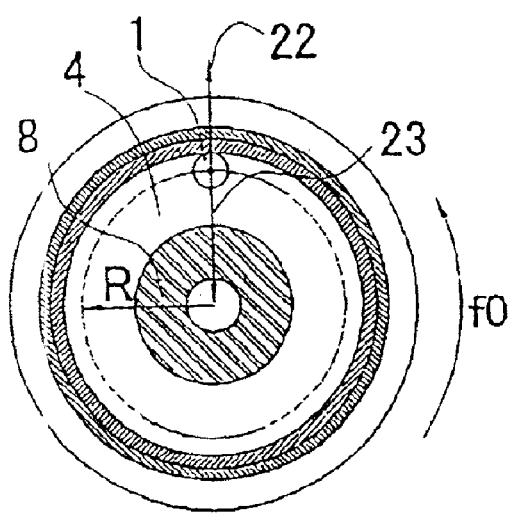
FIGS. 15A and 15B are views showing the relationship between the centrifugal force and the magnetic attraction force applied to the magnetic ball in accordance with the sixth embodiment of the present invention.
Figure 15B:
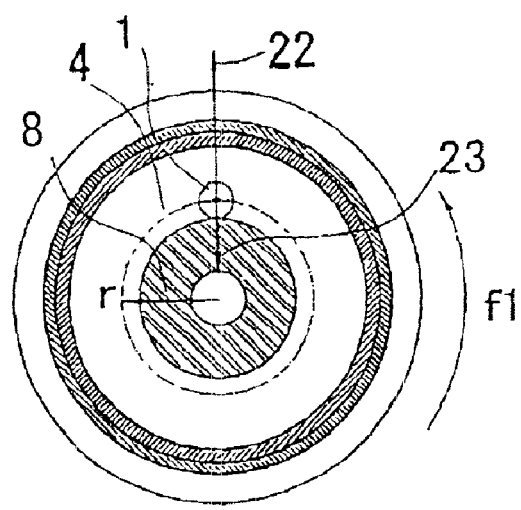

<Explanation of FIGS. 15A and 15B>

As shown in FIG. 15A, when the rotation speed of the disk becomes f0 or less, the centrifugal force 22 of the magnetic ball 1 on the external peripheral face of the ring-shaped hollow section 4 becomes smaller than the magnetic attraction force 23. The magnetic ball 1 thus separates from the external peripheral side wall and is attracted by the magnet 8.

As shown in FIG. 15B, when the rotation speed of the disk becomes f1 or more, the centrifugal force 22 of the magnetic ball 1 on the external peripheral face of the magnet 8 becomes larger than the magnetic attraction force 23. The magnetic ball 1 thus separates from the magnet 8 and moves to the external peripheral side wall.

The relationship of f1>3.08×f0 should only be established in order that magnetic ball separation and magnetic ball attraction do not occur at the same recording/reproduction speed.

As shown in FIGS. 15A and 15B, parameters, such as the center position r of the magnetic ball 1 in the radial direction in the state of the attraction by the magnet 8, the center position R of the magnetic ball 1 in the radial direction in the separation state, the magnetic flux density of the magnet 8, the mass of the magnetic ball 1, the sectional area of the magnetic ball 1 orthogonal to the magnetic flux from the magnet 8, etc., are set so that this relationship is established.

More specifically, it is assumed that a steel ball having a diameter of 3 mm and a mass of about 0.11 g is used as the magnetic ball 1 and that the radius r from the clamp center in the attraction state of the magnetic ball 1 is 9.25 mm.

In the case when the magnetic ball separation rotation speed is set at 50 Hz, a force of about 100 g is generated as the centrifugal force 22 shown in FIG. 15B. Hence, the magnet 8 is selected so that the magnetic attraction force 23 is about 100 g. As a result, the magnetic ball separates from the magnet at 50 Hz.

Next, the magnetic ball attraction rotation speed f0 is set so as to satisfy the relationship of f0×3.08<f1. When f1 is set at 50 Hz, f0 is set at less than 16.2 Hz.

The disk drive is configured so that the relational expression of f0×{(the rotation speed at the innermost periphery)/(the rotation speed at the outermost periphery)}<f1 is established, when written by using a general expression.

With this configuration, when the disk drive carries out recording or the like in the CLV mode, there are no cases wherein the rotation speed at the innermost periphery, i.e., the highest rotation speed, is larger than f1 (the magnetic ball separates from the magnet) and wherein the rotation speed at the outermost periphery, i.e., the lowest rotation speed, is smaller than f0 (the magnetic ball is attracted by the magnet).

For this reason, at a specific linear speed, there is no worst state wherein the magnetic ball moves unstably inside the ring-shaped hollow section somewhere on the disk even if the magnetic ball is positioned on the internal peripheral side wall or on the external peripheral side wall.

As a result, in the disk drive satisfying the above-mentioned conditions, a large disturbance caused by the collision of the magnetic ball with the side wall can be prevented from occurring during recording or the like. This is attained by appropriately disposing the magnetic ball at the internal or external peripheral position of the ring-shaped hollow section in the CLV mode at a given linear speed.

<Explanation of FIG. 16>

FIG. 16 shows the change of the centrifugal force 22 applied to the magnetic ball 1 at a frequency of 16.2 Hz and the change of the magnetic attraction force 23 of the magnet 8 in the radial direction. The radial position R of the magnetic ball 1 located at the external peripheral position of the ring-shaped hollow section 4 in FIG. 15A is herein used as a parameter.

Numeral 151 in the figure designates the magnetic attraction force 23, and numeral 152 designates the centrifugal force 22.

The intersection point γ in this graph is a point wherein the magnetic attraction force 23 is balanced with the centrifugal force 22. Hence, by making the external peripheral position R of the magnetic ball 1 smaller than this, the magnetic attraction force 23 becomes larger than the centrifugal force 22 at the rotation speed of 16.2 Hz. The intended object can thus be attained.

In this way, it is possible to set a balancer condition wherein the condition of f0×3.08<f1 is established.

It is herein assumed that a disk drive has a balancer configuration of f0=15 Hz and f1=50 Hz, for example, that is capable of satisfying the above-mentioned condition. In FIG. 14, at the 8× speed, the rotation speed of the disk does not become f0 or less.

For this reason, at the 8× speed, by carrying out recording (or reproduction) while the magnetic ball is positioned on the external peripheral sidewall, any disturbance owing to the collision of the magnetic ball with the side wall does not occur during recording or the like.

At the 1×, 2× and 4× speeds, the rotation speed of the disk does not become f1 or more.

For this reason, at the 1×, 2× or 4× speed, by carrying out recording (or reproduction) while the magnetic ball is positioned on the internal peripheral side wall (attracted by the magnet), any disturbance owing to the collision of the magnetic ball with the side wall does not occur during recording or the like.

<Explanation of FIG. 17>

FIG. 17 is a flowchart relating to recording or reproduction in the case when this balancer configuration is used.

It is assumed that the magnetic ball separation rotation speed f1 is 50 Hz and that the magnetic ball attraction rotation speed f0 is 15 Hz.

At step F151, a determination is made on the basis of only the request speed from the user. No consideration is given to the recording start position and the recording end position on the disk.

For example, when the request speed from the user is the 8× speed (in the CLV mode), the magnetic ball 1 is not attracted by the magnet 8 at any position on the disk during recording and reproduction. After the magnetic ball 1 is securely moved to the external peripheral side wall, recording or the like starts (at step F154). The method shown in FIG. 2 or the like is carried out (not shown in FIG. 17) in order to securely move the magnetic ball 1 to the external peripheral side wall.

When the request speed from the host is the 1× speed, recording or the like starts (at step F154) without moving the magnetic ball, since the rotation speed of the disk is less than the magnetic ball attraction rotation speed f0 at all times. The magnetic ball becomes stable while being attracted by the magnet.

When the request speed is the 2× speed or 4× speed, the rotation speed of the disk might become less than the magnetic ball attraction rotation speed f0 depending on the position on the disk, but does not exceed the magnetic ball separation rotation speed f1.

Hence, the magnetic ball is securely attracted by the magnet (at step F152), and then recording or the like starts.

At step F152, the rotation speed of the disk is lowered to f0=15 Hz or less so that the magnetic ball 1 is securely attracted by the magnet 8.

After this, at step F153, the rotation speed of the disk is raised to a rotation speed for recording or the like.

At step 154, recording or the like on the disk is carried out.

In the fifth embodiment, it is necessary to calculate the maximum and minimum values of the rotation speed of the disk during recording/reproduction by using the speed request from the host, reproduction/recording start position, reproduction/recording end position and the like as parameters.

In the sixth embodiment shown in FIG. 17, however, the balancer is configured so that the relationship expression of f1>{(the rotation speed at the innermost periphery)/(the rotation speed at the outer most periphery)}×f0 is established. For this reason, the magnetic ball separation rotation speed and the magnetic ball attraction rotation speed are not generated simultaneously during continuous recording or reproduction (in the case when one disk is used for recording or reproduction in the CLV mode) regardless of any request speed from the host.

As a result, a determination is made as to whether the magnetic ball should be positioned at the external periphery or the internal periphery depending on only the requested recording/reproduction speed, the known magnetic ball attraction rotation speed and the known magnetic ball separation rotation speed.

For this reason, the worst state is not caused wherein both the magnetic ball separation rotation speed and the magnetic ball attraction rotation speed are generated simultaneously depending on the request speed. In addition, the appropriate position of the magnetic ball can be determined by only the recording/reproduction speed, whereby the process is made easy.

This embodiment has been described on the assumption that (the rotation speed at the innermost periphery)/(the rotation speed at the outermost periphery) is 3.08 on the basis of the disk specifications of CD-R/CD-RW. However, the effects of the present invention can also be obtained in other disk specifications by the setting of f1>{(the rotation speed at the innermost periphery)/(the rotation speed at the outermost periphery)}×f0.

<Embodiment 7>

FIG. 18 to FIG. 25 show a seventh embodiment of the present invention.

Figure 23:
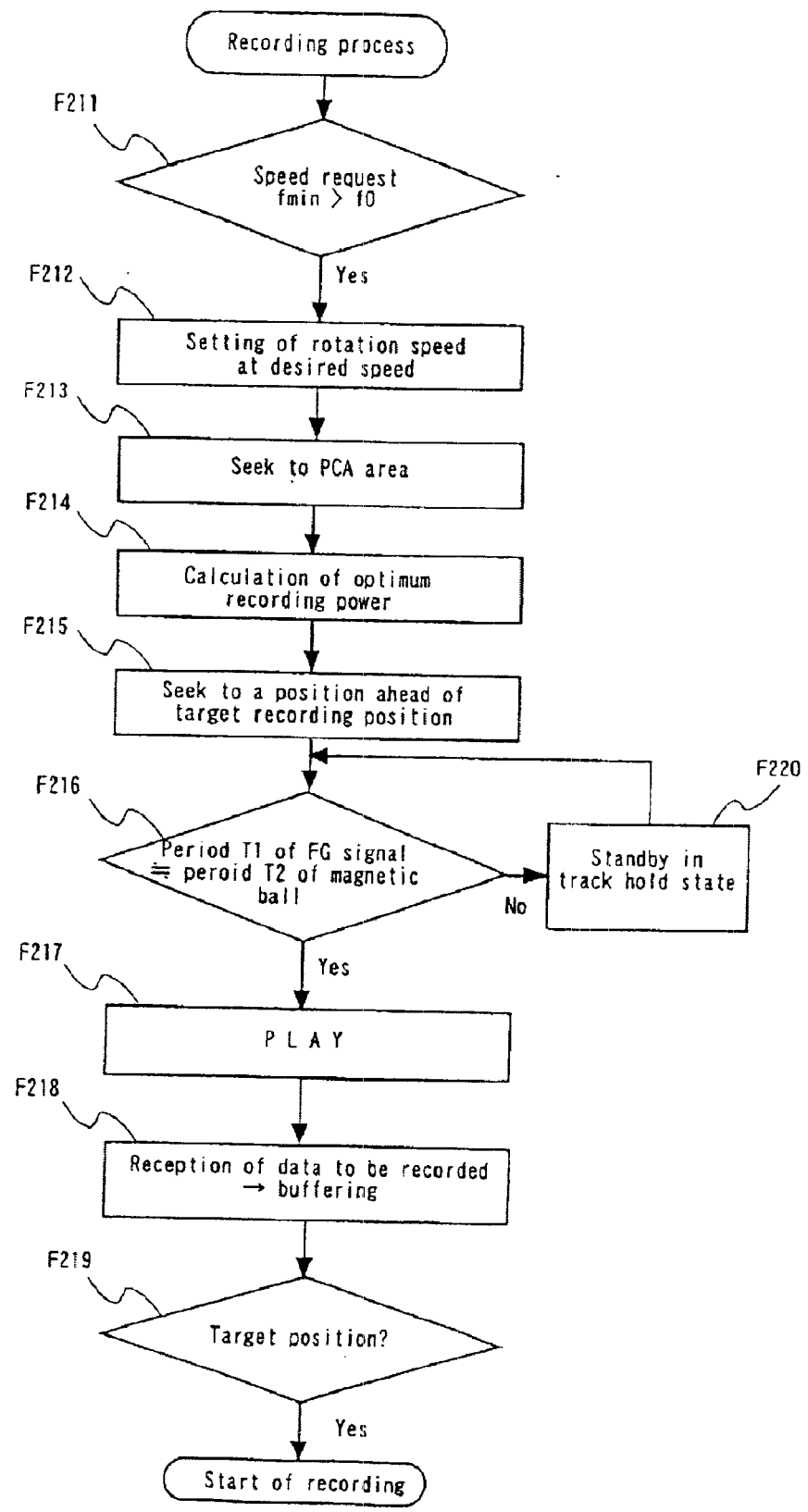
FIG. 23 is a flowchart relating to the recording of the disk drive in accordance with the sixth embodiment of the present invention.
Figure 25:
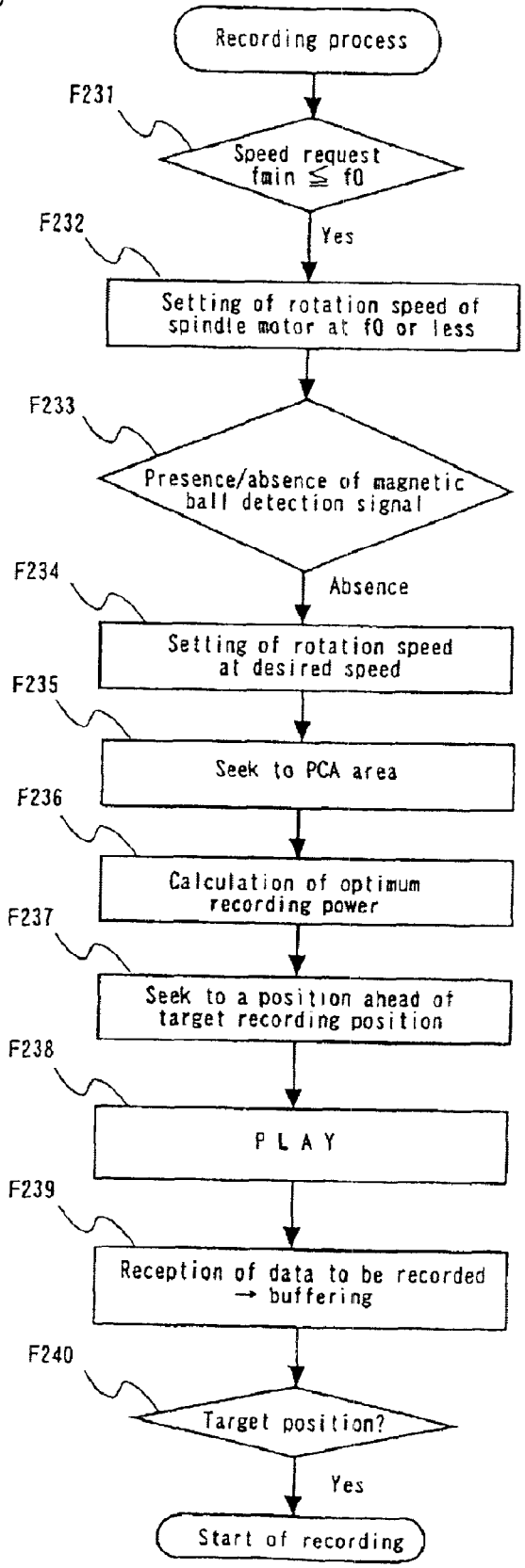
FIG. 25 is a flowchart relating to the recording of the disk drive in accordance with the seventh embodiment of the present invention.

The disk drive of the present invention includes a microcomputer and carries out the process of the flowchart shown in FIG. 23 or FIG. 25 by using the microcomputer.

The seventh embodiment of the present invention will be described below referring to the accompanying drawings.

Figure 18:
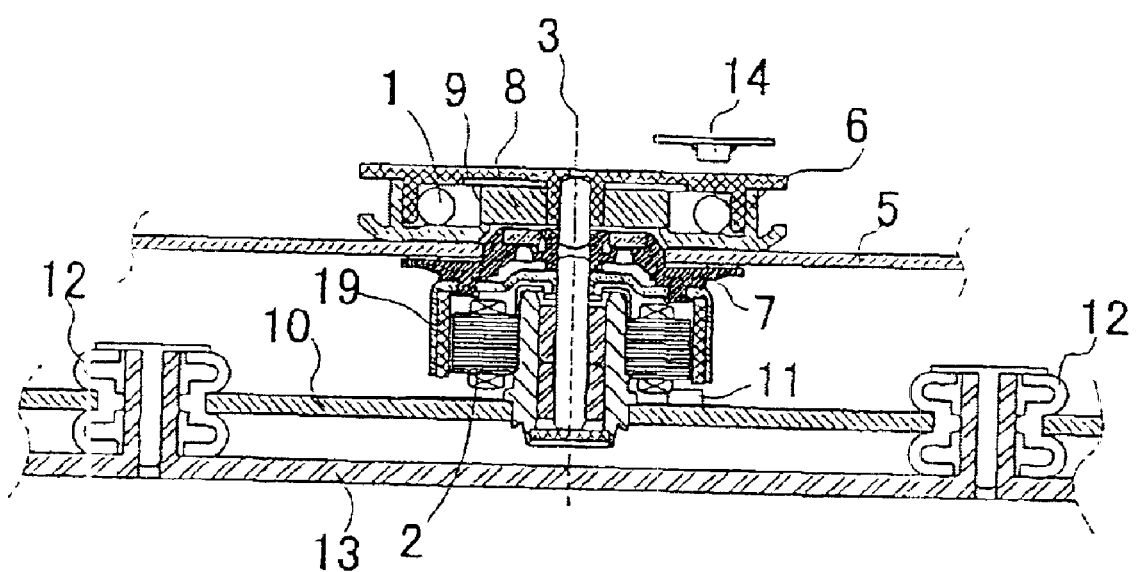
FIG. 18 is a side sectional view showing the configuration of the balancer of a disk drive in accordance with a seventh embodiment of the present invention.

<Explanation of FIG. 18>

FIG. 18 is a side sectional view showing the configuration of a balancer and its periphery in accordance with this embodiment. The damper 6 is formed of a transparent material, such as polycarbonate, and a reflection-type photointerruptor 14 is disposed near and above the damper 6. Since the basic configuration of the balancer is the same as that of the above-mentioned embodiment, except for the above-mentioned structure, the explanation of the basic configuration is omitted.

Figure 19A:
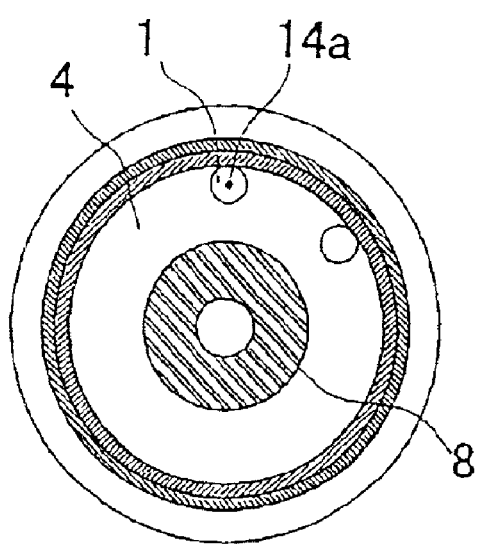
FIGS. 19A and 19B are views showing the positional relationship between the magnetic ball and a photosensor inside the balancer in accordance with the seventh embodiment of the present invention.

<Explanation of FIGS. 19A and 18B>

Figure 19B:
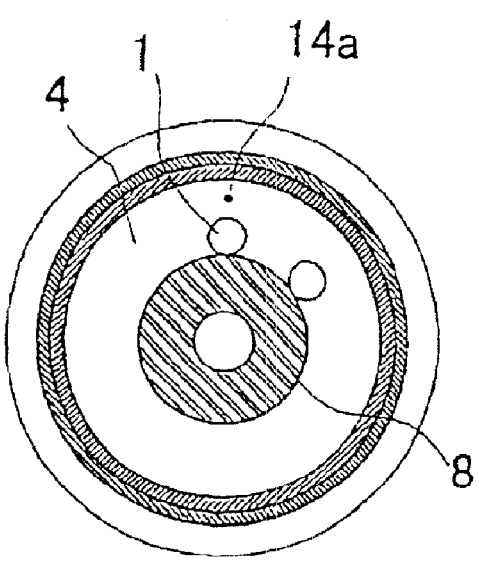

Furthermore, FIG. 19A and FIG. 19B show the positional relationship between the light-emitting point 14a of the reflection-type photointerruptor 14 and the position of the magnetic ball 1. FIG. 19A shows that the light-emitting point 14a is positioned on the magnetic ball 1 in the case when the magnetic ball 1 is positioned on the external peripheral face of the damper 6. In FIG. 19A, the light-receiving transistor of the reflection-type photointerruptor 14 receives light reflected by the magnetic ball 1.

FIG. 19B shows that the light-emitting point 14a is positioned away from the magnetic ball 1 in the case when the magnetic ball 1 is attracted by the magnet 8. In FIG. 19B, the light-receiving transistor of the reflection-type photointerruptor 14 does not receive the reflected light.

In FIG. 19A and FIG. 19B, by rotating the disk, the magnetic ball rotates while following a concentric locus. It is therefore not necessary to dispose the reflection-type photointerruptor everywhere in the ring-shaped hollow section. The behavior of the magnetic ball can be detected by using at least one reflection-type photointerruptor in the radial direction.

Figure 20:
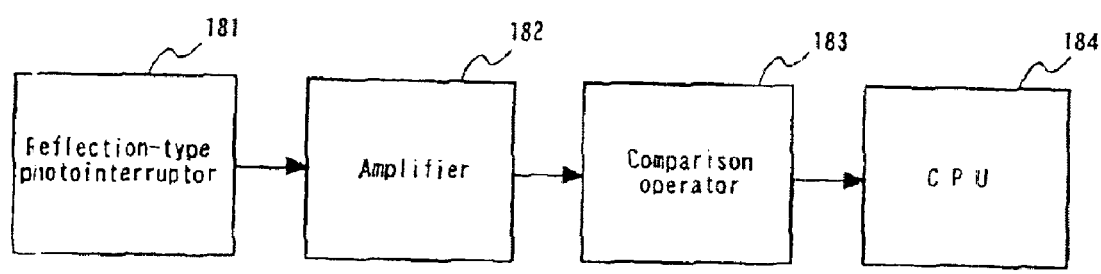
FIG. 20 is a block diagram relating to the signal process of the photosensor of the disk drive in accordance with the seventh embodiment of the present invention.

<Explanation of FIG. 20>

FIG. 20 is a block diagram showing the flow of a signal from the reflection-type photointerruptor 14. The signal detected by the reflection-type photointerruptor 14 (181) is amplified by an amplifier (182), such as an operational amplifier. The signal is then binarized by magnitude comparison with respect to a threshold by using a comparator (comparison operator 183). The binarized signal is input to the I/O port of a CPU (184), whereby a determination can be made as to whether the reflected light from the reflection-type photointerruptor 14 is present or not.

Signal waveforms and a method for determining them will be described below in the case when the reflection-type photointerruptor 14 is used.

<Explanation of FIGS. 21A, 21B, 21C and 21D>

Figure 21A:
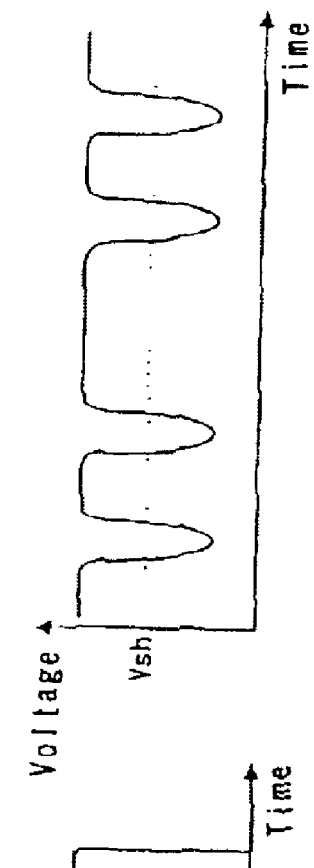
FIGS. 21A to 21D are graphs showing the output signal of the photosensor and the FG signal of the disk drive in accordance with the seventh embodiment of the present invention.

FIG. 21A shows a waveform obtained by detecting the rotation speed of the spindle motor 2 by using the Hall device 11 and by binarizing the output signal of the Hall device. The number of poles of the rotor magnet 19 of the spindle motor 2 is 12 in a typical case. In a configuration comprising three Hall devices 11, six pulses of the FG signal are generated from each Hall device at each rotation of the spindle motor. By frequency-dividing the signal of FIG. 21A by six, a synchronous signal corresponding to one rotation of the spindle motor can be obtained as shown in FIG. 21B.

Figure 21C:
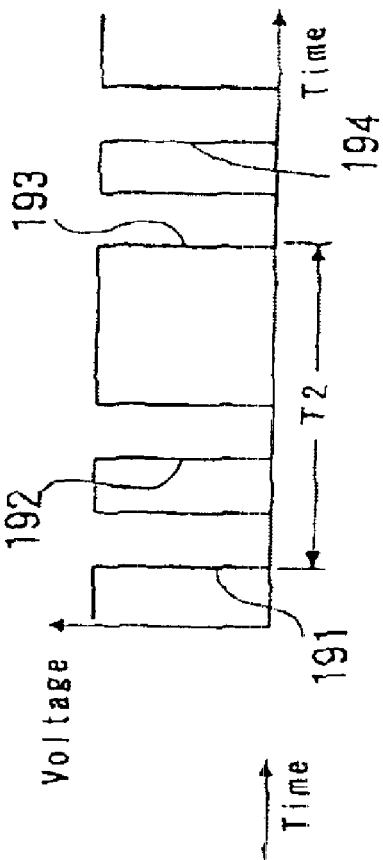
Figure 21B:
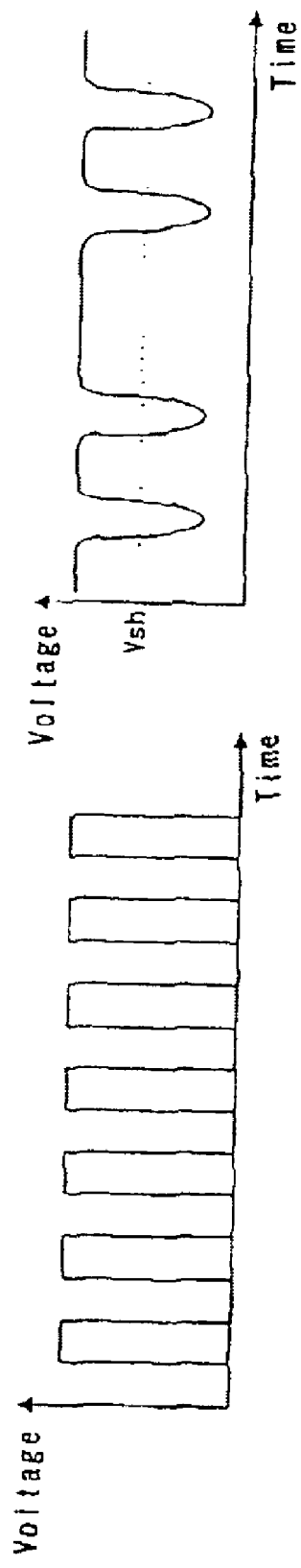
Figure 21D:
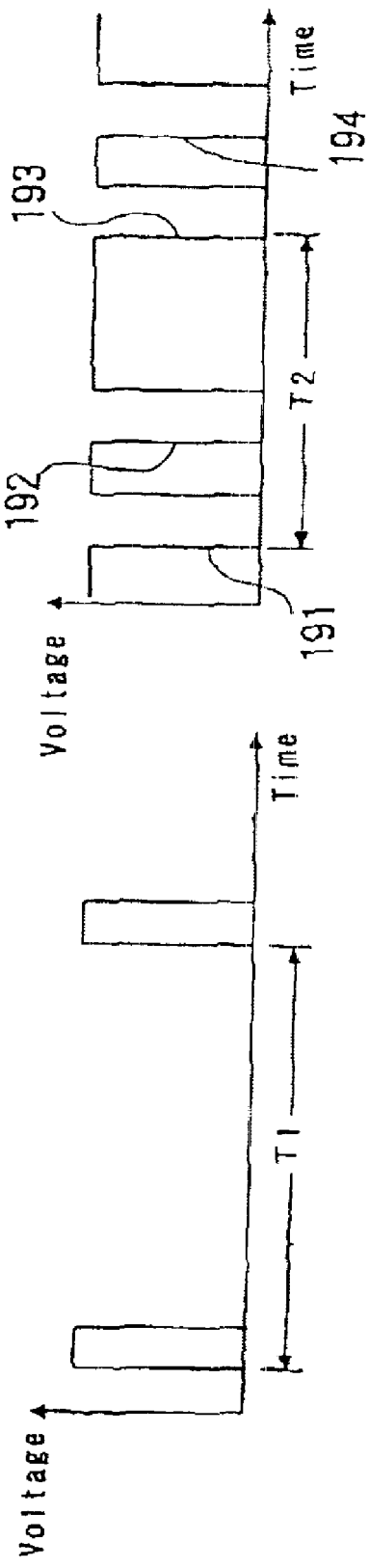

Furthermore, FIG. 21C shows the output signal of the phototransistor of the reflection-type photointerruptor 181 shown in FIG. 20.

The light emitted from the photodiode inside the reflection-type photointerruptor 14 is not reflected at portions wherein the magnetic ball 1 is not present, since the clamper 6 is formed of a transparent material. For this reason, the phototransistor of the reflection-type photointerruptor 14 does not receive the reflected light. When the magnetic ball 1 passes below the reflection-type photointerruptor 14, the phototransistor of the reflection-type photointerruptor receives the light reflected by the magnetic ball.

As a result, the waveform shown in FIG. 21C is detected.

By the comparison operator 183, the waveform is subjected to comparison operation by using Vsh shown in the figure as a threshold. The binarized output signal of the comparison operator 183 has a waveform shown in FIG. 21D.

The number of falling edges of the pulses of the signal differs depending on the number of the magnetic balls 1. When the number of the magnetic balls 1 is two, for example, the falling edges (191, 192, 193 and 194) are generated two times per rotation, with the reflection-type photointerruptor 14 used as a reference. For this reason, only the odd-numbered falling edges (191 and 193) are sampled, and the period T2 at this time is compared with the rotation period T1 of the spindle motor. As a result, it is possible to detect the relative speed difference between the spindle motor 2 and the magnetic balls 1. When they are synchronous with each other, it can be determined that the magnetic balls 1 are stationary on the external peripheral face of the ring-shaped hollow section 4 and that the magnetic balls 1 are in a stable state. When the periods are not synchronous with each other, it can be determined that the magnetic balls 1 are not stationary at certain positions but moving along the periphery.

Furthermore, as described below, the basic configuration of the above-mentioned detection section and the like can also carry out signal measurements to make a determination as to whether the magnetic balls 1 have been attracted by the magnet 8 or not.

<Explanation of FIGS. 24A, 24B. 24C and 24D>

FIG. 24A shows the output of the phototransistor of the reflection-type photointerruptor 14 in the case when the magnetic balls 1 are positioned on the external periphery of the ring-shaped hollow section 4. In this case wherein the magnetic balls 1 are positioned on the external peripheral face of the ring-shaped hollow section 4, reflected light is obtained by the phototransistor of the reflection-type photointerruptor 14, and the waveform binarized by comparison operation with respect to Vsh becomes the waveform shown in FIG. 24B. Rising edges (222 and 224) and falling edges (221 and 223) are generated as shown in the figure.

In the case when the magnetic balls 1 have been attracted by the magnet 8, the phototransistor of the reflection-type photointerruptor 14 does not receives the reflected light at all times. Hence, the output signal of the phototransistor of the reflection-type photointerruptor 14 has the waveform shown in FIG. 24C. The signal shown in FIG. 24C is input to the comparison operator 183 and subjected to comparison operation with respect to Vsh. The output signal of the comparison operator 183 has a binarized waveform shown in FIG. 24D. Since the waveform of this signal has no rising and falling edges, the waveform can be distinguished easily from the waveform shown in FIG. 24B. Hence, it is possible to determine as to whether the magnetic balls 1 have been positioned on the external peripheral face or attracted by the magnet 8 disposed at the internal periphery by judging the presence or absence of the rising and falling edges in the output waveform from the reflection-type photointerruptor 14.

<Explanation of FIGS. 22A and 22B>

FIG. 22A is a side sectional view showing a disk drive wherein a light-gathering section 21 is integrated with the clamper section directly below the light-emitting section of the reflection-type photointerruptor 14.

FIG. 22B shows the shape of the damper viewed in the direction P of the above-mentioned sectional view.

With the above-mentioned configuration, the distance (operation distance) between the reflection-type photointerruptor 14 and the magnetic ball 1 can be changed as desired by changing the lens shape of the light-gathering section 21, and the sensitivity of detection can be enhanced.

In embodiment, the reflection-type photointerruptor 14 is used to detect the behavior of the magnetic balls 1. However, by using the damper 6 formed of a nonmetal, such as a resin, and by detecting an eddy current generated in the magnetic ball 1 formed of a metal material by using an electrostatic capacitance type sensor, the behavior of the magnetic balls 1 can also be detected just as in the case of the embodiment having the reflection-type photointerruptor 14. This embodiment is not shown, since the mechanical and electrical configurations of this embodiment are almost the same as those of the embodiment having the reflection-type photointerruptor, except for the sensor.

<Explanation of FIG. 23>

FIG. 23 is a flowchart showing a part of the recording process carried out by using this configuration.

When recording is requested by the user, the minimum rotation speed fmin at the speed of the recording is first compared with the magnetic ball attraction rotation speed f0 at step F211.

If the minimum rotation speed fmin is larger than f0, the magnetic ball 1 is not attracted by the magnet 8 during recording or at the time of seek operation to a recording position. For this reason, the magnetic ball is first positioned on the external peripheral side wall of the ring-shaped hollow section (by the method shown in FIG. 2 or the like).

Then, at step F212, the rotation speed of the disk is set at the requested rotation speed.

Next, at step F213, seek operation is carried out to a power calibration area (PCA) to obtain an optimum recording power for the disk.

Next, at step F214, actual recording and reproduction are carried out in the PCA area, and an optimum recording power is calculated. When data is written, the power of the disk is set at the optimum recording power.

Next, at step F215, seek operation is carried out to a position about 300 frames ahead of the target recording position. At this time, the rotation speed differs depending on the position on the disk in the CLV mode. For this reason, the magnetic ball 1 is positioned unstably because of the change in the centrifugal force applied thereto, and the magnetic ball 1 moves. If recording is started while the magnetic ball 1 remains unstable, recording performance is affected adversely.

To solve this problem, at step F216 and step F220, the above-mentioned behavior detection section and method are used to carry out detection as to whether the magnetic ball 1 is moving inside the ring-shaped hollow section or not. If the magnetic ball is moving, the disk drive operation is on standby (at step F220) in the track hold state at the seek position until a condition wherein the magnetic ball is recognized to be nearly stable is attained (at step F216).

When the condition at step F216 is satisfied, the sequence advances to step F217, and PLAY (approach run) starts (at step F217).

At step F218, data to be recorded is received from the host and buffered.

After this, at step F219, a check is made as to whether the target recording position is reached or not. When the target recording position is reached, recording starts.

<Explanation of FIG. 25>

FIG. 25 is a flowchart showing a part of the recording process in the case when the disk drive in accordance with this embodiment receives a speed request different from that shown in FIG. 23.

At step F231, the minimum rotation speed fmin for recording is compared with attraction rotation speed to.

It is assumed that fmin is not more than the attraction rotation speed f0. In this case, the magnetic ball 1 is attracted by the magnet 8 during recording or when seek operation is carried out to a recording position.

Then, at step F232, the spindle motor 2 is controlled so that the disk rotation speed becomes f0 or less, whereby the magnetic ball 1 is attracted by the magnet 8.

At step F233, the above-mentioned detection method is used to carry out detection as to whether the magnetic ball 1 has been attracted by the magnet 8 or not. It is thus confirmed that the output signal of the reflection-type photointerruptor positioned at 14a has a state wherein signal change owing to the magnetic ball 1 is not present as shown in FIG. 24D.

After the signal shown in FIG. 24D is obtained, the sequence advances to step F234. At step F234, the disk is controlled to rotate at a desired rotation speed.

Next, at step F235, seek operation is carried out to the power calibration area (PCA) in order to obtain an optimum recording power for the disk.

At step F236, an optimum recording power is calculated by carrying out actual recording and reproduction. In the case of writing data, the recording power is set at the optimum recording power.

Next, at step F237, seek operation is carried out to a position about 300 frames ahead of the target recording position (at step F237).

At step F238, PLAY (approach run) starts.

At step F239, data to be recorded is received from the host and buffered.

Hereafter, at step F240, a check is made as to whether the target recording position is reached or not. After the target recording position is reached, recording starts.

With the above-mentioned configuration and process, the behavior of the magnetic ball 1 can be detected easily. As a result, stable performance can be attained during recording and reproduction, as well as seek operation related to recording and reproduction.

Although the recording processes are shown in FIG. 23 and FIG. 25, the same determination method can also be used for the reproduction process.

Furthermore, in the case when the balancer configuration in accordance with the seventh embodiment is used, it is possible to simplify a judgment criterion for a request speed.

<Embodiment 8>

Figure 26:
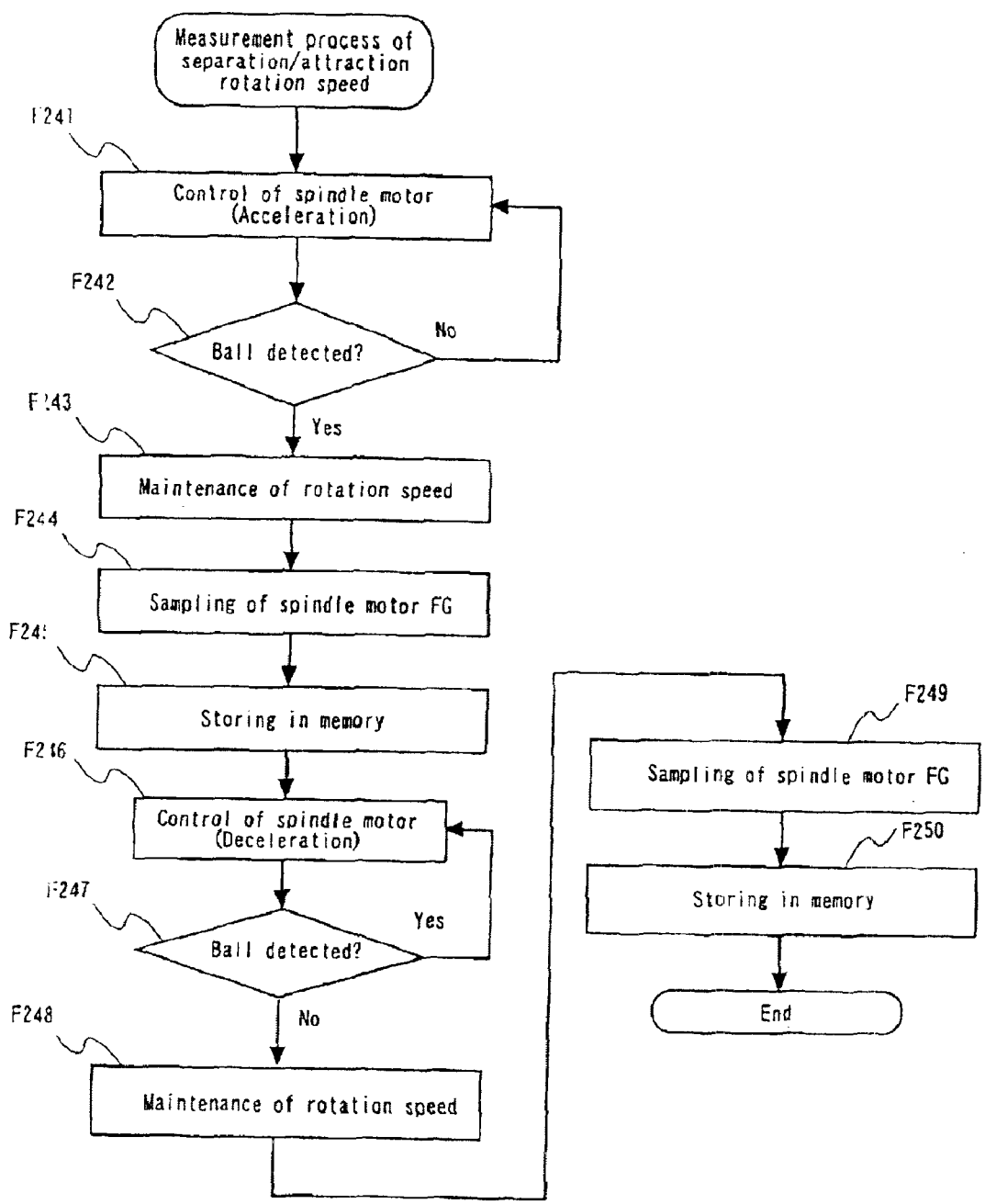
FIG. 26 is a flowchart of a process of measuring the magnetic ball separation rotation speed and magnetic ball attraction rotation speed of a disk drive in accordance with the eighth embodiment of the present invention.

FIG. 26 and FIG. 27 show an eighth embodiment of the present invention.

The disk drive of the present invention includes a microcomputer and carries out the process of the flowchart shown in FIG. 26 by using the microcomputer.

A method for measuring the magnetic ball separation and attraction rotation speeds will be described below, while the basic configurations of the detection section and the like are the same as those of the seventh embodiment.

<Explanation of FIG. 26>

FIG. 26 shows a process of measuring the magnetic ball separation and attraction rotation speeds. The measurement process is carried out during the production of the disk drive before shipment.

At step F241, the acceleration control for the spindle motor 2 is carried out first to gradually rotate the disk 5. As the rotation speed is raised, the centrifugal force applied to the magnetic ball 1 becomes larger than the magnetic attraction force exerted between the magnetic ball 1 and the magnet 8. At this time, the magnetic ball 1 separates from the magnet 8 and moves to the external peripheral face of the ring-shaped hollow section 4.

At step F242, the behavior detection section in accordance with the seventh embodiment detects this movement.

After it is confirmed that the magnetic ball 1 has separated from the magnet 8, the sequence advances to step F243. At this step, raising the rotation speed is stopped, and the rotation speed of the spindle motor at this time is maintained.

Next, at step F244, the FG signal obtained from the Hall device 11 provided near the spindle motor 2 is subjected to sampling, and the rotation speed at this time is measured.

At step F245, the measured separation rotation speed is stored in the memory.

<Explanation of FIG. 27>

A method for measuring the separation rotation speed in accordance with the eighth embodiment (at step F242 and the like) will be described below referring to FIG. 27A to FIG. 27D.

Figure 27A:
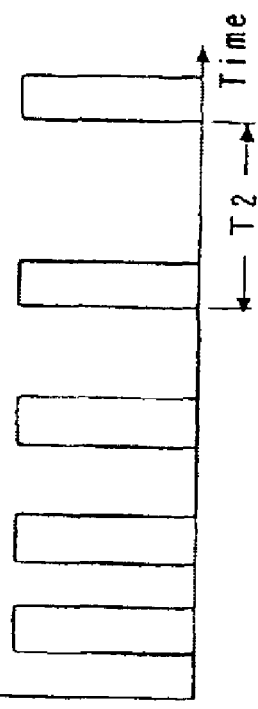
FIGS. 27A to 27D are graphs showing the output signal of the photosensor and the FG signal of the disk drive in accordance with the eighth embodiment of the present invention.

FIG. 27A shows an FG signal during acceleration. The rising period and the falling period of the FG signal correspond to one rotation of the spindle motor (1 pulse per rotation).

Figure 27C:
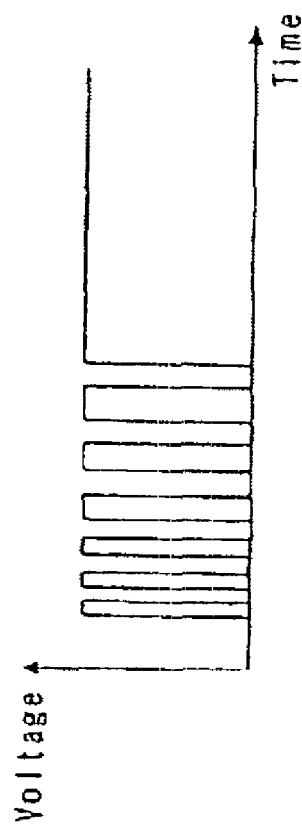
Figure 27B:
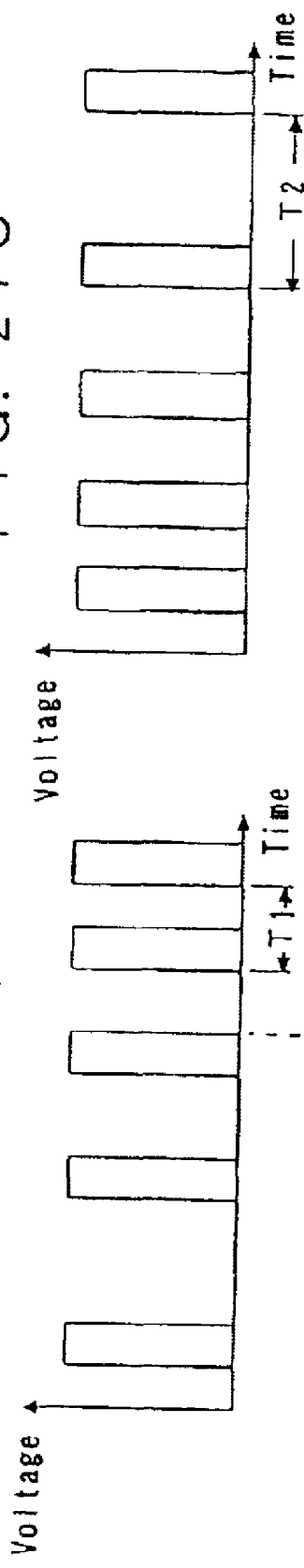

FIG. 27B shows a binarized signal output from the reflection-type photointerruptor 14 during acceleration. As described in FIG. 24D, when the output signal of the reflection-type photointerruptor 14 does not change (in the first half of FIG. 27B), the magnetic ball has not been positioned on the external peripheral side wall of the ring-shaped hollow section (see FIG. 19B).

When the output signal of the reflection-type photointerruptor 14 changes (in the latter half of FIG. 27B), the magnetic ball is positioned on the external peripheral side wall of the ring-shaped hollow section (see FIG. 19A).

As a result, at the time when a falling edge is generated in FIG. 27B, it is possible to determine that the magnetic ball 1 has separated from the magnet 8 and have reached the external peripheral side wall. Hence, the magnetic ball separation rotation speed can be measured by sampling the period T1 of the FG signal obtained at the time when a falling edge signal is generated from the reflection-type photointerruptor 14.

At step F245, by storing this value in the memory in the disk drive, the magnetic ball separation rotation speed inherent in the disk drive can be possessed as data.

<Continued Explanation of FIG. 26>

At step F246, the spindle motor 2 is decelerated until the magnetic ball 1 is attracted by the magnet 8 in order to measure the magnetic ball attraction rotation speed.

As the rotation speed lowers, the centrifugal force applied to the magnetic ball becomes smaller than the magnetic attraction force exerted between the magnetic ball 1 and the magnet 8. As a result, the magnetic ball 1 is attracted by the magnet 8 and moves to the external peripheral face of the magnet 8.

At step F247, the behavior detection section in accordance with the seventh embodiment detects the movement of the magnetic ball.

After it is confirmed that the magnetic ball 1 has been attracted by the magnet 8, lowering the disk rotation speed is stopped, whereby the rotation speed of the spindle motor at this time is maintained at step F248.

Next, at step F249, the FG signal obtained from the Hall device 11 provided near the spindle motor 2 is subjected to sampling, and the rotation speed at this time, is measured.

FIG. 27C shows an FG signal during deceleration. The rising period and the falling period of the FG signal correspond to one rotation of the spindle motor (1 pulse per rotation).

Figure 27D:
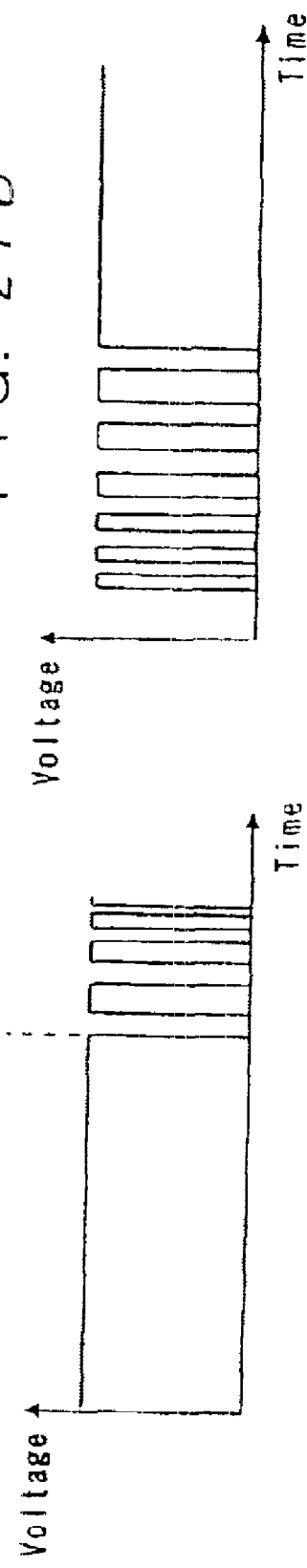

FIG. 27D shows a binarized signal output from the reflection-type photointerruptor 14 during deceleration.

As described in FIG. 24D, when the output signal of the reflection-type photointerruptor 14 changes (in the first half of FIG. 27D), the magnetic ball 1 positions on the external peripheral side wall of the ring-shaped hollow section (see FIG. 19A). When the output signal of the reflection-type photointerruptor 14 does not change (in the latter half of FIG. 27D), the magnetic ball does not position on the external peripheral side wall of the ring-shaped hollow section (see FIG. 19B).

As a result, in FIG. 27D, at the time when no falling edge appears in the signal of the reflection-type photointerruptor 14 in one period of the FG signal, it is can be determined that the magnetic balls 1 has been attracted by the magnet 8. For this reason, it is possible to measure the magnetic ball attraction rotation speed by sampling the period T2 of the FG signal at the time when no falling edge appears in the signal from the reflection-type photointerruptor 14 in one period of the FG signal.

By storing this value in the memory of the disk drive at step F250, it is possible to possess the magnetic ball attraction rotation speed inherent in the disk drive as data.

At the magnetic ball separation process step (F503) of the spin-up process of the fourth embodiment shown in FIG. 5, the disk device can read the rotation period data a measured and stored in accordance with the method for the eighth embodiment (at step F509). Furthermore, the disk device can control the spindle motor 2 (at steps F510 and F511) so that the rotation period of the disk becomes a or less (the rotation frequency of the disk becomes 1/α or more).

In addition, the values measured by this embodiment can be used for the magnetic ball separation rotation speed f1 (Hz) and the magnetic ball attraction rotation speed f0) (Hz) used for the process of the fifth embodiment shown in FIG. 10 or the processes for the seventh embodiment shown in FIG. 23 and FIG. 25.

In the above-mentioned configuration and process, the behavior of the magnetic ball can be detected easily. For this reason, it is possible to deliver stable performance during recording and reproduction, as well as seek operation related to recording and reproduction.

<Effect of the Invention>

In the conventional disk drive, no consideration is taken as to whether the magnetic ball has been attracted by the magnet, has positioned along the external periphery of the ring-shaped hollow section owing to a centrifugal force or is rolling unstably inside the ring-shaped hollow section.

In the present invention, attention is paid to the importance of eliminating the effect of the movement of the magnetic ball inside the ring-shaped hollow section on the disk drive, and the magnetic ball separation process is carried out as an independent process. As a result, the magnetic ball separation process can be separated from other processes. This can obtain an advantageous effect of preventing an impact from being applied to the disk during tracking servo control or during the adjustments of various parameters.

Hence, an advantageous effect of attaining a disk drive for stably carrying out reproduction, recording or seek operation on the disk, is obtained with the present invention.

Furthermore, the present invention prevents impact application during the servo adjustment of the optical pickup and the adjustments of various parameters that use an input signal derived from the light reflected by the face of the disk. The present invention thus prevents the disk drive from malfunctioning because of improper adjustment caused by an impact or the like from the magnetic ball. As a result, an advantageous effect capable of attaining a disk drive for stably carrying out reproduction, recording or seek operation on the disk, is obtained with the present invention.

Furthermore, the effect of the movement of the magnetic ball inside the ring-shaped hollow section on the disk drive is eliminated in the present invention. For this reason, even if a large impact is applied to the disk when the magnetic ball collides with the side wall of the ring-shaped hollow section, the control of the disk is not affected at all. Therefore an advantageous effect capable of increasing the difference between the diameter of the external peripheral face of the ring-shaped hollow section 4 and the diameter of the internal peripheral face thereof (the external peripheral face of the magnet), is obtained with the present invention.

As a result, during high-speed rotation, the magnetic ball 1 is stably positioned at an optimum balance position on the external peripheral face of the ring-shaped hollow section 4 by a strong centrifugal force. For this reason, it is possible to obtain a significant balancer effect.

On the other hand, during low-speed rotation, the magnetic ball 1 is attracted to the external peripheral face of the magnet 8. The balance of the disk drive is thus not affected adversely. Since the difference between the radius of the external peripheral face and that of the internal peripheral face is large, the inertia applied to the disk in the case when the magnetic ball 1 positions on the internal peripheral face is smaller than the inertia applied to the disk in the case when the magnetic ball 1 positions on the external peripheral face. As a result, even if the magnetic ball moves along the internal peripheral face, the effect of the movement is limited during the low-speed rotation.

In the present invention, impact application at the time when the magnetic ball is attracted by the magnet does not occur during recording in particular. It is thus possible to carry out stable recording.

Furthermore, even during seek operation, the magnetic ball does not move continuously along the external peripheral face of the ring-shaped hollow section 4, and the magnetic ball is not attracted by or separated from the magnet repeatedly. It is thus possible to carry out seek operation to a target position promptly.

In the conventional example, the position of the magnetic ball in the ring-shaped hollow section is not known at the time when the spin-up process is completed. For this reason, the magnetic ball sometimes moves inside the ring-shaped hollow section during reproduction or the like, thereby causing an adverse effect on the disk.

In the present invention, the magnetic ball is securely positioned along the external peripheral wall face of the ring-shaped hollow section by a centrifugal force when the spin-up process is completed. For this reason, as in the present invention, the magnetic ball is securely positioned on the external peripheral side wall of the ring-shaped hollow section after the spin-up process is completed, in the case when reproduction, recording or seek operation on the disk is carried out, an adverse effect caused by the movement of the magnetic ball inside the ring-shaped hollow section during reproduction or the like can be prevented from occurring on the optical disk. This advantageous effect is obtained with the present invention.

In addition, the process of separating the magnetic ball from the magnet is carried out during a process included in the spin-up process, wherein the output signal and the like of the optical pickup are not used. For this reason, an advantageous effect capable of attaining a disk drive that requires no special time for the process of separating the magnetic ball from the magnet, is obtained with the present invention.

It is assumed for example that the position of the magnetic ball in the ring-shaped hollow section is unknown at a first rotation speed (including the stop state) (it is unknown as to whether the magnetic ball positions on the external peripheral side wall of the ring-shaped hollow section, positions on the internal peripheral side wall thereof or is unstably moving inside the ring-shaped hollow section). It is also assumed for example that a second rotation speed is higher than the rotation speed f0 (Hz) at which the magnetic ball is attracted by the magnet and is lower than the rotation speed f1 (Hz) at which the magnetic ball separates from the magnet.

In this case, in the present invention, the rotation speed is not directly changed from the first rotation speed to the second rotation speed. The disk is rotated at a third rotation speed once (a rotation speed not less than the rotation speed f1 (Hz) at which the magnetic ball separates from the magnet) in order to securely position the magnetic ball on the external peripheral side wall of the ring-shaped hollow section. The rotation speed of the disk is then lowered to the second rotation speed, and the operation is shifted to a target operation, such as reproduction or recording on the disk.

As a result, the magnetic ball securely positions on the external peripheral side wall of the ring-shaped hollow section at the second rotation speed. Any disturbance that is caused for example when the magnetic ball suddenly collides with the side wall in the middle of reproduction or the like is prevented from occurring.

When the rotation speed is changed from a low rotation speed to a high rotation speed, the present invention can obtain an advantageous effect capable of attaining a disk drive for stably carrying out reproduction, recording or seek operation on the disk at the high rotation speed.

The present invention is effective in the case when a rotation speed mode of a disk drive having plural rotation speed modes is shifted to a high rotation speed mode. In addition, in a disk drive wherein the rotation speed of the disk is lowered or the rotation of the disk is stopped in the case when the optical pickup does not move from a track for a certain time or more in order to save electric power, the present invention is also effective when the power saving mode is shifted to the ordinary disk reproduction mode.

Furthermore, by carrying out the magnetic ball separation process and the adjustments of some parameters not affected by the collision or the like of the magnetic ball in parallel, the waiting time of the user can be prevented from increasing by the time of the magnetic ball separation process. The present invention can obtain this advantageous effect.

Furthermore, by carrying out the magnetic ball separation process and the laser power adjustment or the optical pickup focus system adjustment not affected by the collision and the like of the magnetic ball in parallel, the waiting time of the user can be prevented from increasing by the time of the magnetic ball separation process. The present invention can obtain this advantageous effect.

In the present invention in accordance with claim 6 and the like, by detecting the impact caused by the behavior of the magnetic ball, it is possible to know the current position of the magnetic ball (positional information on whether the magnetic ball positions on the external peripheral side wall of the ring-shaped hollow section, positions on the internal peripheral side wall of the ring-shaped hollow section or is moving unstably inside the ring-shaped hollow section).

For this reason, after the magnetic ball is securely positioned on the external peripheral side wall of the ring-shaped hollow section or on the internal peripheral side wall of the ring-shaped hollow section, it is possible to start reproduction or the like on the disk. This can be obtained as an advantageous effect.

In the present invention, attention is paid to the importance of eliminating the effect of the movement of the magnetic ball inside the ring-shaped hollow section on the disk drive, and the positional information on the magnetic ball can be derived by detecting the impact of the magnetic ball. In addition, it is possible to prevent the collision of the magnetic ball during reproduction or the like on the disk on the basis of the positional information on the magnetic ball. The present invention can obtain this advantageous effect.

As a result, the present invention can obtain an advantageous effect capable of attaining a disk drive for stably carrying out reproduction, recording or seek operation on the disk.

In addition, the behavior of the magnetic ball can be detected. Furthermore, it is possible to set the timing of shift to recording and the timing of various control processes, such as the optimization of a process immediately after seek operation. As a result, the present invention can obtain an advantageous effect capable of providing a disk drive that can carry out recording and reproduction more stably and securely.

Furthermore, in the present invention in accordance with claim 7 and the like, the impact or the behavior of the magnetic ball is detected. The rotation speed of the disk at the time when the magnetic ball reaches (or collides with) the external or internal peripheral side wall of the ring-shaped hollow section is also detected. As a result, it is possible to detect the rotation speed at which the magnetic ball separates from the magnet or the rotation speed at which the magnetic ball is attracted by the magnet.

Hence, it is possible to know the magnetic ball separation rotation speed or the magnetic ball attraction rotation speed for each disk drive. For this reason, after the magnetic ball is securely positioned on the external or internal peripheral side wall of the ring-shaped hollow section by raising or lowering the rotation speed to a necessary and sufficient speed, it is possible to start reproduction or the like on the disk.

The present invention can obtain an advantageous effect capable of attaining a disk drive wherein the magnetic ball is separated from the magnet or attracted by the magnet by using the minimum time and energy and then reproduction, recording or seek operation on the disk is carried out stably.

Furthermore, it is possible to set an appropriate magnetic ball separation or attraction rotation speed regardless of any variation in the magnetic attraction force between the magnet and the magnetic ball from one disk drive to another, thereby ensuring more stable control.

In the present invention in accordance with claim 10 and the like, the optical pickup or the like originally provided in the disk drive is used as the impact detection section.

The present invention can thus obtain an advantageous effect capable of attaining an optical disk drive that is inexpensive, simply configured and equipped with a balancer having an impact detection section.

In accordance with the present invention, by using a piezoelectric ceramic sensor as a sensor provided only for impact detection, the time for the detection process is not limited. In other words, it is possible to measure the magnetic ball separation or attraction rotation speed at any time regardless of any process being carried out on the disk. In addition, it is possible to provide a detection section that is relatively inexpensive and excellent in detection accuracy.

The present invention can obtain an advantageous effect capable of attaining an optical disk drive that is inexpensive, simply configured and equipped with a balancer having an impact detection section.

It is assumed for example that the position of the magnetic ball in the ring-shaped hollow section is unknown at a first rotation speed (it is unknown as to whether the magnetic ball positions on the external peripheral side wall of the ring-shaped hollow section, positions on the internal peripheral side wall thereof or is unstably moving inside the ring-shaped hollow section). It is also assumed for example that a second rotation speed is higher than the rotation speed f0 (Hz) at which the magnetic ball is attracted by the magnet and is lower than the rotation speed f1 (Hz) at which the magnetic ball separates from the magnet.

In this case, in the present invention, the rotation speed is not directly changed from the first rotation speed to the second rotation speed. The disk is rotated at a third rotation speed once (a rotation speed not more than the rotation speed f0 at which the magnetic ball is attracted by the magnet) in order to securely position the magnetic ball on the internal peripheral side wall of the ring-shaped hollow section. The rotation speed of the disk is then raised to the second rotation speed, and the operation is shifted to a target operation, such as reproduction or recording on the disk.

As a result, the magnetic ball securely positions on the internal peripheral side wall of the ring-shaped hollow section at the second rotation speed. This prevents any disturbance caused at the time when the magnetic ball suddenly collides with the side wall in the middle of recording or the like.

When the rotation speed is changed from a high rotation speed to a low rotation speed, the present invention in accordance with claim 13 and the like can obtain an advantageous effect capable of attaining a disk drive for stably carrying out reproduction, recording or seek operation on the disk at the low rotation speed.

In the present invention in accordance with claim 14 and the like, the magnetic ball securely positions on the internal peripheral side wall of the ring-shaped hollow section during continuous recording or the like in a region for recording. This prevents any disturbance caused at the time when the magnetic ball suddenly collides with the side wall in the middle of recording or the like. As a result, the present invention can obtain an advantageous effect capable of attaining a disk drive for stably carrying out reproduction, recording or seek operation on the disk.

In the present invention in accordance with claim 15, in a disk drive having the CLV mode in particular, recording or the like on the disk can be carried out stably. This stable operation is made possible by properly making a selection as to whether the magnetic ball is positioned on the external peripheral side wall of the ring-shaped hollow section or the internal peripheral side wall thereof (a state wherein the magnetic ball is attracted by the magnet) regardless of the linear speed during recording, reproduction or the like.

Even if recording (or reproduction or the like) is carried out continuously from the beginning to the end on the disk for example, the magnetic ball does not move inside the ring-shaped hollow section or collide with the side wall thereof during the recording (or reproduction or the like).

As a result, the present invention can obtain an advantageous effect capable of attaining a disk drive for stably carrying out reproduction, recording or seek operation on the disk.

In the present invention in accordance with claim 17 and the like, it is possible to detect the static and dynamic behavior of the magnetic ball inside the ring-shaped hollow section. As a result, it is possible to know the position of the magnetic ball inside the ring-shaped hollow section more accurately.

In accordance with the present invention, it is possible to prevent the magnetic ball from causing collision during recording or the like on the disk by starting recording or the like on the disk after it is detected that the magnetic ball has moved to the external or internal peripheral side wall of the ring-shaped hollow section.

In addition, in the present invention, it is possible to carry out detection as to whether the magnetic ball is moving on the external peripheral side wall of the ring-shaped hollow section or have positioned stably at an optimum balance position.

The present invention can obtain an advantageous effect capable of attaining a disk drive for stably carrying out reproduction, recording or seek operation on the disk.

The invention in accordance with claim 18 of the present invention relates to a disk drive in accordance with claim 17, wherein the housing of the ring-shaped hollow section is formed of a transparent material, and the behavior detection section is a photosensor.

In the present invention in accordance with claim 18 and the like, it is possible to detect the static and dynamic behavior of the magnetic ball inside the ring-shaped hollow section by using a photosensor or an electrostatic capacitance type sensor, i.e., a relatively inexpensive and space-saving detection device. As a result, it is possible to know the position of the magnetic ball in the ring-shaped hollow section more accurately.

In the present invention in accordance with claim 19, a lens section is provided between the photosensor and the magnetic ball.

With this configuration, accurate detection can be attained, and the spacing (operation distance) between the magnetic ball and the photosensor can be set as desired by changing the shape of the lens. These can be obtained as advantageous effects.

In the present invention in accordance with claim 21, it is possible to confirm the behavior of the magnetic ball in the circumferential direction by using simple electric circuits and criteria.

The present invention can obtain an advantageous effect capable of attaining a disk drive that can easily carry out detection as to whether the magnetic ball is stationary at an optimum balance position inside the ring-shaped hollow section or still moving.

The invention in accordance with claim 22 and the like can obtain an advantageous effect capable of attaining a disk drive that can detect the behavior of the magnetic ball in the radial direction by using simple electric circuits and criteria.

In the present invention in accordance with claim 23 and the like, it is possible to start recording and reproduction after securely detecting that the magnetic ball has been attracted by the magnet or has positioned at an optimum balance position on the external peripheral side wall. As a result, no impact is applied during recording and reproduction, thereby eliminating any adverse effects owing to unstable movement of the magnetic ball.

The present invention can obtain an advantageous effect capable of attaining a disk drive for stably carrying out reproduction, recording or seek operation on the disk.

In the present invention in accordance with claim 27, the magnetic ball is securely positioned on the external peripheral side wall of the ring-shaped hollow section when the rotation speed is changed from a low rotation speed to a high rotation speed. As a result, it is possible to obtain an advantageous effect capable of attaining a disk drive control method for stably carrying out reproduction, record or seek operation on the disk at the high rotation speed.

In the present invention in accordance with claim 28, the magnetic ball is securely positioned on the internal peripheral side wall of the ring-shaped hollow section when the rotation speed is changed from a high rotation speed to a low rotation speed. As a result, it is possible to obtain an advantageous effect capable of attaining a disk drive control method for stably carrying out reproduction, record or seek operation on a disk at the low rotation speed.

As described above, in accordance with the disk drive of the present invention, it is possible to attain a disk drive and a disk drive control method capable of realizing stable reproduction and recording at various recording and reproduction speeds by stabilizing and optimizing the magnetic ball. The above-mentioned stable reproduction and recording at various recording and reproduction speeds cannot be attained so far by using only the conventional configurations.

Although the present invention has been described in terms of the preferred embodiments in some detail, it is to be understood that the disclosed contents of the preferred embodiments may be subject to change in the details of the configuration thereof. It is thus apparent that the combination and sequence of the components of the configuration may be changed without departing from the scope and spirit of the claimed invention.

INDUSTRIAL APPLICABILITY

The present invention is applied to disk drives and the like for recording and reproducing data, such as CD-ROM drives, DVD-ROM drives and CD-R/RW drives, and is used to stably carry out reproduction, recording or seek operation on disks.

What is claimed is:

1. A disk drive comprising:
   a disk,
   a balancer for movably accommodating one or plural magnetic balls in the ring-shaped hollow section thereof and provided with a magnet for attracting said magnetic balls inside said ring-shaped hollow section, and
   an impact detection section for detecting an impact caused by the behavior of said magnetic ball.

2. A disk drive comprising:
   a disk,
   a balancer for movably accommodating one or plural magnetic balls in the ring-shaped hollow section thereof and provided with a magnet for attracting said magnetic balls inside said ring-shaped hollow section, an impact detection section for detecting an impact caused by the behavior of said magnetic ball, and a rotation speed detection section for detecting the rotation speed of said disk at the time of the detection of said impact.

3. A disk drive in accordance with claim 2, further comprising:

an impact detection section for detecting an impact caused by the behavior of said magnetic ball, and a rotation speed detection section for detecting the rotation speed of said disk at the time of the detection of said impact, wherein said impact detection section detects the timing of the separation of said magnetic ball from said magnet, and said rotation speed detection section detects the rotation speed of said disk at the timing of said separation.

4. A disk drive in accordance with claim 3, wherein said impact detection section detects an impact on the basis of an output signal of an optical pickup.

5. A disk drive in accordance with claim 3, wherein said impact detection section detects an impact on the basis of an output signal of an optical pickup, the focus error signal or the tracking error signal of said optical pickup.

6. A disk drive in accordance with claim 3, wherein said impact detection section is a piezoelectric ceramic sensor.

7. A disk drive in accordance with claim 2, wherein said impact detection section detects the timing of the attraction of said magnetic ball by said magnet, and said rotation speed detection section detects the rotation speed of said disk at the timing of said attraction.

8. A disk drive in accordance with claim 2, wherein said impact detection section detects an impact on the basis of an output signal of an optical pickup.

9. A disk drive in accordance with claim 8, wherein said impact detection section detects an impact on the basis of the focus error signal or the tracking error signal of said optical pickup.

10. A disk drive in accordance with claim 2, wherein said impact detection section is a piezoelectric ceramic sensor.

11. A disk drive comprising:

a disk, a balancer for movably accommodating one or plural magnetic balls in the ring-shaped hollow section thereof and provided with a magnet for attracting said magnetic balls inside said ring-shaped hollow section, wherein in the case when reproduction, recording, or seek operation is carried out in a region from a first position to another position on said disk, if the maximum value of the disk rotation speed for the operation in said region is lower than a separation rotation speed at which said magnetic ball in the attraction state separates from said magnet and higher than an attraction rotation speed at which said magnetic ball in the separation state is attracted by said magnet, and if the minimum value of the disk rotation speed for the operation in said region is not more than said attraction rotation speed at which said magnetic ball in the separation state is attracted by said magnet, the rotation speed of said disk is set at said attraction rotation speed or less before reproduction, recording or seek operation.

12. A disk drive in accordance with claim 11, wherein the relationship expression of $f0 \times \{(\text{the rotation speed at the innermost periphery})/(\text{the rotation speed at the outermost periphery})\} < f1$ is established, wherein f1 designates the rotation speed at which said magnetic ball separates and f0 designates the rotation speed at which said magnetic ball is attracted.

13. A disk drive in accordance with claim 11, comprising:

an impact detection section for detecting an impact caused by the behavior of said magnetic ball, and a rotation speed detection section for detecting the rotation speed of said disk at the time of the detection of said impact, wherein said impact detection section detects the timing of the separation of said magnetic ball from said magnet, and said rotation speed detection section detects the rotation speed of said disk at the timing of said separation, and said impact detection section detects the timing of the attraction of said magnetic ball by said magnet, and said rotation speed detection section detects the rotation speed of said disk at the timing of said attraction.

14. A disk drive comprising:

a balancer for movably accommodating one or plural magnetic balls in the ring-shaped hollow section thereof and provided with a magnet for attracting said magnetic balls inside said ring-shaped hollow section, and a behavior detection section for detecting the behavior of said magnetic ball.

15. A disk drive in accordance with claim 14, wherein the housing of said ring-shaped hollow section is formed of a transparent material, and said behavior detection section is photosensor.

16. A disk chive in accordance with claim 15, wherein the housing of said ring-shaped hollow section has a light-gathering section.

17. A disk drive in accordance with claim 14, wherein the housing a said ring-shaped hollow section is formed of a nonmetallic material, and said behavior detection section is an electrostatic capacitance type sensor.

18. A disk drive in accordance with claim 14, wherein a determination is made as to whether said magnetic ball is rolling along the external peripheral face of said ring-shaped hollow section or not by comparing the period of the output signal of said behavior detection section with the period of the output signal of a rotation speed detection section for detecting the rotation speed of said disk.

19. A disk drive in accordance with claim 14, wherein a determination is made as to whether said magnetic ball has been attracted by said magnet or not on the basic of the output signal of said behavior detection section.

20. A disk drive in accordance with claim 14, wherein a determination is made as to whether said magnetic ball is rolling along the external peripheral face of said ring-shaped hollow section or not by comparing the period of the output signal of said behavior detection section with the period of the output signal of said rotation speed detection section for detecting the rotation speed of said disk, another determination is made as to whether said magnetic ball has been attracted by said magnet or not on the basis of the output signal of said behavior detection signal, and the operation mode is shifted to reproduction or recording after said two determinations are made.

21. A disk drive in accordance with claim 14, further comprising:
- a behavior detection section for detecting the behavior of said magnetic ball, and
- a rotation speed detection section for detecting the rotation speed of said disk, wherein said behavior detection section detects the timing of the separation of said magnetic ball from said magnet, and said rotation speed detection section detects the rotation speed of said disk at the timing of said separation.

22. A disk drive in accordance with claim 14, further comprising:
- a rotation speed detection section, wherein said behavior detection section detects the timing of the attraction of said magnetic ball by said magnet, and said rotation speed detection section detects the rotation speed of said disk at the timing of said attraction.

23. A disk drive in accordance with claim 14, further comprising:
- a behavior detection section for detecting the behavior of said magnetic ball, and
- a rotation speed detection section for detecting the rotation speed of said disk, wherein
- said behavior detection section detects the timing of the separation of said magnetic ball from said magnet,
- said rotation speed detection section detects the rotation speed of said disk at the timing of said separation,
- said behavior detection section detects the timing of the attraction of said magnetic ball by said magnet, and
- said rotation speed detection section detects the rotation speed of said disk at the timing of said attraction.

24. A disk drive comprising:
- a disk, and
- a balancer for movably accommodating one or plural magnetic balls in ring-shaped hollow section thereof and provided with a magnet for attracting said magnetic balls inside said ring-shaped hollow section, wherein
- in the case when reproduction, recording, or seek operation is carried out in a region from a first position to another position on said disk,
- if the minimum value of the disk rotation speed in the operation in said region is not less than an attraction rotation speed at which said magnetic ball in the separation state is attracted by said magnet,
- said disk rotation speed is once raised to a separation on rotation speed or more, so that said magnetic ball becomes in a separation state before reproduction, recording or seek operation, and then reproduction, recording or seek operation is carried out.

* * * * *